US007327780B2

(12) United States Patent
Oates et al.

(10) Patent No.: US 7,327,780 B2
(45) Date of Patent: Feb. 5, 2008

(54) WIRELESS COMMUNICATIONS SYSTEMS AND METHODS FOR MULTIPLE OPERATING SYSTEM MULTIPLE USER DETECTION

(75) Inventors: John H. Oates, Amherst, NH (US); Steven R. Imperiali, Townsend, MA (US); Alden J. Fuchs, Nashua, NH (US); Kathleen J. Jacques, Somerville, MA (US); Jonathan E. Greene, Great Barrington, MA (US); William J. Jenkins, Leominster, MA (US); Frank P. Lauginiger, Francestown, NH (US); David E. Majchrzak, Merrimack, NH (US); Paul E. Cantrell, Chelmsford, MA (US); Mirza Cifric, Jamaica Plain, MA (US); Ian N. Dunn, Providence, RI (US); Michael J. Vinskus, Litchfield, NH (US)

(73) Assignee: Mercury Computer Systems, Inc., Chelmsford, MA (US)

(*) Notice: Subject to any disclaimer, the term of this patent is extended or adjusted under 35 U.S.C. 154(b) by 899 days.

(21) Appl. No.: 10/099,918

(22) Filed: Mar. 14, 2002
(Under 37 CFR 1.47)

(65) Prior Publication Data
US 2003/0128739 A1 Jul. 10, 2003

Related U.S. Application Data

(60) Provisional application No. 60/295,060, filed on Jun. 1, 2001, provisional application No. 60/289,600, filed on May 7, 2001, provisional application No. 60/275,846, filed on Mar. 14, 2001.

(51) Int. Cl.
*H04B 1/00* (2006.01)

(52) U.S. Cl. .................. 375/150; 375/136; 375/137; 375/142; 375/143; 375/144; 375/147; 375/148; 375/149; 375/151; 375/152

(58) Field of Classification Search ................ 375/150
See application file for complete search history.

(56) References Cited

U.S. PATENT DOCUMENTS 5,475,818 A    12/1995   Molyneaux et al.

(Continued)

FOREIGN PATENT DOCUMENTS

DE        198 41 578 A1    9/1998

(Continued)

*Primary Examiner*—Curtis B. Odom
(74) *Attorney, Agent, or Firm*—Nutter, McClennen & Fish, LLP; David J. Powsner; Reza Mollaaghababa

(57) ABSTRACT

The invention provides methods and apparatus for multiple user detection (MUD) processing that have application, for example, in improving the capacity CDMA and other wireless base stations. One aspect of the invention provides a multiprocessor, multiuser detection system for detecting user transmitted symbols in CDMA short-code spectrum waveforms. A first processing element generates a matrix (hereinafter, "gamma matrix") that represents a correlation between a short-code associated with one user and those associated with one or more other users. A set of second processing elements generates, e.g., from the gamma matrix, a matrix (hereinafter, "R-matrix") that represents cross-correlations among user waveforms based on their amplitudes and time lags. A third processing element produces estimates of the user transmitted symbols as a function of the R-matrix.

14 Claims, 15 Drawing Sheets

U.S. PATENT DOCUMENTS

| | | | |
|---|---|---|---|
| 5,576,715 A * | 11/1996 | Litton et al. | 342/357.12 |
| 5,581,632 A | 12/1996 | Koljonen et al. | 382/150 |
| 5,590,284 A * | 12/1996 | Crosetto | 712/29 |
| 5,644,592 A | 7/1997 | Divsalar et al. | |
| 5,757,791 A | 5/1998 | Kanterakis et al. | |
| 5,790,534 A | 8/1998 | Kokko et al. | 370/335 |
| 5,809,262 A * | 9/1998 | Potter | 710/305 |
| 5,812,843 A * | 9/1998 | Yamazaki et al. | 718/100 |
| 5,831,984 A | 11/1998 | Hottinen | 370/441 |
| 5,864,549 A | 1/1999 | Honkasalo et al. | 370/335 |
| 5,867,478 A | 2/1999 | Baum et al. | 370/203 |
| 5,870,378 A | 2/1999 | Huang et al. | 370/209 |
| 5,872,776 A | 2/1999 | Yang | 370/342 |
| 5,881,056 A | 3/1999 | Huang et al. | 370/335 |
| 5,933,423 A | 8/1999 | Laakso et al. | 370/335 |
| 5,936,950 A | 8/1999 | Hottinen | 370/342 |
| 5,943,330 A | 8/1999 | Hottinen | 370/335 |
| 6,005,852 A | 12/1999 | Kokko et al. | 370/329 |
| 6,011,812 A | 1/2000 | Laakso et al. | |
| 6,018,317 A | 1/2000 | Dogan et al. | 342/378 |
| 6,047,020 A | 4/2000 | Hottinen | 375/207 |
| 6,064,689 A * | 5/2000 | Vollmer et al. | 375/149 |
| 6,067,292 A | 5/2000 | Huang et al. | |
| 6,091,788 A | 7/2000 | Keskitalo et al. | 375/347 |
| 6,101,176 A | 8/2000 | Honkasalo et al. | 370/335 |
| 6,127,973 A | 10/2000 | Choi et al. | |
| 6,128,486 A | 10/2000 | Keskitalo et al. | 455/422 |
| 6,154,443 A | 11/2000 | Huang et al. | |
| 6,154,507 A | 11/2000 | Bottomley | 375/340 |
| 6,161,209 A | 12/2000 | Moher | 714/780 |
| 6,188,718 B1 | 2/2001 | Gitlin et al. | 375/148 |
| 6,192,042 B1 | 2/2001 | Seo | 370/342 |
| 6,212,406 B1 | 4/2001 | Keskitalo et al. | 455/562 |
| 6,215,780 B1 | 4/2001 | Peters et al. | 370/342 |
| 6,219,341 B1 | 4/2001 | Varanasi | 370/252 |
| 6,222,833 B1 | 4/2001 | Seo | 370/342 |
| 6,240,099 B1 | 5/2001 | Lim et al. | 370/441 |
| 6,370,130 B1 | 4/2002 | Zhou et al. | |
| 6,430,503 B1 * | 8/2002 | McBurney et al. | 701/213 |
| 6,470,000 B1 | 10/2002 | Burns et al. | |
| 6,570,530 B2 * | 5/2003 | Gaal et al. | 342/357.02 |
| 6,570,864 B1 | 5/2003 | Kim et al. | |
| 6,600,729 B1 | 7/2003 | Suzuki | |
| 6,647,059 B1 | 11/2003 | Faruque | |
| 6,748,457 B2 | 6/2004 | Fallon et al. | |
| 6,754,805 B1 | 6/2004 | Juan | |
| 6,782,036 B1 | 8/2004 | Dowling et al. | |
| 6,801,565 B1 | 10/2004 | Bottomley et al. | |
| 6,842,480 B1 | 1/2005 | Yang et al. | |
| 6,885,338 B2 * | 4/2005 | Gaus et al. | 342/377 |
| 6,948,010 B2 | 9/2005 | Somers et al. | |
| 7,028,114 B1 | 4/2006 | Milan et al. | |
| 7,046,657 B2 | 5/2006 | Harrington et al. | |
| 2002/0031166 A1* | 3/2002 | Subramanian et al. | 375/130 |
| 2002/0118728 A1 | 8/2002 | Mohseni | |
| 2002/0122392 A1 | 9/2002 | Elezabi | |
| 2003/0002569 A1 | 1/2003 | Oates | |
| 2003/0058929 A1 | 3/2003 | Cox et al. | |
| 2003/0076875 A1 | 4/2003 | Oates | |
| 2003/0091058 A1 | 5/2003 | Oates | |
| 2003/0091102 A1 | 5/2003 | Oates | |
| 2003/0091106 A1 | 5/2003 | Oates | |
| 2003/0099224 A1 | 5/2003 | Oates | |
| 2003/0099225 A1 | 5/2003 | Oates | |
| 2003/0103558 A1 | 6/2003 | Oates | |
| 2003/0191887 A1 | 10/2003 | Oates | |
| 2003/0198197 A1 | 10/2003 | Oates | |
| 2003/0202559 A1 | 10/2003 | Oates | |
| 2003/0202566 A1 | 10/2003 | Oates | |
| 2003/0206577 A1 | 11/2003 | Liberti, Jr. et al. | |
| 2003/0231702 A1 | 12/2003 | Oates | |
| 2004/0213329 A1 | 10/2004 | Takashi et al. | |

FOREIGN PATENT DOCUMENTS

| | | |
|---|---|---|
| DE | 198 41 578 A1 | 3/2000 |
| EP | 0772306 A2 | 5/1997 |
| EP | 0876008 A1 | 11/1998 |
| EP | 0865172 A3 | 1/1999 |
| EP | 0926913 A2 | 6/1999 |
| EP | 0929202 A1 | 7/1999 |
| EP | 0936749 A1 | 8/1999 |
| EP | 0954112 A2 | 11/1999 |
| EP | 0955734 A2 | 11/1999 |
| EP | 0831669 A3 | 12/1999 |
| EP | 0 982875 A2 | 1/2000 |
| EP | 0971485 A1 | 1/2000 |
| EP | 0978951 A2 | 2/2000 |
| EP | 0978962 A1 | 2/2000 |
| EP | 0993127 A1 | 4/2000 |
| EP | 0839412 B1 | 8/2000 |
| EP | 1035681 A2 | 9/2000 |
| EP | 1047218 A2 | 10/2000 |
| EP | 1063780 A2 | 12/2000 |
| EP | 1065799 A1 | 1/2001 |
| EP | 1069722 A2 | 1/2001 |
| EP | 1075158 A2 | 2/2001 |
| EP | 1077551 A1 | 2/2001 |
| EP | 1085688 A2 | 3/2001 |
| EP | 1093235 A2 | 4/2001 |
| EP | 1091506 A3 | 5/2001 |
| EP | 1124346 A1 | 8/2001 |
| WO | WO95/12943 | 5/1995 |
| WO | WO95/14336 | 5/1995 |
| WO | WO95/28772 | 10/1995 |
| WO | WO96/01544 | 1/1996 |
| WO | WO96/11534 | 4/1996 |
| WO | WO96/37969 | 11/1996 |
| WO | WO96/37970 | 11/1996 |
| WO | WO96/37973 | 11/1996 |
| WO | WO96/37974 | 11/1996 |
| WO | WO96/37975 | 11/1996 |
| WO | WO96 37976 | 11/1996 |
| WO | WO96/38015 | 11/1996 |
| WO | WO97/02666 | 1/1997 |
| WO | WO97/15985 | 5/1997 |
| WO | WO97/21292 | 6/1997 |
| WO | WO97/35384 | 9/1997 |
| WO | WO97/36378 | 10/1997 |
| WO | WO98/10542 | 3/1998 |
| WO | WO98/17026 | 4/1998 |
| WO | WO98/18210 | 4/1998 |
| WO | WO98/24193 | 6/1998 |
| WO | WO98/24199 | 6/1998 |
| WO | WO98/38805 | 9/1998 |
| WO | WO98/45967 | 10/1998 |
| WO | WO98/47243 | 10/1998 |
| WO | WO98/51111 | 11/1998 |
| WO | WO98/59450 | 12/1998 |
| WO | WO99/01946 | 1/1999 |
| WO | WO99/33196 | 6/1999 |
| WO | WO99/35706 | 7/1999 |
| WO | WO99/41871 | 8/1999 |
| WO | WO99/59266 | 11/1999 |
| WO | WO99/66645 | 12/1999 |
| WO | WO00/04652 | 1/2000 |
| WO | WO00/18030 | 3/2000 |
| WO | WO00/49720 | 8/2000 |
| WO | WO00/51260 | 8/2000 |
| WO | WO00/52845 | 9/2000 |
| WO | WO00/54418 | 9/2000 |
| WO | WO00/54427 | 9/2000 |
| WO | WO00/72459 A1 | 11/2000 |
| WO | WO00/72464 A1 | 11/2000 |

| | | | | | | |
|---|---|---|---|---|---|---|
| WO | WO00/72465 A1 | 11/2000 | | WO | WO01/41387 A1 | 6/2001 |
| WO | WO00/72496 A1 | 11/2000 | | WO | WO01/43302 A1 | 6/2001 |
| WO | WO00/79701 A1 | 12/2000 | | WO | WO01/45287 A1 | 6/2001 |
| WO | WO01/01605 A1 | 1/2001 | | WO | WO01/46711 A1 | 6/2001 |
| WO | WO01/03330 A1 | 1/2001 | | WO | WO01/53999 A2 | 7/2001 |
| WO | WO01/13530 A1 | 2/2001 | | WO | WO01/54300 A2 | 7/2001 |
| WO | WO01/22610 A1 | 3/2001 | | WO | WO01/59258 A1 | 8/2001 |
| WO | WO01/22617 A2 | 3/2001 | | WO | WO01/59962 A1 | 8/2001 |
| WO | WO01/28150 A2 | 4/2001 | | | | |
| WO | WO01/29983 A1 | 4/2001 | | | | |
| WO | WO01/29990 A1 | 4/2001 | | | | |

\* cited by examiner

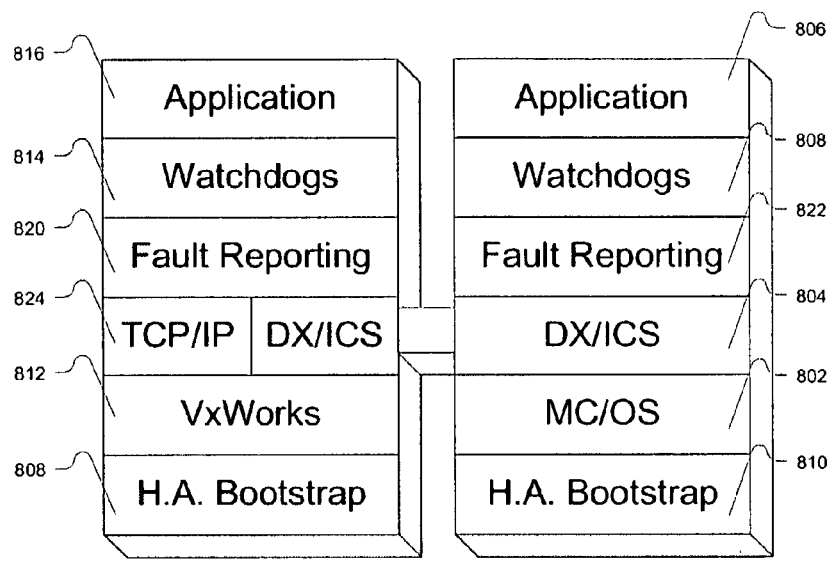
Figure 8    Host 8240    Compute Elements
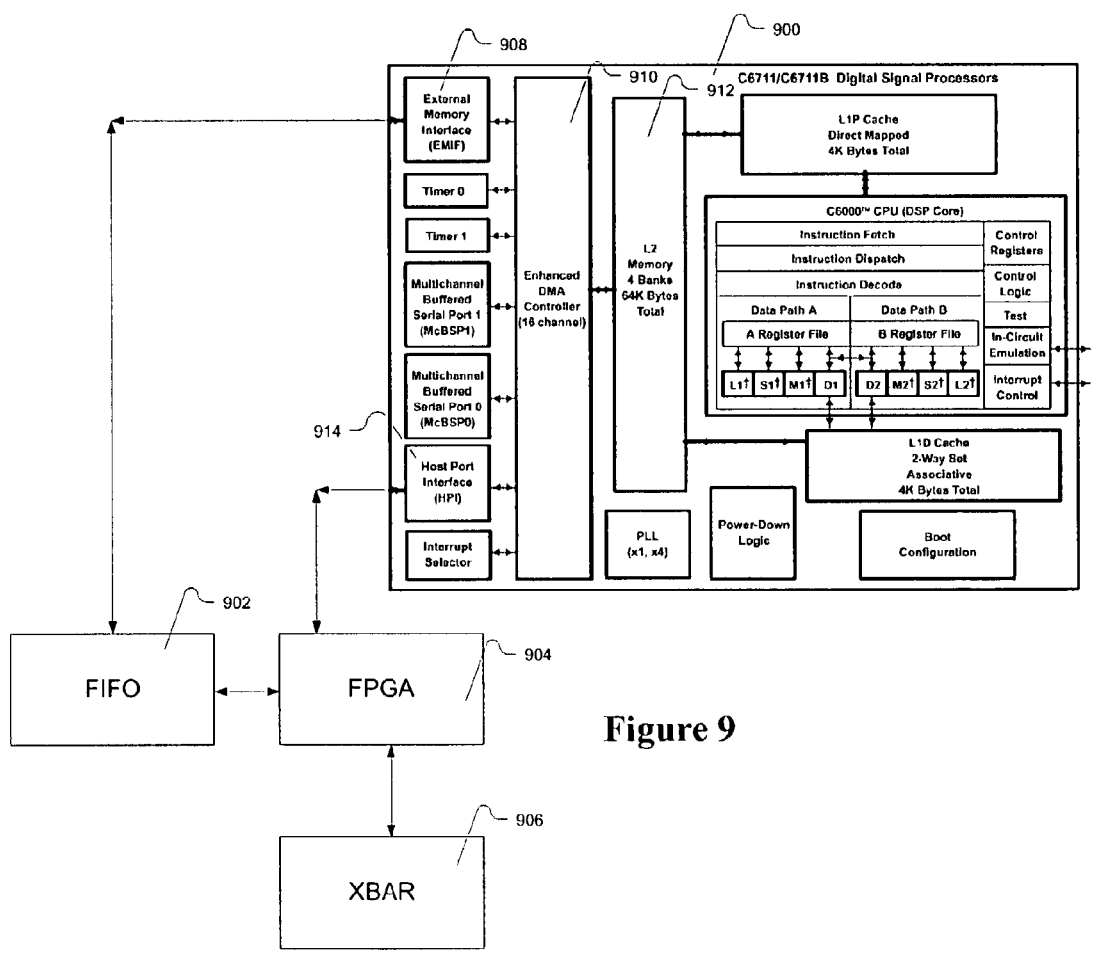
Figure 9

WIRELESS COMMUNICATIONS SYSTEMS AND METHODS FOR MULTIPLE OPERATING SYSTEM MULTIPLE USER DETECTION

This application claims the benefit of priority of (i) U.S. Provisional Application Ser. No. 60/275,846 filed Mar. 14, 2001, entitled "Improved Wireless Communications Systems and Methods"; (ii) U.S. Provisional Application Ser. No. 60/289,600 filed May 7, 2001, entitled "Improved Wireless Communications Systems and Methods Using Long-Code Multi-User Detection'" and (iii) U.S. Provisional Application Ser. No. 60/295,060 filed Jun. 1, 2001 entitled "Improved Wireless Communications Systems and Methods for a Communications Computer," the teachings all of which are incorporated herein by reference.

BACKGROUND OF THE INVENTION

The invention pertains to wireless communications and, more particularly, by way of example, to methods and apparatus providing multiple user detection for use in code division multiple access (CDMA) communications. The invention has application, by way of non-limiting example, in improving the capacity of cellular phone base stations.

Code-division multiple access (CDMA) is used increasingly in wireless communications. It is a form of multiplexing communications, e.g., between cellular phones and base stations, based on distinct digital codes in the communication signals. This can be contrasted with other wireless protocols, such as frequency-division multiple access and time-division multiple access, in which multiplexing is based on the use of orthogonal frequency bands and orthogonal time-slots, respectively.

A limiting factor in CDMA communication and, particularly, in so-called direct sequence CDMA (DS-CDMA), is interference—both that wrought on individual transmissions by buildings and other "environmental" factors, as well that between multiple simultaneous communications, e.g., multiple cellular phone users in the same geographic area using their phones at the same time. The latter is referred to as multiple access interference (MAI). Along with environmental interference, it has effect of limiting the capacity of cellular phone base stations, driving service quality below acceptable levels when there are too many users.

A technique known as multi-user detection (MUD) is intended to reduce multiple access interference and, as a consequence, increases base station capacity. It can reduce interference not only between multiple transmissions of like strength, but also that caused by users so close to the base station as to otherwise overpower signals from other users (the so-called near/far problem). MUD generally functions on the principle that signals from multiple simultaneous users can be jointly used to improve detection of the signal from any single user. Many forms of MUD are discussed in the literature; surveys are provided in Moshavi, "Multi-User Detection for DS-CDMA Systems," IEEE Communications Magazine (October, 1996) and Duel-Hallen et al, "Multiuser Detection for CDMA Systems," IEEE Personal Communications (April 1995). Though a promising solution to increasing the capacity of cellular phone base stations, MUD techniques are typically so computationally intensive as to limit practical application.

An object of this invention is to provide improved methods and apparatus for wireless communications. A related object is to provide such methods and apparatus for multi-user detection or interference cancellation in code-division multiple access communications.

A further related object is to provide such methods and apparatus as provide improved short-code and/or long-code CDMA communications.

A further object of the invention is to provide such methods and apparatus as can be cost-effectively implemented and as require minimal changes in existing wireless communications infrastructure.

A still further object of the invention is to provide methods and apparatus for executing multi-user detection and related algorithms in real-time.

A still further object of the invention is to provide such methods and apparatus as manage faults for high-availability.

SUMMARY OF THE INVENTION

The foregoing and other objects are among those attained by the invention which provides methods and apparatus for multiple user detection (MUD) processing. These have application, for example, in improving the capacity CDMA and other wireless base stations Wireless Communications Systems and Methods for Multiple Processor Based Multiple User Detection One aspect of the invention provides a multiuser communications device for detecting user transmitted symbols in CDMA short-code spread spectrum waveforms. A first processing element generates a matrix (hereinafter, "gamma matrix") that represents a correlation between a short-code associated with one user and those associated with one or more other users. A set of second processing elements generates, e.g., from the gamma matrix, a matrix (hereinafter, "R-matrix") that represents cross-correlations among user waveforms based on their amplitudes and time lags. A third processing element produces estimates of the user transmitted symbols as a function of the R-matrix.

In related aspects, the invention provides a multiuser communications device in which a host controller performs a "partitioning function," assigning to each second processing element within the aforementioned set a portion of the R-matrix to generate. This partitioning can be a function of the number of users and the number of processing elements available in the set. According to related aspects of the invention, as users are added or removed from the spread spectrum system, the host controller performs further partitioning, assigning each second processing element within the set a new portion of the R-matrix to generate.

Further related aspects of the invention provide a multiuser communications device as described above in which the host controller is coupled to the processing elements by way of a multi-port data switch. Still further related aspects of the invention provide such a device in which the first processing element transfers the gamma-matrix to the set of second processing elements via a memory element.

Similarly, the set of second processing elements place the respective portions of the R-matrix in memory accessible to the third processing element via the data switch. Further related aspects of the invention provide devices as described above in which the host controller effects data flow synchronization between the first processing element and the set of second processing elements, as well as between the set of second processing elements and the third processing element.

Wireless Communications Systems and Methods for Contiguously Addressable Memory Enabled Multiple Processor Based Multiple User Detection Another aspect of the invention provides a multiuser communications device for detecting user transmitted symbols in CDMA short-code spread spectrum waveforms in which a set of first processing elements generates a matrix (hereinafter the "R-matrix") that represents cross-correlations among user waveforms based on their amplitudes and time lags. The first processing elements store that matrix to contiguous locations of an associated memory.

Further aspects of the invention provide a device as described above in which a second processing element, which accesses the contiguously stored R-matrix, generates estimates of the user transmitted symbols.

Still further aspects of the invention provide such a device in which a third processing element generates a further matrix (hereinafter, "gamma-matrix") that represents a correlation between a CDMA short-code associated with one user and those associated with one or more other users; this gamma-matrix used by the set of first processing elements in generating the R-matrix. In related aspects, the invention provides such a device in which the third processing element stores the gamma-matrix to contiguous locations of a further memory.

In other aspects, the invention provides a multiuser device as described above in which a host controller performs a "partitioning function" of the type described above that assigning to each processing element within the set a portion of the R-matrix to generate. Still further aspects provide such a device in which the host controller is coupled to the processing elements by way of a multi-port data switch.

Other aspects of the invention provide such a device in which the third processing element transfers the gamma-matrix to the set of first processing elements via a memory element.

Further aspects of the invention provide a multiuser communications device as described above with a direct memory access (DMA) engine that places elements of the R-matrix into the aforementioned contiguous memory locations.

Further aspects of the invention provide methods for operating a multiuser communications device paralleling the operations described above.

Wireless Communications Systems and Methods for Cache Enabled Multiple Processor Based Multiple User Detection Other aspects of the invention provide a multiuser communications device that makes novel use of cache and random access memory for detecting user transmitted symbols in CDMA short-code spectrum waveforms. According to one such aspect, there is provided a processing element having a cache memory and a random access memory. A host controller places in the cache memory data representative of characteristics of the user waveforms. The processing element generates a matrix as a function of the data stored in the cache, and stores the matrix in either the cache or the random access memory.

Further aspects of the invention provide a device as described above in which the host controller stores in cache data representative of the user waveforms short-code sequences. The processing element generates the matrix as a function of that data, and stores the matrix in random access memory.

Still further aspects of the invention provide such a device in which the host controller stores in cache data representative of a correlation of time-lags between the user waveforms and data representative of a correlation of complex amplitudes of the user waveforms. The host controller further stores in random access memory data representing a correlation of short-code sequences for the users waveforms. The processing element generates the matrix as a function of the data and stores that matrix in RAM.

Further aspects of the invention provide a device as described above in which a host controller stores in cache an attribute representative of a user waveform, and stores in random access memory an attributes representing a cross-correlation among user waveforms based on time-lags and complex amplitudes. The processing element generates estimates of user transmitted symbols and stores those symbols in random access memory.

Other aspects of the invention provide such a device in which the host controller transmits the matrix stored in the cache or random access memory of a processing element to the cache or random access memory of a further processing element.

Further aspects of the invention provide a multiuser communications device as described above with a multi-port data switch coupled to a short-code waveform receiver system and also coupled to a host controller. The host controller routes data generated by the receiver system to the processing element via the data switch.

Further aspects of the invention provide methods for operating a multiuser communications device paralleling the operations described above.

Wireless Communications Systems and Methods for Nonvolatile Storage of Operating Parameters for Multiple Processor Based Multiple User Detection Another aspect of the invention provides a multiuser communications device for detecting user transmitted symbols in CDMA short-code spectrum waveforms in which fault and configuration information is stored to a nonvolatile memory. A processing element, e.g. that performs symbol detection, is coupled with random access and nonvolatile memories. A fault monitor periodically polls the processing element to determine its operational status. If the processing element is non-operational, the fault monitor stores information including configuration and fault records, as well at least a portion of data from the processing element's RAM, into the nonvolatile memory.

According to further aspects according to the invention, following detection of the non-operational status, the fault monitor sends to a host controller a reset-request interrupt together with the information stored in the nonvolatile RAM. In turn, the host controller selectively issues a reset command to the processing element. In related aspects, the processing element resets in response to the reset command and transfers (or copies) the data from the nonvolatile memory into the RAM, and therefrom continues processing the data in the normal course.

Further aspects of the invention provide a device as described above in which the processing element periodically signals the fault monitor and, in response, the fault monitor polls the processing element. If the fault monitor does not receive such signaling within a specified time period, it sets the operational status of the processing element to non-operational.

According to a related aspect of the invention, the fault monitor places the processing elements in a non-operational status while performing a reset. The fault monitor waits a time period to allow for normal resetting and subsequently polls the processor to determine its operational status.

Still further aspects of the invention provide a device as described above in which there are a plurality of processing elements, each with a respective fault monitor.

Yet still further related aspects of the invention provide for the fault monitoring a data bus coupled with the processing element.

Further aspects of the invention provide methods for operating a multiuser communications device paralleling the operations described above.

Wireless Communications Systems and Methods for Multiple Operating System Multiple User Detection Another aspect of the invention provides a multiuser communications device for detecting user transmitted symbols in CDMA short-code spectrum waveforms in which a first process operating under a first operating system executes a first set of communication tasks for detecting the user transmitted symbols and a second process operating under a second operating system—that differs from the first operating system—executes a second set of tasks for like purpose. A protocol translator translates communications between the processes. According to one aspect of the invention, the first process generates instructions that determine how the translator performs such translation.

According to another aspect of the invention, the first process sends a set of instructions to the second process via the protocol translator. Those instructions define the set of tasks executed by the second process.

In a related aspect of the invention, the first process sends to the second process instructions for generating a matrix. That can be, for example, a matrix representing any of a correlation of short-code sequences for the user waveforms, a cross-correlation of the user waveforms based on time-lags and complex amplitudes, and estimates of user transmitted symbols embedded in the user waveforms.

Further aspects of the invention provide a device as described above in which the first process configures the second process, e.g., via data sent through the protocol translator. This can include, for example, sending a configuration map that defines where a matrix (or portion thereof) generated by the second process is stored or otherwise directed.

Still further aspects of the invention provide a device as described above in which the first process is coupled to a plurality of second processes via the protocol translator. Each of the latter processes can be configured and programmed by the first process to generate a respective portion of a common matrix, e.g., of the type described above. Further aspects of the invention provide methods for operating a multiuser communications device paralleling the operations described above.

Wireless Communications Systems and Methods for Direct Memory Access and Buffering of Digital Signals for Multiple User Detection Another aspect of the invention provides a multiuser communications device for detecting user transmitted symbols in CDMA short-code spectrum waveforms in which a programmable logic device (hereinafter "PLD") enables direct memory access of data stored in a digital signal processor (hereinafter "DSP"). The DSP has a memory coupled with a DMA controller that is programmed via a host port. The PLD programs the DMA controller via the host port to allow a buffer direct access to the memory.

In a related aspect according to the invention, the PLD programs the DMA controller to provide non-fragmented block mode data transfers to the buffer. From the buffer, the PLD moves the blocks to a data switch that is coupled to processing devices. In a further related aspects according to the invention, the PLD programs the DMA controller to provide fragmented block mode data transfers utilizing a protocol. The PLD provides the protocol which fragments and unfragments the blocks prior to moving them to the data switch.

In further aspects provided by a device as described above, the PLD is implemented as a field programmable gate array that is programmed by a host controller coupled with the data switch. In a related aspect, the PLD is implemented as a application specific integrated circuit which is programmed during manufacture. In still aspects, a device as described above provides for a buffer implemented as a set of registers, or as dual-ported random access memory.

Further aspects of the invention provide methods for operating a multiuser communications device paralleling the operations described above.

Improved Wireless Communications Systems and Methods for Short-Code Multiple User Detection Still further aspects of the invention provide methods for processing short code spread spectrum waveforms transmitted by one or more users including the step of generating a matrix indicative of cross correlations among the waveforms as a composition of (i) a first component that represents correlations among time lags and short codes associated with the waveforms transmitted by the users, and (ii) a second component that represents correlations among multipath signal amplitudes associated with the waveforms transmitted by the users. The method further includes generating detection statistics corresponding to the symbols as a function of the correlation matrix, and generating estimates of the symbols based on those detection statistics.

Related aspects of the invention provided methods as described above in which the first component is updated on a time scale that is commensurate with a rate of change of the time lags associated with the transmitted waveforms, and the second component is updated on a different time scale, i.e., one that is commensurate with a rate of change of the multipath amplitudes associated with these waveforms. In many embodiments, the updating of the second component, necessitated as a result of change in the multipath amplitudes, is executed on a shorter time scale than that of updating the first component.

Other aspects of the invention provide methods as described above in which the first component of the cross-correlation matrix is generated as a composition of a first matrix component that is indicative of correlations among the short codes associated with the respective users, and a second matrix component that is indicative of the waveforms transmitted by the users and the time lags associated with those waveforms.

In a related aspect, the invention provides methods as above in which the first matrix component is updated upon addition or removal of a user to the spread spectrum system. This first matrix component (referred to below as $\Gamma$-matrix) can be computed as a convolution of the short code sequence associated with each user with the short codes of other users.

According to further aspects of the invention, elements of the $\Gamma$-matrix are computed in accord with the relation:

$$\Gamma_{lk}[m] \equiv \frac{1}{2N_l} \sum_{n=0}^{N-1} c_l^*[n] \cdot c_k[n-m]$$

wherein $c_l^*[n]$ represents the complex conjugate of a short code sequence associated with the $l^{th}$ user, $c_k[n-m]$ represents a short code sequence associated with the $k^{th}$ user, N represents a length of the short code sequence, and $N_l$ represent a number of non-zero length of the short code sequence.

In further aspects, the invention provides a method as described above in which the first component of the cross-correlation matrix (referred to below as the C matrix) is obtained as a function of the aforementioned Γ-matrix in accord with the relation:

$$C_{lkqq'}[m'] = \sum_m g[mN_c + \tau] \cdot \Gamma_{lk}[m]$$

wherein g is a pulse shape vector,

Nc is the number of samples per chip,

τ is a time lag, and

Γ represents the Γ matrix, e.g., defined above.

In a related aspect, the cross-correlation matrix (referred to below as the R-matrix) can be generated as a function of the C matrix in accord with the relation:

$$r_{lk}[m'] = \sum_{q=1}^{L}\sum_{q'=1}^{L} \text{Re}\{\hat{a}_{lq}^* a_{kq'} \cdot C_{lkqq'}[m']\} = \text{Re}\{a_l^H \cdot C_{lk}[m'] \cdot a_k\}$$

wherein $\hat{a}_{lq}^*$ is an estimate of $a_{lq}^*$, the complex conjugate of one multipath amplitude component of the $l^{th}$ user, $a_{kq}$, is one multipath amplitude component associated with the $k^{th}$ user, and C denotes the C matrix, e.g., as defined above.

In further aspects, the invention provides methods as described above in which the detection statistics are obtained as a function of the cross-correlation matrix (e.g., the R-matrix) in accord with the relation:

$$y_l[m] = r_{ll}[0]b_l[m] + \sum_{k=1}^{K_v} r_{lk}[-1]b_k[m+1] +$$

$$\sum_{k=1}^{K_v} [r_{lk}[0] - r_{ll}[0]\delta_{lk}]b_k[m] +$$

$$\sum_{k=1}^{K_v} [r_{lk}[1]b_k[m-1] + \eta_l[m]$$

wherein $y_l[m]$ represents a detection statistic corresponding to $m^{th}$ symbol transmitted by the $l^{th}$ user, $r_{ll}[0]b_l[m]$ represents a signal of interest, and remaining terms of the relation represent Multiple Access Interference (MAI) and noise.

In a related aspect, the invention provides methods as described above in which estimates of the symbols transmitted by the users and encoded in the short code spread spectrum waveforms are obtained based on the computed detection statistics by utilizing, for example, a multi-stage decision-feedback interference cancellation (MDFIC) method. Such a method can provide estimates of the symbols, for example, in accord with the relation:

$$\hat{b}_l[m] = \text{sign}\left\{y_l[m] - \sum_{k=1}^{K_v} r_{lk}[-1]\hat{b}_k[m+1] - \right.$$

$$\sum_{k=1}^{K_v} [r_{lk}[0] - r_{ll}[0]\delta_{lk}]\hat{b}_k[m] -$$

$$\left.\sum_{k=1}^{K_v} r_{lk}[1]\hat{b}_k[m-1]\right\}$$

wherein $\hat{b}_l[m]$ represents an estimate of the $m^{th}$ symbol transmitted by the $l^{th}$ user.

Further aspects of the invention provide logic carrying out operations paralleling the methods described above.

Load Balancing Computational Methods in a Short-Code Spread-Spectrum Communications System In further aspects, the invention provides methods for computing the cross-correlation matrix described above by distributing among a plurality of logic units parallel tasks—each for computing a portion of the matrix. The distribution of tasks is preferably accomplished by partitioning the computation of the matrix such that the computational load is distributed substantially equally among the logic units.

In a related aspect, a metric is defined for each partition in accord with the relation below. The metric is utilized as a measure of the computational load associated with each logic unit to ensure that the computational load is distributed substantially equally among the logic units:

$$B_i = A_i - A_{i-1}$$

wherein $A_i$ represents an area of a portion of the cross-correlation matrix corresponding to the $i^{th}$ partition, and i represents an index corresponding to the number of logic units over which the computation is distributed.

In another aspect, the invention provides methods as described above in which the cross-correlation matrix is represented as a composition of a rectangular component and a triangular component. Each area, represented by $A_i$ in the relation above, includes a first portion corresponding to the rectangular component and a second portion corresponding to the triangular component.

Further aspects of the invention provide logic carrying out operations paralleling the methods described above.

Hardware and Software for Performing Computations in a Short-code Spread-spectrum Communications System In other aspects, the invention provides an apparatus for efficiently computing a Γ-matrix as described above, e.g., in hardware. The system includes two registers, one associated with each of $l^{th}$ and $k^{th}$ users. The registers hold elements of the short code sequences associated with the respective user such that alignment of the short code sequence loaded in one register can be shifted relative to that of the other register by m elements. Associated with each of the foregoing registers is one additional register storing mask sequences. Each element in those sequences is zero if a corresponding element of the short code sequence of the associated register is zero and, otherwise, is non-zero. The mask sequences loaded in these further registers are shifted relative to the other by m elements. A logic performs an arithmetic operation on the short code and mask sequences to generate, for $m^{th}$ transmitted symbol, the (l, k) element of the Γ-matrix, i.e., $\Gamma_{lk}[m]$ In a related aspect, the invention provides an apparatus as described above in which the arithmetic operation performed by the logic unit includes, for any two aligned elements of the short code sequences of the $l^{th}$ and $k^{th}$ user and the corresponding elements of the mask sequences, (i) an XOR operation between the short code elements, (ii) an AND operation between the mask elements, (iii) an AND operation between results of the step (i) and step (ii). The result of step (iii) is a multiplier for the aligned elements, which the logic sums in order to generate the (l, k) element of the Γ-matrix.

Further aspects of the invention provide methods paralleling the operations described above.

Improved Computational Methods for Use in a Short-Code Spread-Spectrum Communications System In still further aspects, the invention provides improved computational methods for calculating the aforesaid cross-correlation matrix by utilizing a symmetry property. Methods according to this aspect include computing a first one of two matrices that are related by a symmetry property, and calculating a second one of the two matrices as a function of the first component through application of the symmetry property.

According to related aspects of the invention, the symmetry property is defined in accord with the relation:

$$R_{lk}(m) = \xi R_{k,l}(-m)$$

wherein $R_{lk}(m)$ and $R_{k,l}(m)$ refer to (l, k) and (k, l) elements of the cross-correlation matrix, respectively.

Further aspects of the invention provide methods as described above in which calculation of the cross-correlation matrix further includes determining a C matrix that represents correlations among time lags and short codes associated with the waveforms transmitted by the users, and an R-matrix that represents correlations among multipath signal amplitudes associated with the waveforms transmitted by the users. In related aspects the step of determining the C matrix includes generating a first of two C-matrix components related by a symmetry property. A second of the components is then generated by applying the symmetry property.

Related aspects of the invention provide a method as described above including the step of generating the Γ-matrix in accord with the relation:

$$\Gamma_{lk}[m] \equiv \frac{1}{2N_l} \sum_{n=0}^{N-1} c_l^*[n] \cdot c_k[n-m]$$

wherein $c_l^*[n]$ represents complex conjugate of the short code sequence associated with the lth user, $c_k[n-m]$ represents the short code sequence associated with kth user, N represents the length of the code, and $N_l$ represent the number of non-zero length of the code.

Further aspects of the invention provide logic carrying out operations paralleling the methods described above.

Wireless Communications Systems and Methods for Virtual User Based Multiple User Detection Utilizing Vector Processor Generated Mapped Cross-Correlation Matrices Still further aspects of the invention provide methods for detecting symbols encoded in physical user waveforms, e.g., those attributable to cellular phones, modems and other CDMA signal sources, by decomposing each of those waveforms into one or more respective virtual user waveforms. Each waveform of this latter type represents at least a portion of a symbol encoded in the respective physical user waveforms and, for example, can be deemed to "transmit" a single bit per symbol period. Methods according to this aspect of the invention determine cross-correlations among the virtual user waveforms as a function of one of more characteristics of the respective physical user waveforms. From those cross-correlations, the methods generate estimates of the symbols encoded in the physical user waveforms.

Related aspects of the invention provide methods as described above in which a physical user waveforms is decomposed into a virtual user waveform that represents one or more respective control or data bits of a symbol encoded in the respective physical user waveform.

Other related aspects provide for generating the cross-correlations in the form of a first matrix, e.g., an R-matrix for the virtual user waveforms. That matrix can, according to still further related aspects of the invention, be used to generate a second matrix representing cross-correlations of the physical user waveforms. This second matrix is generated, in part, as a function of a vector indicating the mapping of virtual user waveforms to physical user waveforms.

Further aspects of the invention provide a system for detecting symbols encoded in physical user waveforms that has multiple processors, e.g., each with an associated vector processor, that operates in accord with the foregoing methods to generate estimates of the symbols encoded in the physical user waveforms.

Still other aspects of the invention provide a system for detecting user transmitted symbols encoded in short-code spread spectrum waveforms that generates cross-correlations among the waveforms as a function of block-floating integer representations of one or more characteristics of those waveforms. Such a system, according to related aspects of the invention, utilizes a central processing unit to form floating-point representations of virtual user waveform characteristics into block-floating integer representations. A vector processor, according to further related aspects, generates the cross-correlations from the latter representations. The central processing unit can "reformat" the resulting block-floating point matrix into floating-point format, e.g., for use in generating symbol estimates.

Still further aspects of the invention provide methods and apparatus employing any and all combinations of the foregoing. These and other aspects of the invention, which includes combinations of the foregoing, are evident in the illustrations and in the text that follows.

BRIEF DESCRIPTION OF THE ILLUSTRATED EMBODIMENT

A more complete understanding of the invention may be attained by reference to the drawings, in which:

FIG. 8 are an operational overview of functionality within the host processor and multiple compute nodes in a system according to the invention;

FIG. 9 is a block diagram of an external digital signal processor apparatus used to supply digital signals to the processor board in a system according to the invention;

Figure 15:
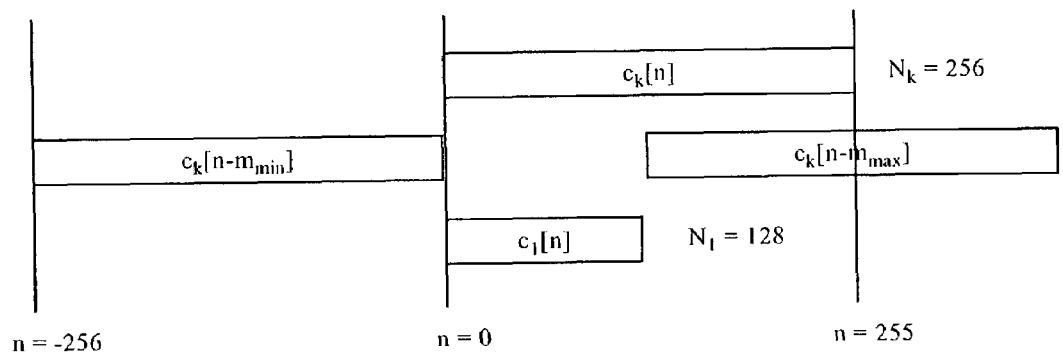
Figure 16:
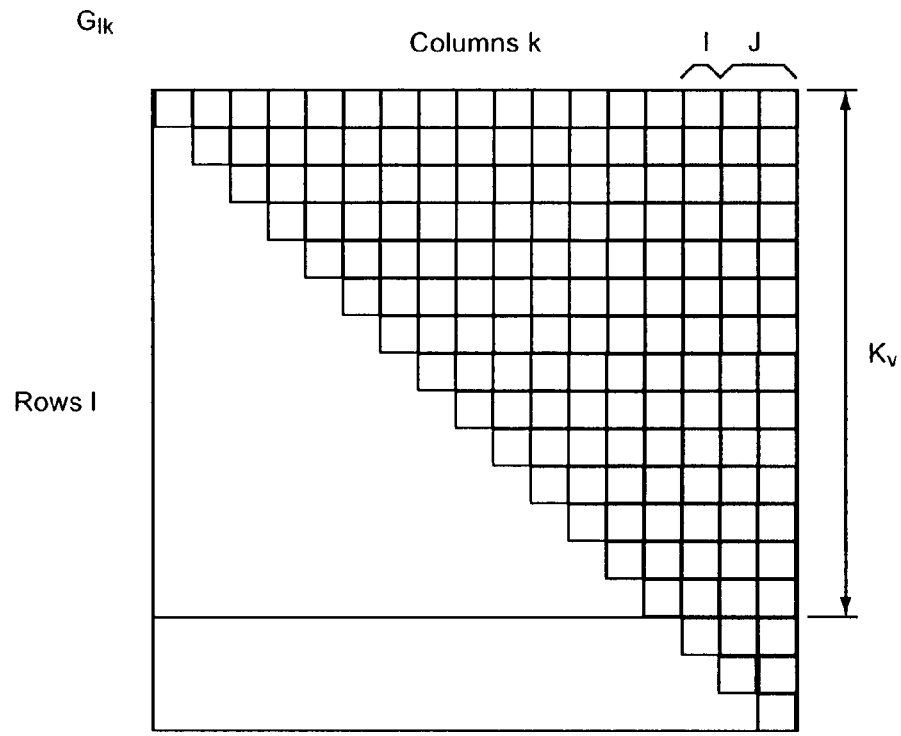
Figure 17:
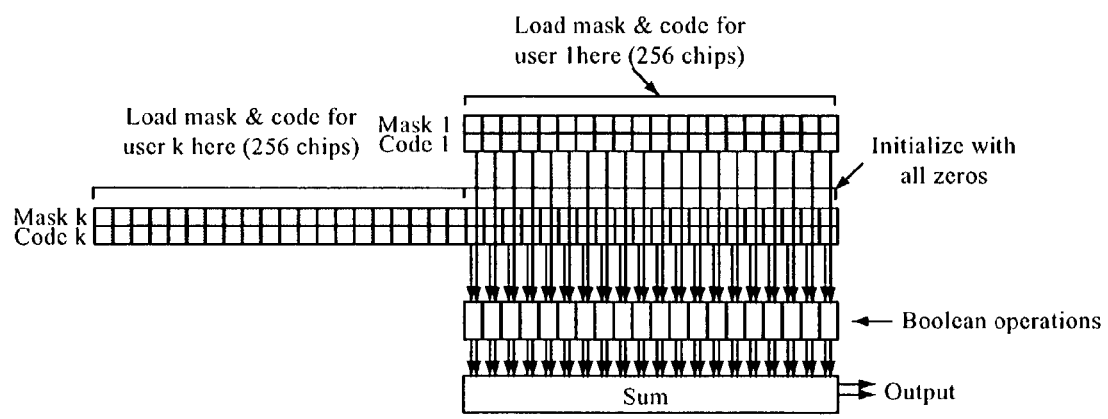
Figure 18:
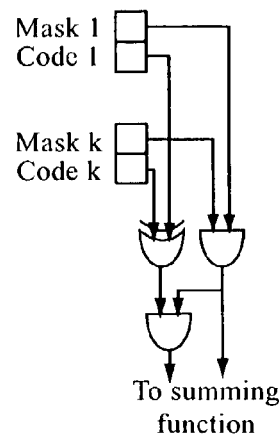
Figure 19:
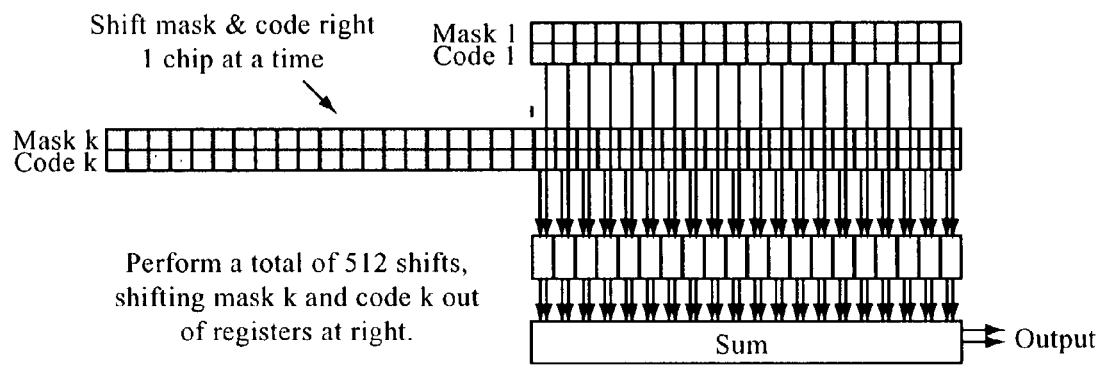
Figure 20:
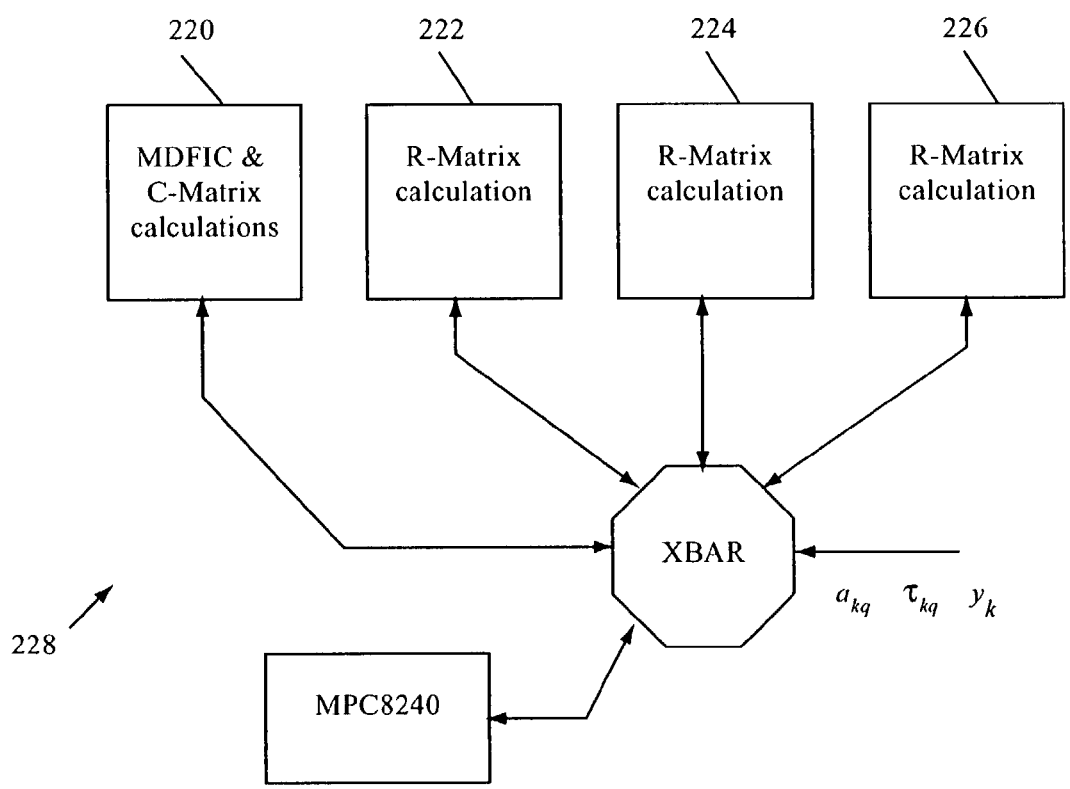
Figure 21:
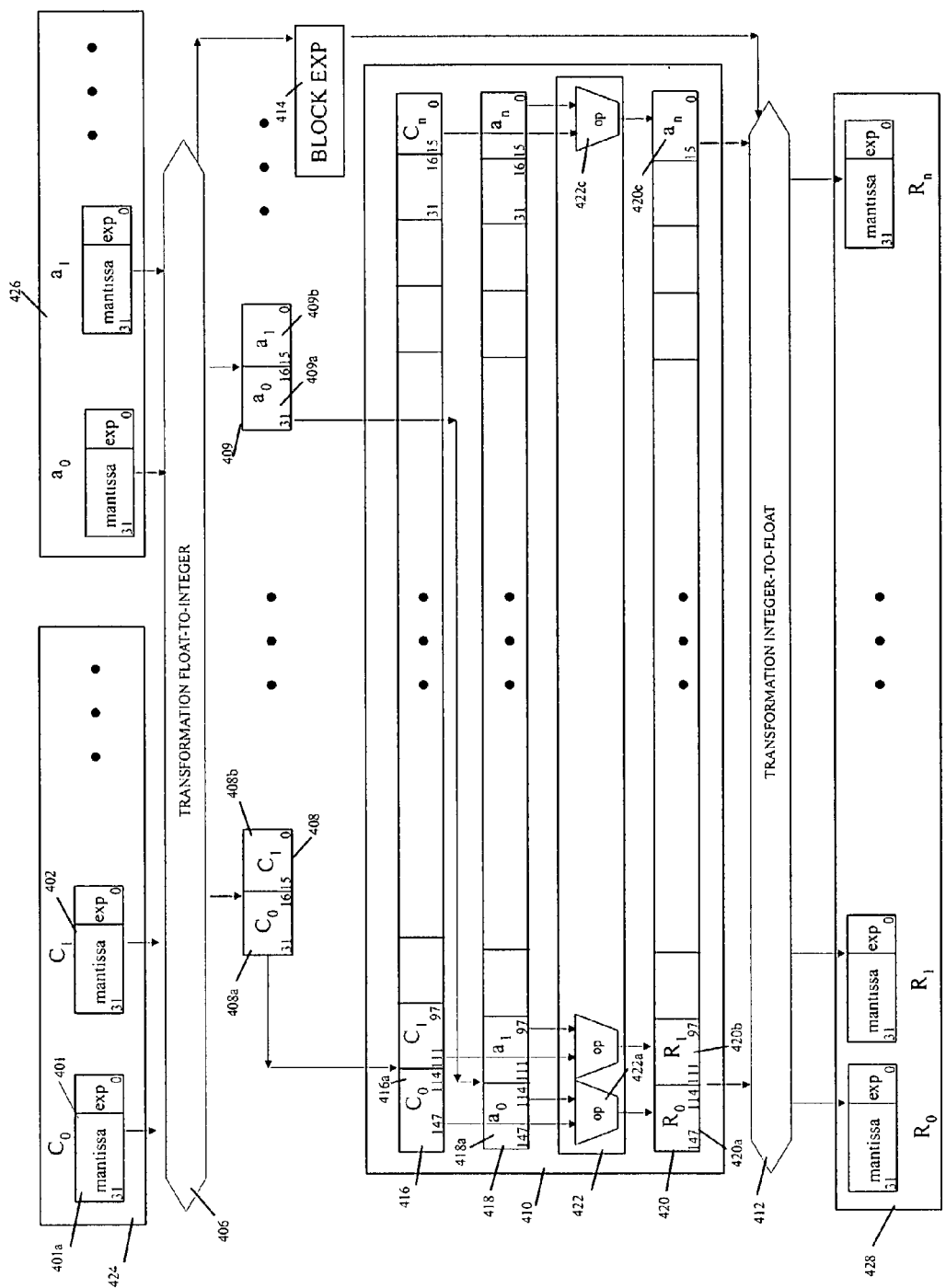

FIG. 15 schematically illustrates a method for defining a common interval for three short-code streams utilized in a FFT calculation of the Γ-matrix;

FIG. 16 schematically illustrates the Γ-matrix elements calculated upon addition of a new physical user to a system according to the invention;

FIGS. 17, 18 and 19 depict hardware calculation of the Γ-matrix in a system according to the invention;

FIG. 20 illustrates parallel computation of the R and C matrices in a system according to the invention;

FIG. 21 depicts a use of a vector processor using integer operands for generating a cross-correlation matrix of virtual user waveforms in a system according to the invention.

DETAILED DESCRIPTION OF THE ILLUSTRATED EMBODIMENT

Code-division multiple access (CDMA) waveforms or signals transmitted, e.g., from a user cellular phone, modem or other CDMA signal source, can become distorted by, and undergo amplitude fades and phase shifts due to phenomena such as scattering, diffraction and/or reflection off buildings and other natural and man-made structures. This includes CDMA, DS/CDMA, IS-95 CDMA, CDMAOne, CDMA2000 1X, CDMA2000 1xEV-DO, WCDMA (or UTMS), and other forms of CDMA, which are collectively referred to hereinafter as CDMA or WCDMA. Often the user or other source (collectively, "user") is also moving, e.g., in a car or train, adding to the resulting signal distortion by alternately increasing and decreasing the distances to and numbers of building, structures and other distorting factors between the user and the base station.

In general, because each user signal can be distorted several different ways en route to the base station or other receiver (hereinafter, collectively, "base station"), the signal may be received in several components, each with a different time lag or phase shift. To maximize detection of a given user signal across multiple tag lags, a rake receiver is utilized. Such a receiver is coupled to one or more RF antennas (which serve as a collection point(s) for the time-lagged components) and includes multiple fingers, each designed to detect a different multipath component of the user signal. By combining the components, e.g., in power or amplitude, the receiver permits the original waveform to be discerned more readily, e.g., by downstream elements in the base station and/or communications path.

A base station must typically handle multiple user signals, and detect and differentiate among signals received from multiple simultaneous users, e.g., multiple cell phone users in the vicinity of the base station. Detection is typically accomplished through use of multiple rake receivers, one dedicated to each user. This strategy is referred to as single user detection (SUD). Alternately, one larger receiver can be assigned to demodulate the totality of users jointly. This strategy is referred to as multiple user detection (MUD). Multiple user detection can be accomplished through various techniques which aim to discern the individual user signals and to reduce signal outage probability or bit-error rates (BER) to acceptable levels.

However, the process has heretofore been limited due to computational complexities which can increase exponentially with respect to the number of simultaneous users. Described below are embodiments that overcome this, providing, for example, methods for multiple user detection wherein the computational complexity is linear with respect to the number of users and providing, by way of further example, apparatus for implementing those and other methods that improve the throughput of CDMA and other spread-spectrum receivers. The illustrated embodiments are implemented in connection with short-code CDMA transmitting and receiver apparatus; however those skilled in the art will appreciate that the methods and apparatus therein may be used in connection with long-code and other CDMA signalling protocols and receiving apparatus, as well as with other spread spectrum signalling protocols and receiving apparatus. In these regards and as used herein, the terms long-code and short-code are used in their conventional sense: the former referring to codes that exceed one symbol period; the latter, to codes that are a single symbol period or less.

Figure 1:
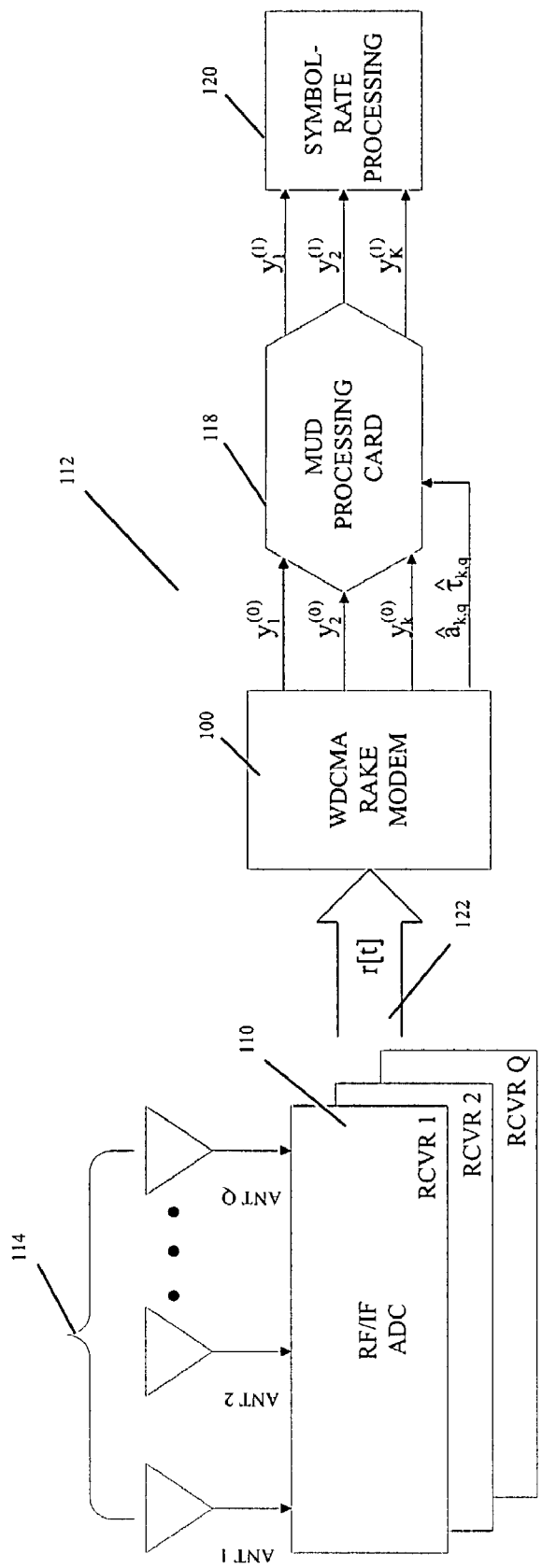
FIG. 1 is a block diagram of components of a wireless base-station utilizing a multi-user detection apparatus according to the invention.

FIG. 1 depicts components of a wireless base station 100 of the type in which the invention is practiced. The base station 100 includes an antenna array 114, radio frequency/intermediate frequency (RF/IF) analog-to-digital converter (ADC), multi-antenna receivers 110, rake modems 112, MUD processing logic 118 and symbol rate processing logic 120, coupled as shown.

Antenna array 114 and receivers 110 are conventional such devices of the type used in wireless base stations to receive wideband CDMA (hereinafter "WCDMA") transmissions from multiple simultaneous users (here, identified by numbers 1 through K). Each RF/IF receiver (e.g., 110) is coupled to antenna or antennas 114 in the conventional manner known in the art, with one RF/IF receiver 110 allocated for each antenna 114. Moreover, the antennas are arranged per convention to receive components of the respective user waveforms along different lagged signal paths discussed above. Though only three antennas 114 and three receivers 110 are shown, the methods and systems taught herein may be used with any number of such devices, regardless of whether configured as a base station, a mobile unit or otherwise. Moreover, as noted above, they may be applied in processing other CDMA and wireless communications signals.

Each RF/IF receiver 110 routes digital data to each modem 112. Because there are multiple antennas, here, Q of them, there are typically Q separate channel signals communicated to each modem card 112.

Generally, each user generating a WCDMA signal (or other subject wireless communication signal) received and processed by the base station is assigned a unique short-code code sequence for purposes of differentiating between the multiple user waveforms received at the basestation, and each user is assigned a unique rake modem 112 for purposes of demodulating the user's received signal. Each modem 112 may be independent, or may share resources from a pool. The rake modems 112 process the received signal components along fingers, with each receiver discerning the signals associated with that receiver's respective user codes. The received signal components are denoted here as $r_{kq}[t]$ denoting the channel signal (or waveform) from the $k^{th}$ user from the $q^{th}$ antenna, or $r_k[t]$ denoting all channel signals (or waveforms) originating from the $k^{th}$ user, in which case $r_k[t]$ is understood to be a column vector with one element for each of the Q antennas. The modems 112 process the received signals $r_k[t]$ to generate detection statistics $y_k^{(0)}[m]$ for the $k^{th}$ user for the mth symbol period. To this end, the modems 122 can, for example, combine the components $r_{kq}[t]$ by power, amplitude or otherwise, in the conventional manner to generate the respective detection statistics $y_k^{(0)}[m]$. In the course of such processing, each modem 112 determines the amplitude (denoted herein as a) of and time lag (denoted herein as τ) between the multiple components of the respective user channel. The modems 112 can be constructed and operated in the conventional manner known in the art, optionally, as modified in accord with the teachings of some of the embodiments below.

The modems 112 route their respective user detection statistics $y_k^{(0)}[m]$, as well as the amplitudes and time lags, to common user detection (MUD) 118 logic constructed and operated as described in the sections that follow. The MUD logic 118 processes the received signals from each modem 112 to generate a refined output, $y_k^{(1)}[m]$, or more generally, $y_k^{(n)}[m]$, where n is an index reflecting the number of times the detection statistics are iteratively or regeneratively processed by the logic 118. Thus, whereas the detection statistic produced by the modems is denoted as $y_k^{(0)}[m]$ indicating that there has been no refinement, those generated by processing the $y_k^{(0)}[m]$ detection statistics with logic 118 are denoted $y_k^{(1)}[m]$, those generated by processing the $y_k^{(1)}[m]$ detection statistics with logic 118 are denoted $y_k^{(2)}[m]$, and so forth. Further waveforms used and generated by logic 118 are similarly denoted, e.g., $r^{(n)}[t]$.

Though discussed below are embodiments in which the logic 118 is utilized only once, i.e., to generate $y_k^{(1)}[m]$ from $y_k^{(0)}[m]$, other embodiments may employ that logic 118 multiple times to generate still more refined detection statistics, e.g., for wireless communications applications requiring lower bit error rates (BER). For example, in some implementations, a single logic stage 118 is used for voice applications, whereas two or more logic stages are used for data applications. Where multiple stages are employed, each may be carried out using the same hardware device (e.g., processor, co-processor or field programmable gate array) or with a successive series of such devices.

The refined user detection statistics, e.g., $y_k^{(1)}[m]$ or more generally $y_k^{(n)}[m]$, are communicated by the MUD process 118 to a symbol process 120. This determines the digital information contained within the detection statistics, and processes (or otherwise directs) that information according to the type of user class for which the user belongs, e.g., voice or data user, all in the conventional manner.

Figure 2:
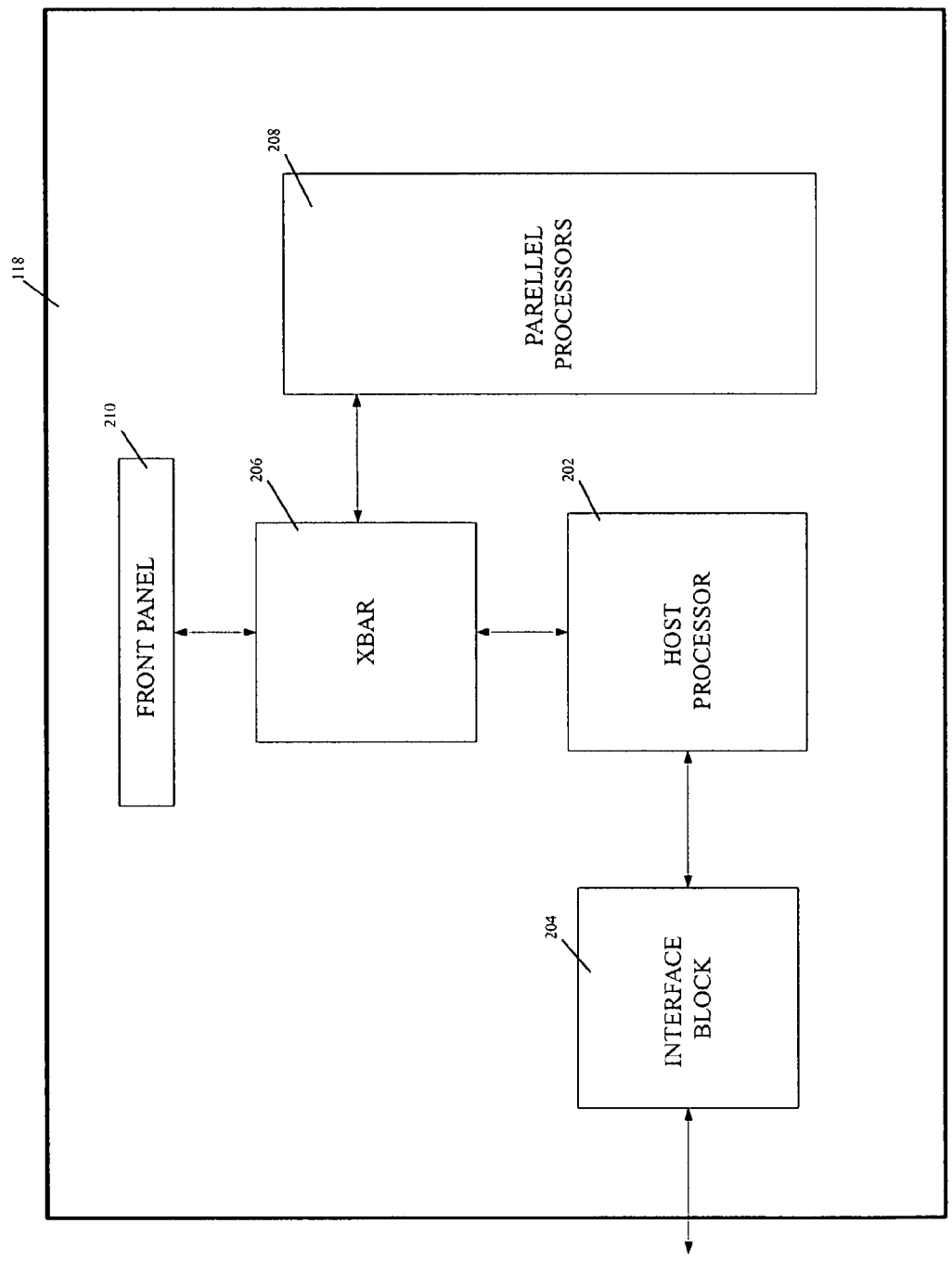
FIG. 2 is a block diagram of components of a multiple user detection processing card according to the invention.

Though the discussion herein focuses on use of MUD logic 118 in a wireless base station, those skilled in the art will appreciate that the teachings hereof are equally applicable to MUD detection in any other CDMA signal processing environment such as, by way of non-limiting example, cellular phones and modems. For convenience, such cellular base stations other environments are referred to herein as "base stations." Multiple User Detection Processing Board FIG. 2 depicts a multiple user detection (MUD) processing card according to the invention. The illustrated processing card 118 includes a host processor 202, an interface block 204, parallel processors 208, a front panel device 210, and a multi-channel cross-over device 206 (hereinafter "Crossbar"). Although these components are shown as separate entities, one skilled in the art can appreciate that different configurations are possible within the spirit of the invention. For example, the host processor 202 and the interface block 204 can be integrated into a single assemble, or multiple assemblies.

The processing card 118 processes waveform and waveform components received by a base station, e.g., from a modem card 112 or receiver 110 contained within the base station, or otherwise coupled with the base station. The waveform typically includes CDMA waveforms, however the processing card 118 can also be configured for other protocols, such as TDMA and other multiple user communication techniques. The processing card 118 performs multiple user detection (MUD) on the waveform data, and generates a user signal corresponding to each user, with includes less interference than within the received signals.

The illustrated processing card 118 is a single board assembly and is manufactured to couple (e.g., electrically and physically mate) with a conventional base station (e.g., a modem card 112, receiver 110 or other component). The board assembly illustrated conforms to a ¾ form factor modem payload card of the type available in the marketplace. The processor card 118 is designed for retrofitting into existing base stations or for design into new station equipment. In other embodiments, the processing card can be either single or multiple assemblies.

The host processor 202 routes data from the interface block 204 to and among the parallel processors 208, as well as performs fault monitoring and automated resets, data transfer, and processor loading of the parallel processors 208. The host processor 202 also processes output received from the parallel processors 208, and communicates the processed output to the interface block 204 for subsequent return to the base station.

The parallel processors 202 process waveforms and waveform components routed from the host processor 206. Typically, the parallel processors 202 process the waveform components, and communicate the processed data back to the host processor 202 for further processing and subsequent transmission to the base station, however, the intermediate processed waveforms can be communicated to other parallel processors or directly to the base station.

The crossbar 206 is a communication switch which routes messages between multiple devices. It allows multiple connection data ports to be connection with other data ports. In the illustrated embodiment, the crossbar 206 provides eight ports, where a port can be "connected" to any other port (or to multiple ports) to provide communication between those two (or indeed, multiple) ports. Here, the crossbar 206 is a RACEway™ switch of the type commercially available from the assignee hereof. In other embodiments, other switching elements, whether utilizing the RACEway™ protocol or otherwise, may be used, e.g., PCI, I2C and so on. Indeed, in some embodiments, the components communicate along a common bus and/or are distributed via over a network.

A front panel 210 is used to monitor the processor card and can be used to apply software patches, as well as perform other maintenance operations. Additionally, the front panel 210 can be used to monitor fault status and interface connections through a series of LED indicators, or other indicators. Illustrated front panel interfaces with the board via the RACEway™ switch and protocol, though other interface techniques may be used as well.

Figure 3:
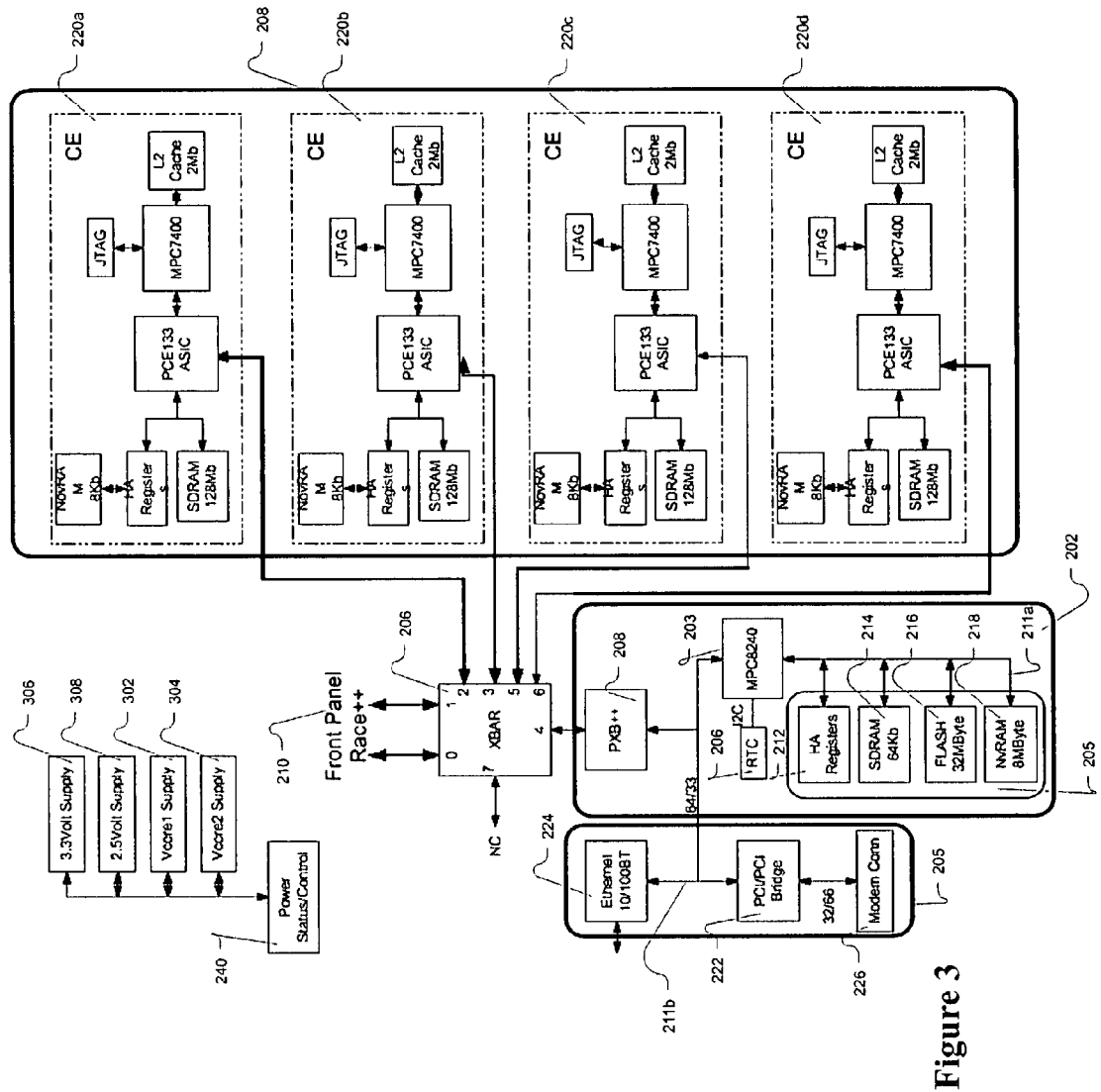
FIG. 3 is a more detailed view of the processing board of FIG. 2.

FIG. 3 depicts further details of the processor card of FIG. 2. The illustrated processor card includes a host processor 202 in communication with an interface block 205 and a set of parallel processors 208 (hereinafter "compute elements") as described above, as well as a crossbar 206 and a front panel 210. Further, a power status/control device 240 is assembled on the processor card 118. However, in other embodiments, the power status/control device 240 can be within the base station or elsewhere.

The host processor 202 includes a host controller 203 with an integrated processor containing a peripheral logic block and a 32-bit processor core. The host controller 203 is coupled with various memory devices 205, a real time clock 206, and a protocol translator 208. In the illustrated embodiment, the host controller 203 can be a Motorola PowerPC 8240 commercially available, but it will be appreciated by one skilled in the art that other integrated processors (or even non-integrated processors) can be used which satisfy the requirements herein.

The host controller 203 controls data movement within the processor card 118 and between the processor card and the base station. It controls the crossbar device 206 by assigning the connection between connection ports. Further, the host controller 203 applies functionality to the output generated by the parallel processors 208. The host controller 203 includes a monitor/watchdog sub-system which monitors the perform ace of the various components within the processor card, and can issue resets to the components. In some embodiments, these functions can be provided (or otherwise assisted) by application specific integrated circuits or field programmable gate arrays.

The host controller 203 integrates a PCI bus 211a, 211b for data movement with the memory devices 205 and the interface block 205, as well as other components. The PCI bus 211a, 211b is capable of 32-bit or 64-bit data transfers operating at 33 MHz, or alternatively 66 MHz speeds, and supports access to PCI memory address spaces using either (or both) little and/or big endian protocols.

Memory devices used by the host controller 203 include HA Registers 212, synchronous dynamic random access memory (SDRAM) 214, Flash memory 216, and Non-Volatile Ram (NVRAM) 218. As will be evident below, each type of memory is used for differing purposes.

The HA registers 212 store operating status (e.g., faults) for the parallel processors 208, the power status/control device 240, and other components. A fault monitoring sub-system "watchdog" writes both software and hardware status into the HA registers 212, from which the host controller 203 monitors the registers 212 to determine the operational status of the components. The HA registers 212 are mapped into banked memory locations, and are thereby addressable as direct access registers. In some embodiments, the HA registers 212 can be integrated with the host controller 203 and still perform the same function.

The SDRAM 214 stores temporary application and data. In the illustrated embodiment, there is 64 Kbytes of SDRAM 214 available to support transient data, e.g., intermediary results from processing and temporary data values. The SDRAM 214 is designed to be directly accessed by the host controller 203 allowing for fast DMA transfers.

The flash memory 216 includes two Intel StrataFlash devices, although equivalent memory devices are commercially available. It stores data related to component performance data, and intermediate data which can be used to continue operation after resets are issued. The flash memory is blocked at 8 Kbyte boundaries, but in other embodiments, the block size can vary depending on the addressing capabilities of the host controller 203 and method of communication with the memory devices. Further, because flash memory requires no power source to retain programmed memory data, its data can be used for diagnostic purposes even in the event of power-failures.

NVRAM is, to an extent, reserved for fault record data and configuration information. Data stored within the NVRAM 218, together with the flash memory 216 is sufficient to reproduce the data within the SDRAM 218 upon system (or board level, or even component level) reset. If a component is reset during operation, the host controller 203 can continue operation without the necessity of receiving additional information from the base station via the data stored in the NVRAM. The NVRAM 218 is coupled to the host controller 203 via a buffer which converts the voltage of the PCI bus 211a from 3.3v to 5v, as required by the NVRAM 218, however this conversion is not necessary in other embodiments with different memory configurations.

The interface block 205 includes a PCI bridge 222 in communication with an Ethernet interface 224 and a modem connection 226. The PCI bridge 222 translates data received from the PCI bus 211b into a protocol recognized by the base station modem card 112. Here, the modem connection 226 operates with a 32-bit interface operating at 66 MHz, however, in other embodiments the modem can operate with different characteristics. The Ethernet connection 224 can operate at either 10 Mbytes/Sec or 100 Mbytes/Sec, and is therefore suited for most Ethernet devices. Those skilled in the art can appreciate that these interface devices can be interchanged with other interface devices (e.g., LAN, WAN, SCSI and the like).

The real-time clock 206 supplies timing for the host controller 203 and the parallel processors 208, and thus, synchronizes data movement within the processing card. It is coupled with the host controller 203 via an integrated I2C bus (as established by Phillips Corporation, although in other embodiments the clock can be connected via other electrical coupling). The real-time clock 206 is implemented as a CMOS device for low power consumption. The clock generates signals which control address and data transfers within the host controller 203 and the multiple processors 208.

A protocol converter 208 (hereinafter "PXB") converts PCI protocol used by the host controller 203 to RACEway™ protocol used by the parallel processors 208 and front panel 210. The PXB 208 contains a field programmable gate array ("FPGA") and EEPROM which can be programmed from the PCI bus 211b. In some embodiments, the PXB 208 is programmed during manufacture of the processing card 118 to contain configuration information for the related protocols and/or components with which it communicates. In other embodiments, the PXB 208 can use other protocols as necessary to communicate with the multiple processors 208. Of course, if the host controller 203 and the multiple processors 208 use the same protocol, there is no protocol conversion necessary and therefore the PXB is not required.

The multiple-port communication device 206 (hereinafter "crossbar") provides communication between all processing and input/output elements on the processing card 118. In the illustrated embodiment, the crossbar 206 is an EEPROM device which can be read and programmed by a RACEway™ compatible component (e.g., the front panel 210 or parallel processors 208), but it is typically programmed initially during manufacture. An embedded ASIC device controls the EEPROM programming, and hence, the function of the crossbar 206.

The crossbar 206 in the illustrated provides up to three simultaneous 266-Mbytes/Sec throughput data paths between elements for a total throughput of 798 Mbytes/Sec, however, in other embodiments the actual throughput varies according to processing speed. Here, two crossbar ports (e.g., ports 0 and 1) connect to a bridge FPGA which further connect to the front panel 210. Each of the multiple processors use an crossbar port (e.g., ports 2, 3, 5, and 6), and the interface block 224 and host controller 203 share one crossbar port (e.g., port 4) via the PXB 206. The number of ports on the crossbar 206 depends on the number of parallel processors and other components that are in communication.

The multiple processors 208 in the illustrated embodiment include four compute elements 220a-220d (hereinafter, reference to element 220 refers to a general compute element, also referred to herein as a "processing element" or "CE"). Each processing element 220 applies functionality on data, and generates processed date in the form of a matrix, vector, or waveform. The processing elements 220 can also generate scalar intermediate values. Generated data is passed to the host controller 208, or to other processing elements 220 for further processing. Further, individual processing elements can be partitioned to operate in series (e.g., as a pipeline) or in parallel with the other processing elements.

A processing element 220 includes a processor 228 coupled with a cache 230, a Joint Test Action Group (hereinafter "JTAG") interface 232 with an integrated programming port, and an application specific integrated circuit 234 (hereinafter "ASIC"). Further, the ASIC 234 is coupled with a 128 Mbyte SDRAM device 236 and HA Registers 238. The HA Registers are coupled with 8 Kbytes of NVRAM 244. In the illustrated embodiment the compute elements 220 are on the same assembly as the host controller 203. In other embodiments, the compute nodes 220 can be separate from the host controller 203 depending on the physical and electrical characteristics of the target base station.

The compute node processors 228 illustrated are Motorola PowerPC 7400, however in other embodiments the processor can be other processor devices. Each processor 228 uses the ASIC 234 to interface with a RACEway™ bus 246. The ASIC 234 provides certain features of a compute node 220, e.g., a DMA engine, mail box interrupts, timers, page mapping registers, SDRAM interface and the like. In the illustrated embodiment the ASIC is programmed during manufacture, however, it can also be programmed in the field, or even at system reset in other embodiments.

The cache 230 for each compute node 220 stores matrices that are slow-changing or otherwise static in relation to other matrices. The cache 230 is pipelined, single-cycle deselect, synchronous burst static random access memory, although in other embodiments high-speed RAM or similar devices can be used. The cache 230 can be implemented using various devices, e.g., multiple 64 Kbyte devices, multiple 256 Kbyte devices, and so on.

Architecture Pairing of Processing Nodes with NVRAM and Watchdog; Majority Voter The HA registers 238 store fault status for the software and/or hardware of the compute element 220. As such, it responds to the watchdog fault monitor which also monitors the host controller 203 and other components. The NVRAM 244 is, much like the NVRAM coupled with the host controller 203, stores data from which the current state of the compute element 220 can be recreated should a fault or reset occur. The SDRAM 236 is used for intermediate and temporary data storage, and is directly addressable from both the ASIC 234 and the processor 228. These memory devices can be other devices in other embodiments, depending on speed requirements, throughput and computational complexity of the multiple user detection algorithms.

NVRAM is also used to store computational variables and data such that upon reset of the processing element or host controller, execution can be re-started without the need to re-fresh the data. Further, the contents of NVRAM can be used to diagnose fault states and/or conditions, thus aiding to a determination of the cause of fault state.

As noted above, a "watchdog" monitors performance of the processing card 118. In the illustrated embodiment, there are five independent "watchdog" monitors on the processing card 118 (e.g., one for the host controller 203 and one each for each compute node 220a-220d, and so on). The watchdog also monitors performance of the PCI bus as well as the RaceWay bus connected with each processing element and the data switch. The RACEWay bus includes out-of-band fault management coupled with the watchdogs.

Each component periodically strobes its watchdog at least every 20 msec but not faster that 500 microseconds (these timing parameters vary among embodiments depending on overall throughput of the components and clock speed). The watchdog is initially strobed approximately two seconds after the initialization of a board level reset, which allows for start-up sequencing of the components without cycling erroneous resets. Strobing the watchdog for the processing nodes is accomplished by writing a zero or a one sequence to a discrete word (e.g., within the HA Register 212) originating within each compute element 220a-220d, the host controller 203, and other components). The watchdog for the host controller 203 is serviced by writing to the memory mapped discrete location FFF_D027 which is contained within the HA Registers 212.

The watchdog uses five 8-bit status registers within the HA registers 212, and additional registers (e.g., HA registers 238) within each compute node 220. One register represents the host controller 203 status, and the other four represent each compute node 220a-220d status. Each register has a format as follows:

| Bit | Name | Description |
| --- | --- | --- |
| 0 | CHECKSTOP_OUT | Checkstop state of CPU (0 = CPU in checkstop) |
| 1 | WDM_FAULT | WDM failed (0 = WDM failed, set high after reset and valid service) |
| 2 | SOFTWARE_FAULT | Software fault detected (Set to 0 when a software exception was detected) (R/W local) |
| 3 | RESETREQ_IN | Wrap status of the local CPU's reset request |
| 4 | WDM_INIT | WDM failed in initial 2 second window (0 = WDM failed) |
| 5 | Software definable 0 | Software definable 0 |
| 6 | Software definable 1 | Software definable 1 |
| 7 | Unused | Unused |

The five registers reflect status information for all processors within the processing board 118, and allow the host controller 203 to obtain status of each without the need for polling the processor individually (which would degrade performance and throughput). Additionally, the host controller 203 and each compute node processor 228 has a fault control register which contains fault data according to the following format:

| Bit | Name | Description |
|---|---|---|
| 0 | RESETREQ_OUT_0 | Request a reset event (0 => forces reset) |
| 1 | CHKSTOPOUT_0 | Request that node 0 enter checkstop state (0 => request checkstop) |
| 2 | CHKSTOPOUT_1 | Request that node 1 enter checkstop state (0 => request checkstop) |
| 3 | CHKSTOPOUT_2 | Request that node 2 enter checkstop state (0 => request checkstop) |
| 4 | CHKSTOPOUT_3 | Request that node 3 enter checkstop state (0 => request checkstop) |
| 5 | CHKSTOPOUT_8240 | Request that the host controller enter checkstop state (0 => request checkstop) |
| 6 | Software definable 0 | Software definable 0 |
| 7 | Software definable 1 | Software definable 1 |

A single write of any value will strobe the watchdog. Upon events such as power-up, the watchdogs are initialized to a fault state. Once a valid strobe is issued, the watchdog executes and, if all elements are properly operating, writes a no-fault state to the HA register 212. This occurs within the initial two-second period after board level reset. If a processor node fails to service the watchdog within the valid time frame, the watchdog records a fault state. A watchdog of a compute node 220 in fault triggers an interrupt to the host controller 203. If a fault is within the host controller 203, then the watchdog triggers a reset to the board. The watchdog then remains in a latched failed state until a CPU reset occurs followed by a valid service sequence.

Each processor node ASIC 234 accesses a DIAG3 signal that is wired to an HA register, and is used to strobe the compute element's hardware watchdog monitor. A DIAG2 signal is wired to the host processor's embedded programmable interrupt controller (EPIC) and is used by a compute element to generate a general purpose interrupt to the host controller 203.

A majority voter (hereinafter "voter") is a dual software sub-system state machine that identifies faults within each of the processors (e.g., the host controller 230 and each compute node 220a-220d) and also of the processor board 118 itself. The local voter can reset individual processors (e.g., a compute node 220) by asserting a CHECKSTOP_IN to that processor. The board level voter can force a reset of the board by asserting a master reset, wherein all processors are reset. Both voters follow a rule set that the output will follow the majority of non-checkstopped processors. If there are more processors in a fault condition than a non-fault condition, the voter will force a board reset. Of course, other embodiments may use other rules, or can use a single sub-system to accomplish the same purpose.

Figure 4:
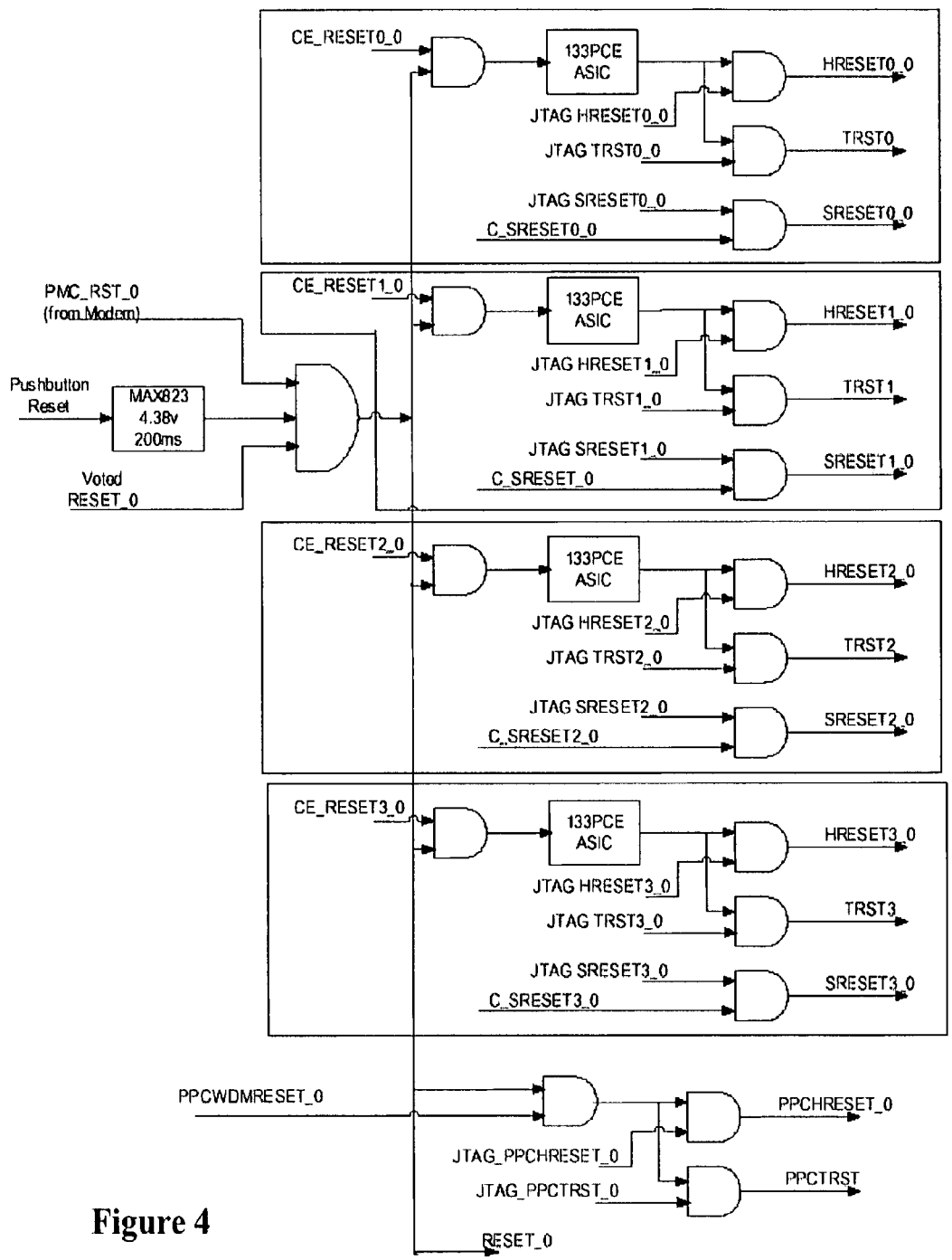
FIG. 4 depicts a majority-voter sub-system in a system according to the invention.

A majority voter is illustrated in FIG. 4. Board level resets are initiated from a variety of sources. One such source is a voltage supervisor (e.g., the power status/control device 240) which can generate a 200 ms reset if the voltage (e.g., VCC) rises above a predetermined threshold, such as 4.38 volts (this is also used in the illustrated embodiment in a pushbutton reset switch 406, however, the push button can also be a separate signal). The board level voter will continue to drive a RESET_0 408 until both the voltage supervisor 404 and the PCI_RESET_0 410 are de-asserted. Either reset will generate the signal RESET_0 412 which resets the card into a power-on state. RESET_0 412 also generates HRESET_0 414 and TRST 416 signals to each processor. Further, a HRESET_0 and TRSTcan be generated by the JTAG ports using a JTAG_HRESET_0 418 and JTAG_TRST 420 respectively. The host controller 203 can generate a reset request, a soft reset (C_SRESET_0 422) to each processor, a check-stop request, and an ASIC reset (CE_RESET_0 424) to each of the four compute element's ASIC. A discrete word from the 5v-powered reset PLD will generate the signal NPORESET_1 (not a power on reset). This signal is fed into the host processor discrete input word. The host processor will read this signal as logic low only if it is coming out of reset due to either a power condition or an external reset from off board. Each compute element, as well as the host processor can request a board level reset. These requests are majority voted, and the result RESET-VOTE_0 will generate a board level reset.

Each compute node processor 228 has a hard reset signal driven by three sources gated together: a HRESET_0 pin 426 on each ASIC, a HRESET_0 418 from the JTAG connector 232, and a HRESET_0 412 from the majority voter. The HRESET_0 pin 426 from the ASIC is set by the "node run" bit field (bit 0) of the ASIC Miscon_A register. Setting HRESET_0 426 low causes the node processor to be held in reset. HRESET_0 426 is low immediately after system reset or power-up, the node processor is held in reset until the HRESET_0 line is pulled high by setting the node run bit to 1. The JTAG HRESET_0 418 is controlled by software when a JTAG debugger module is connected to the card. The HRESET_0 412 from the majority voter is generated by a majority vote from all healthy nodes to reset.

When a processor reset is asserted, the compute processor 228 is put into reset state. The compute processor 228 remains in a reset state until the RUN bit 0 of the Miscon_A register is set to 1 and the host processor has released the reset signals in the discrete output word. The RUN bit is set to 1 after the boot code has been loaded into the SDRAM starting at location 0x0000_0100. The ASIC maps the reset vector 0xFFF0_0100 generated by the MPC7400 to address 0x0000_0100.

Turning now to discuss memory devices 205 coupled with the host controller 203, the memory devices are addressable by the host controller 203 as follows. The host controller 203 addresses the memory devices (e.g., the HA registers 212, SDRAM 214, Flash 216 and NVRAM 218) using two address mapping configurations designated as address map A and address map B, although other configurations are possible. Address map A conforms to the PowerPC reference platform (PreP) specification (however, if other host controllers are used, map A conforms with a native reference platform to that host controller). Address map B conforms to the host controller 203 common hardware reference platform (CHRP).

Support of map A is provided for backward compatibility, and further supports any retrofitting of existing base station configurations. The address space of map B is divided into four areas: system memory, PCI memory, PCI Input/Output (I/O), and system ROM space. When configured for map B, the host controller translates addresses across the internal peripheral logic bus and the external PCI bus as follows:

| Processor Core Address Range | | | | | |
|---|---|---|---|---|---|
| Hex | | Decimal | | PCI Address Range | Definition |
| 0000_0000 | 0009_FFFF | 0 | 640 K – 1 | NO PCI CYCLE | System memory |
| 000A_0000 | 000F_FFFF | 640 K | 1 M – 1 | 000A_0000–000FF_FFF | Compatibility hole |
| 0010_0000 | 3FFF_FFFF | 1 M | 1 G – 1 | N0 PCI CYCLE | System memory |
| 4000_0000 | 7FFF_FFFF | 1 G | 2 G – 1 | N0 PCI CYCLE | Reserved |
| 8000_0000 | FCFF_FFFF | 2 G | 4 G – 48 M – 1 | 8000_0000–FCFF_FFFF | PCI memory |
| FD00_0000 | FDFF_FFFF | 4 G – 48 M | 4 G – 32 M – 1 | 0000_0000–00FF_FFFF | PCI/ISA memory |
| FE00_0000 | FE7F_FFFF | 4 G – 32 M | 4 G – 24 M – 1 | 0000_0000–007F_FFFF | PCI/ISA I/O |
| FE80_0000 | FEBF_FFFF | 4 G – 24 M | 4 G – 20 M – 1 | 0080_0000–00BF_FFFF | PCI I/O |
| FEC0_0000 | FEDF_FFFF | 4 G – 20 M | 4 G – 18 M – 1 | CONFIG_ADDR | PCI configuration address |
| FEE0_0000 | FEEF_FFFF | 4 G – 18 M | 4 G – 17 M – 1 | CONFIG_DATA | PCI configuration data |
| FEF0_0000 | FEFF_FFFF | 4 G – 17 M | 4 G – 16 M – 1 | FEF0_0000–FEFF_FFFF | PCI interrupt acknowledge |
| FF00_0000 | FF7F_FFFF | 4 G – 16 M | 4 G – 8 M – 1 | FF00_0000–FF7F_FFFF | 32/64-bit Flash/ROM |
| FF80_0000 | FFFF_FFFF | 4 G – 8 M | 4 G – 1 | FF80_0000–FFFF_FFFF | 8/32/64-bit Flash/ROM |

In the illustrated embodiment, hex address FF00_0000 through FF7F_FFFF is not used, and hence, that bank of Flash ROM is not used. The address of FF80_0000 through FFFF_FFFF is used, as the Flash ROM is configured in 8-bit mode and is addressed as follows:

| Bank Select | Processor Core Address Range | | Definition |
|---|---|---|---|
| 11111 | FFE0_0000 | FFEF_FFFF | Accesses Bank 0 |
| 11110– 00001 | FFE0_0000 | FFEF_FFFF | Application code (30 pages) |
| 00000 | FFE0_0000 | FFEF_FFFF | Application/boot code |
| XXXX | FFF0_0000 | FFFF_CFFF | Application/boot code |
| | FFFF_D000 | FFFF_D000 | Discrete input word 0 |
| | FFFF_D001 | FFFF_D001 | Discrete input word 1 |
| | FFFF_D002 | FFFF_D002 | Discrete output word 0 |
| | FFFF_D003 | FFFF_D003 | Discrete output word 1 |
| | FFFF_D004 | FFFF_D004 | Discrete output word 2 |
| | FFFF_D010 | FFFF_D010 | IC (Pending interrupt) |
| | FFFF_D011 | FFFF_D011 | IC (Interrupt mask low) |
| | FFFF_D012 | FFFF_D012 | IC (Interrupt clear low) |
| | FFFF_D013 | FFFF_D013 | IC (Unmasked, pending low) |
| | FFFF_D014 | FFFF_D014 | IC (Interrupt input low) |
| | FFFF_D015 | FFFF_D015 | Unused (read FF) |
| | FFFF_D016 | FFFF_D016 | Unused (read FF) |
| | FFFF_D017 | FEFF_D017 | Unused (read FF) |
| | FFFF_D018 | FFFF_D018 | Unused (read FF) |
| | FFFF_D019 | FFFF_D019 | Unused (read FF) |
| | FFFF_D020 | FFFF_D020 | HA (Local HA register) |
| | FFFF_D021 | FFFF_D021 | HA (Node 0 HA register) |
| | FFFF_D022 | FFFF_D022 | HA (Node 1 HA register) |
| | FFFF_D023 | FFFF_D023 | HA (Node 2 HA register) |
| | FFFF_D024 | FFFF_D024 | HA (Node 3 HA register) |
| | FFFF_D025 | FFFF_D025 | HA (8240 HA register) |
| | FFFF_D026 | FFFF_D026 | HA (Software Fail) |
| | FFFF_D027 | FFFF_D027 | HA (Watchdog Strobe) |
| | FFFF_D028 | FFFF_DFFF | 4068 Bytes Flash |
| | FFFF_E000 | FFFF_FFFF | 8K NVRAM |

Address FFEF_0000 through FFEF_FFFF contains 30 pages, and is used for application and boot code, as selected by the Flash bank bits. Further, there a 2 Mbyte block available after reset. Data movement occurs on the PCI 211*a* and/or a memory bus.

DMA Engine Supported by Host Controller and FPGA

Figure 5:
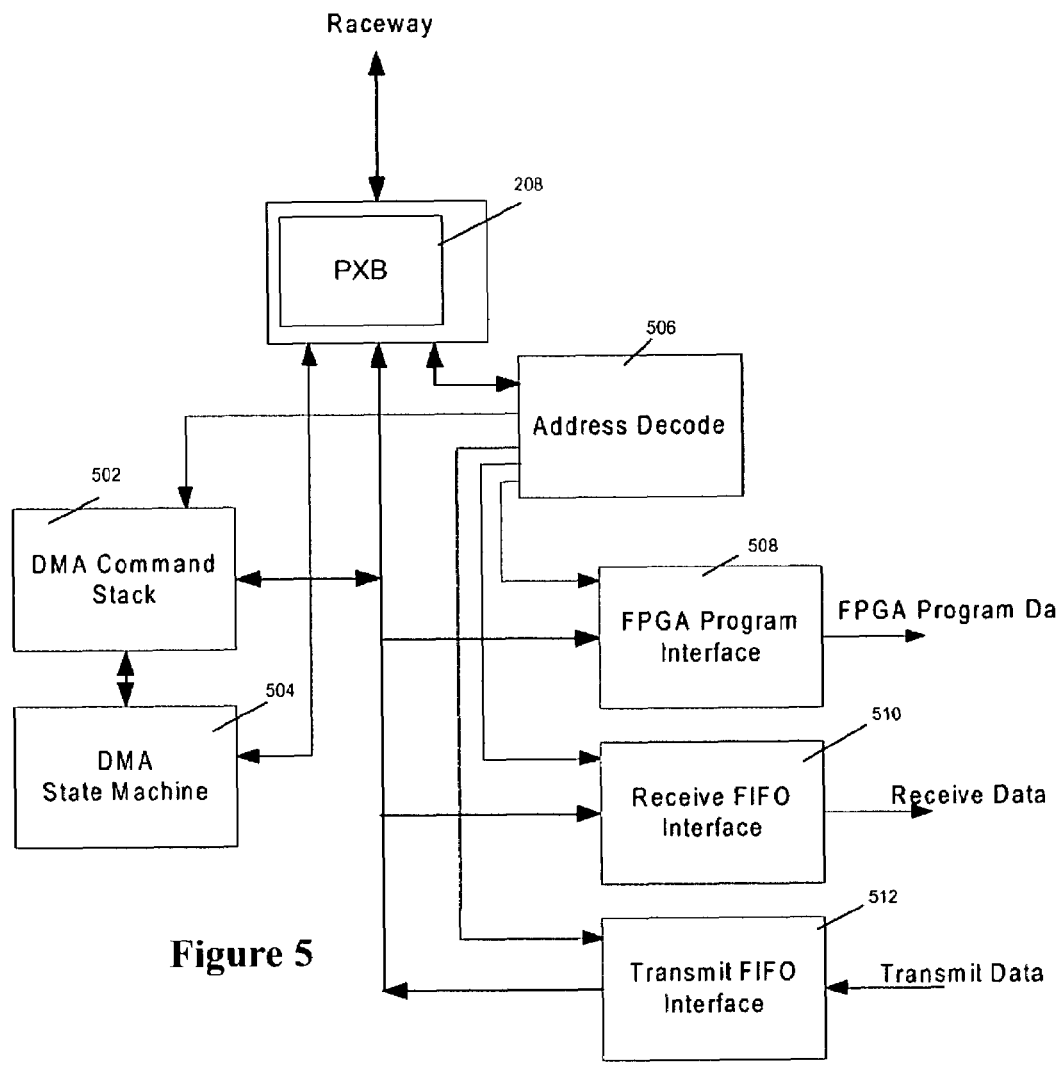
FIG. 5 is a block diagram of an integrated direct memory access (DMA) engine of the type used in a system according to the invention.

Direct memory access (DMA) is performed by the host controller 203, and operates independently from the host processor 203 core, as illustrated in FIG. 5. The host controller 203 has an integrated DMA engine including a DMA command stack 502, a DMA state engine 504, an address decode block 506, and three FIFO interfaces 508, 510, 512. The DMA engine receives and sends information via the PXB 208 coupled with the crossbar 206.

The command stack 502 and state machine 504 processes DMA requests and transfers. The stack 502 and state machine 504 can initiate both cycle stealing and burst mode, along with host controller interupts. The address decode 506 sets the bus address, and triggers transmissions of the data.

The host controller 203 has two DMA I/O interfaces, each with a 64-byte queue to facilitate the gathering and sending of data. Both the local processor and PCI masters can initiate a DMA transfer. The DMA controller supports memory transfers between PCI to memory, between local and PCI memory, and between local memory devices. Further, the host controller 203 can transfer in either block mode or scatter mode within discontinuous memory. A receiving channel 510 buffers data that is to be received by the memory. A transmit channel 512 buffers data that is sent from memory. Of course, the buffers can also send/receive information from other devices, e.g., the compute nodes 220, or other devices capable of DMA transfers.

The host controller 203 contains an embedded programmable interrupt controller (EPIC) device. The interrupt controller implements the necessary functions to provide a flexible and general-purpose interrupt controller. Further, the interrupt controller can pool interrupts generated from the several external components (e.g., the compute elements), and deliver them to the processor core in a prioritized manner. In the illustrated embodiment, an OpenPIC architecture is used, although it can be appreciated by one skilled in the art that other such methods and techniques can be used. Here, the host controller 203 supports up to five external interrupts, four internal logic-driven interrupts, and four timers with interrupts.

Data transfers can also take effect via the FPGA program interface 508. This interface can program and/or accept data from various FPGAs, e.g., the compute note ASIC 234, crossbar 242, and other devices. Data transfers within the compute node processor 228 to its ASIC 234 and RACEway™ bus 246 are addressed as follows:

| From Address | To Address | Function |
|---|---|---|
| 0x0000 0000 | 0x0FFF FFFF | Local SDRAM 256 Mb |
| 0x1000 0000 | 0x1FFF FFFF | crossbar 256 Mb map window 1 |
| 0x2000 0000 | 0x2FFF FFFF | crossbar 256 MB map window 2 |
| 0x3000 0000 | 0x3FFF FFFF | crossbar 256 MB map window 3 |
| 0x4000 0000 | 0x4FFF FFFF | crossbar 256 MB map window 4 |
| 0x5000 0000 | 0x5FFF FFFF | crossbar 256 MB map window 5 |
| 0x6000 0000 | 0x6FFF FFFF | crossbar 256 MB map window 6 |

-continued

| From Address | To Address | Function |
|---|---|---|
| 0x7000 0000 | 0x7FFF EFEF | crossbar 256 MB map window 7 |
| 0x8000 0000 | 0x8FFF FFFF | crossbar 256 MB map window 8 |
| 0x9000 0000 | 0x9FFF FFFF | crossbar 256 MB map window 9 |
| 0xA000 0000 | 0xAFFF FFFF | crossbar 256 MB map window A |
| 0xB000 0000 | 0xBFFF FFFF | crossbar 256 MB map window B |
| 0xC000 0000 | 0xCFFF FFFF | crossbar 256 MB map window C |
| 0xD000 0000 | 0xDFFF FFFF | crossbar 256 MB map window D |
| 0xE000 0000 | 0xEFFF FFFF | crossbar 256 MB map window E |
| 0xF000 0000 | 0xFBFF FBFF | Not used (CE reg replicated mapping) |
| 0xFBFF FC00 | 0xFBFF FDFF | Internal CN ASIC registers |
| 0xFBFF FE00 | 0xFEFF FFFF | Pre-fetch control |
| 0xFF00 0000 | 0xFFFF FFFF | 16 MB boot FLASH memory area |

The SDRAM 236 can be addressable in 8, 16, 32 or 64 bit addresses. The RACEway™ bus 246 supports locked read/write and locked read transactions for all data sizes. A 16 Mbyte boot flash area is further divided as follows:

| From Address | To Address | Function |
|---|---|---|
| 0xFF00 2006 | 0xFF00 2006 | Software Fail Register |
| 0xFF00 2005 | 0xFF00 2005 | MPC8240 HA Register |
| 0xFF00 2004 | 0xFF00 2004 | Node 3 HA Register |
| 0xFF00 2003 | 0xFF00 2003 | Node 2 HA Register |
| 0xFF00 2002 | 0xFF00 2002 | Node 1 HA Register |
| 0xFF00 2001 | 0xFF00 2001 | Node 0 HA Register |
| 0xFF00 2000 | 0xFF00 2000 | Local HA Register (status/control) |
| 0xFF00 0000 | 0xFF00 1FFF | NVRAM |

Slave accesses are accesses initiated by an external RACEway™ device directed toward the compute element processor 238. The ASIC 234 supports a 256 Mbyte address space which can be partitioned as follows:

| From Address | To Address | Function |
|---|---|---|
| 0x0000 0000 | 0x0FFF FBFF | 256 MB less 1 Kb hole SDRAM |
| 0Xfff_FC00 | 0xFFF_FFFF | PCE 133 internal registers |

There are 16 discrete output signals directly controllable and readable by the host controller 203. The 16 discrete output signals are divided into two addressable 8-bit words. Writing to a discrete output register will cause the upper 8-bits of the data bus to be written to the discrete output latch. Reading a discrete output register will drive the 8-bit discrete output onto the upper 8-bits of the host processor data bus. The bits in the discrete output word are defined as follows:

There are 16 discrete input signals accessible by the host controller 203. Reads from the discrete input address space will latch the state of the signals, and return the latched state of the discrete input signals to the host processor. The bits in the discrete input word are as follows:

| DH(0:7) | Signal | Description |
|---|---|---|
| | | Output Word 2 |
| 0 | ND0_FLASH_EN_1 | Enable the CE ASIC's FLASH port when 1 |
| 1 | ND1_FLASH_EN_1 | Enable the CE ASIC's FLASH port when 1 |
| 2 | ND2_FLASH_EN_1 | Enable the CE ASIC's FLASH port when 1 |
| 3 | ND3_FLASH_EN_1 | Enable the CE ASIC's FLASH port when 1 |
| 4 | Wrap 1 | Wrap to discrete input |
| 5 | | |
| 6 | | |
| 7 | | |
| | | Output Word 1 |
| 0 | WRAP0 | Wrap to Discrete Input |
| 1 | I2C_RESET_0 | Reset the 12C serial bus when 0 |
| 2 | SWLED | Software controlled LED |
| 3 | FLASHSEL4 | Flash bank select address bit 4 |
| 4 | FLASHSEL3 | Flash bank select address bit 3 |
| 5 | FLASHSEL2 | Flash bank select address bit 2 |
| 6 | FLASHSEL1 | Flash bank select address bit 1 |
| 7 | FLASHSEL0 | Flash bank select address bit 0 |
| | | Output Word 0 |
| 0 | C_SRESET3_0 | Issue a Soft Reset to CPU on Node 3 when 0 |
| 1 | C_PRESET3_0 | Reset PCE133 ASIC Node 3 when 0 |
| 2 | C_SRESET2_0 | Issue a Soft Reset to cpu on Node 2 when 0 |
| 3 | C_PRESET2_0 | Reset PCE133 ASIC Node 2 when 0 |
| 4 | C_SRESET1_0 | Issue a Soft Reset to cpu on Node 1 when 0 |
| 5 | C_PRESET1_0 | Reset PCE133 ASIC Node 1 when 0 |
| 6 | C_SRESET0_0 | Issue a Soft Reset to cpu on Node 0 when 0 |
| 7 | C_PRESET0_0 | Reset PCE133 ASIC Node 0 when 0 |
| | | Input Word 1 |
| 0 | WRAP 1 | Wrap from discrete output word |
| 1 | | |
| 2 | V3.3_FAIL_0 | Latched status of power supply since last reset |
| 3 | V2.5_FAIL_0 | Latched status of power supply since last reset |
| 4 | VCORE1_FAIL_0 | Latched status of power supply since last reset |
| 5 | VCORE0_FAIL_0 | Latched status of power supply since last reset |
| 6 | RIOR_CNF_DONE_1 | RIO/RACE++ FPGA configuration complete |
| 7 | PXB0_CNF_DONE_1 | PXB++ FPGA configuration complete |
| | | Input Word 0 |
| 0 | WRAP0 | Wrap from discrete output word |
| 1 | WDMSTATUS | MPC8240's watchdog monitor status (0 = failed) |
| 2 | NPORESET_1 | Not a power on reset when high |
| 3 | | |
| 4 | | |
| 5 | | |
| 6 | | |
| 7 | | |

The host controller 203 interfaces with an 8-input interrupt controller external from processor itself (although in other embodiments it can be contained within the processor). The interrupt inputs are wired, through the controller to interrupt zero of the host processor external interrupt inputs. The remaining four host processor interrupt inputs are unused.

The Interrupt Controller comprises the following five 8-bit registers:

| Resister | Description |
|---|---|
| Pending Register | A low bit indicates a falling edge was detected on that interrupt (read only); |

| Resister | Description |
| --- | --- |
| Clear Register | Setting a bit low will clear the corresponding latched interrupt (write only); |
| Mask Register | Setting a bit low will mask the pending interrupt from generating a processor interrupt; |
| Unmasked Pending Register | A low bit indicates a pending interrupt that is not masked out |
| Interrupt State Register | indicates the actual logic level of each interrupt input pin. |

The interrupt input sources and their bit positions within each of the six registers are as follows:

| Bit | Signal | Description |
| --- | --- | --- |
| 0 | SWFAIL_0 | 8240 Software Controlled Fail Discrete |
| 1 | RTC_INT_0 | Real time clock event |
| 2 | NODE0_FAIL_0 | WDFAIL_0 or IWDFAIL_0 or SWFAIL_0 active |
| 3 | NODE1_FAIL_0 | WDFAIL_0 or IWDFAIL_0 or SWFAIL_0 active |
| 4 | NODE2_FAIL_0 | WDFAIL_0 or IWDFAIL_0 or SWFAIL_0 active |
| 5 | NODE3_FAIL_0 | WDFAIL_0 or IWDFAIL_0 or SWFAIL_0 active |
| 6 | PCI_INT_0 | PCI interrupt |
| 7 | XB_SYS_ERR_0 | crossbar internal error |

A falling edge on an interrupt input will set the appropriate bit in the pending register low. The pending register is gated with the mask register and any unmasked pending interrupts will activate the interrupt output signal to the host processor external interrupt input pin. Software will then read the unmasked pending register to determine which interrupt(s) caused the exception. Software can then clear the interrupt(s) by writing a zero to the corresponding bit in the clear register. If multiple interrupts are pending, the software has the option of either servicing all pending interrupts at once and then clearing the pending register or servicing the highest priority interrupt (software priority scheme) and the clearing that single interrupt. If more interrupts are still latched, the interrupt controller will generate a second interrupt to the host processor for software to service. This will continue until all interrupts have been serviced.

An interrupt that is masked will show up in the pending register but not in the unmasked pending register and will not generate a processor interrupt. If the mask is then cleared, that pending interrupt will flow through the unmasked pending register and generate a processor interrupt.

The multiple components within the processor board 118 dictate various power requirements. The processor board 118 requires 3.3V, 2.5V, and 1.8V. In the illustrated embodiment, there are two processor core voltage supplies 302, 304 each driving two 1.8V cores for two processors (e.g., 228). There is also a 3.3V supply 306 and a 2.5V supply 308 which supply voltage to the remaining components (e.g., crossbar 206, interface block 205 and so on). To provide power to the board, the three voltages (e.g., the 1.8V, 3.3V and 2.5V) have separate switching supplies, and proper power sequencing. All three voltages are converted from 5.0V. The power to the processor card 118 is provided directly from the modem board 112 within the base station, however, in other embodiments there is a separate or otherwise integrated power supply. The power supply a preferred embodiment is rated as 12A, however, in other embodiments the rating varies according to the specific component requirements.

In the illustrated embodiment, for instance, the 3.3V power supply 306 is used to provide power to the NVRAM 218 core, SDRAM 214, PXB 208, and crossbar ASIC 206 (or FPGA is present). This power supply is rated as a function of the devices chosen for these functions.

A 2.5V power supply 308 is used to provide power to the compute node ASIC 234 and can also power the PXB 208 FPGA core. The host processor bus can run at 2.5V signaling. The host bus can operate at 2.5V signaling.

The power-on sequencing is necessary in multi-voltage digital boards. One skilled in the art can appreciate that power sequencing is necessary for long-term reliability. The right power supply sequencing can be accomplished by using inhibit signals. To provide fail-safe operation of the device, power should be supplied so that if the core supply fails during operation, the I/O supply is shut down as well.

Figure 6:
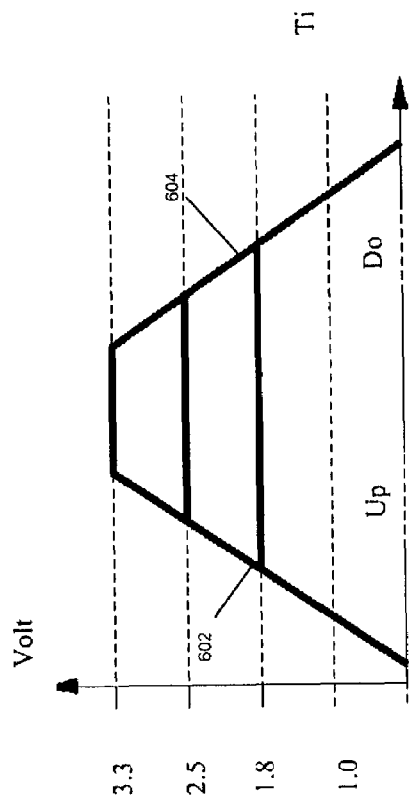
FIGS. 6 and 7 depict power on/off curves for the processor board in a system according to the invention.

Although in theory, the general rule is to ramp all power supplies up and down at the same time as illustrated in FIG. 6. The ramp up 602 and ramp down 604 show agreement with the power supplies 302, 304, 306, 308 over time. One skilled in the art realizes that in reality, voltage increases and decreases do not occur among multiple power supplies in such a simultaneous fashion.

Figure 7:
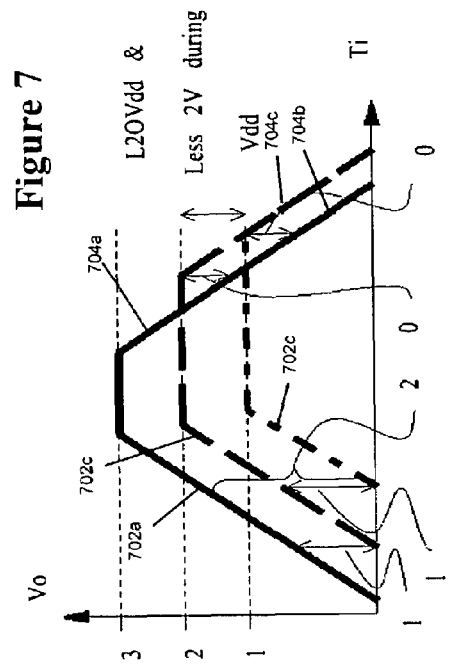

FIG. 7 shown the actual voltage characteristics for the illustrated embodiment. As can be seen, ramp up 702a-702c and ramp down 704a-704c sequences depend on multiple factors, e.g., power supply, total board capacities that need to be charged, power supply load, and so on. For example, the ramp up for the 3.3V supply 702a occurs before the ramp up for the 2.5V supply 702c, which occurs before the ramp up of the 1.8V supplies 702b. Further, the ramp down for the 3.3V supply 704a occurs before the ramp down for the 2.5V supply 704c, which occurs before the ramp down for the 1.8V supplies 704c.

Also, The host processor requires the core supply to not exceed the I/O supply by more than 0.4 volts at all times. Also, the I/O supply must not exceed the core supply by more than 2 volts. Therefore, to achieve an acceptable power-up and power-down sequencing, e.g., to avoid damage to the components, a circuit containing diodes is used in conjunction with the power supplied within the base station.

The power status/control device 240 is designed from a programmable logic device (PLD). The PLD is used to monitor the voltage status signals from the on board supplies. It is powered up from +5V and monitors +3.3V, +2.5V, 1.8V_1 and +1.8V_2. This device monitors the power_ good signals from each supply. In the case of a power failure in one or more supplies, the PLD will issue a restart to all supplies and a board level reset to the processor board. A latched power status signal will be available from each supply as part of the discrete input word. The latched discrete can indicate any power fault condition since the last off-board reset condition.

In operation, the processor board inputs raw antenna data from the base station modem card 112 (or other available location of that data), detects sources of interference within that data, and produces a new stream of data which has reduced interference subsequently transmitting that refined data back to the modem card (or other location) for further processing within the base station.

As can be appreciated by one skilled in the art, such interference reduction is computationally complex; hence, the hardware must support throughputs sufficient for multiple user processing. In a preferred embodiment, characteristics of processing are a latency of less than 300 microseconds handing data in the 110 Mbytes/Sec range, however, in other embodiments the latency and data load can vary.

In the illustrated embodiment, data from the modem board is supplied via the PCI bus 211*b* through the PCI bridge 222. From there, the data traverses the crossbar 206 and is loaded into the host controller memory 205. Output data flows in the opposite direction. Additionally, certain data flows between the host controller 203 and the compute elements 220.

Hybrid Operating System

The compute elements 220 operate, in some embodiments, under the MC/OS operating system available commercially from the assignee herein, although different configurations can run under different operating systems suited for such. Here, one aspect is to reduce the use of non-POSIX system calls which can increase portability of the multiple user detection software among different hardware environments and operating system environments. The host processor is operated by the VxWorks operating system, as is required by MC/OS and suitable for a Motorola 8240 PowerPC.

FIG. 8 shows a block diagram of various components within the hardware/software environment. An MC/OS subsystem 802 is used as an operating system for the compute elements 220. Further, a MC/OS DX 804 provides APIs acceptable overhead and latency access to the DMA engines which in turn provide suitable bandwidth transfers of data. DX 804 can be used to move data between the compute elements 220 during parallel processing, and also to move data between the compute elements 220, the host controller 203, and the modem card 112. As described above, each compute element 220 continues an application 806, and a watchdog 808. Further, the HA registers provide the bootstrap 810 necessary for start-up.

The host controller 203 runs under the VxWorks operating system 812. The host processor 202 contains a watchdog 814, application data 816, and a bootstrap 818. Further, the host processor 202 can perform TCP/IP stack processing 820 for communication through the Ethernet interface 224.

Input/output between the processor card 118 and the modem card 112 takes place by moving data between the Race++ Fabric and the PCI bus 211*b* via the PCI bridge 222. The application 806 will use DX to initialize the PXB++ bridge, and to cause input/output data to move as if it were regular DX IPC traffic. For example, there are several components which can initiate data transfers and choose PCI addresses to be involved with the transfers.

One approach to increasing available on the processor card 118 is to balance host-processing time against application execution. For example, when the system comes up, the application determines which processing resources are available, and the application determines a load mapping on the available resources and record certain parameters in NVRAM. Although briefs interruptions in service can occur, the application does not need to know how to continue execution across faults. For instance, the application can make an assumption that the hardware configuration will not change without the system first rebooting. If the application is in a state which needs to be preserved across reboots, the application checkpoints the data on a regular basis. The system software provides an API to a portion of the NVRAM for this purpose The host controller 203 is attached to an amount of linear flash memory 216 as discussed above. This flash memory 216 serves several purposes. The first purpose the flash memory serves is as a source of instructions to execute when the host controller comes out of reset. Linear flash can be addressed much like normal RAM. Flash memories can be organized to look like disk controllers; however in that configuration they generally require a disk driver to provide access to the flash memory. Although such an organization has several benefits such as automatic reallocation of bad flash cells, and write wear leveling, it is not appropriate for initial bootstrap. The flash memory 216 also serves as a file system for the host and as a place to store permanent board information (e.g., such as a serial number).

When the host controller 203 first comes out of reset, memory is not turned on. Since high-level languages such as C assume some memory is present (e.g., for a stack) the initial bootstrap code must be coded in assembler. This assembler bootstrap contains a few hundred lines of code, sufficient to configure the memory controller, initialize memory, and initialize the configuration of the host processor internal registers.

After the assembler bootstrap has finished execution, control is passed to the processor HA code (which is also contained in boot flash memory). The purpose of the HA code is to attempt to configure the fabric, and load the compute element CPUs with HA code. Once this is complete, all the processors participate in the HA algorithm. The output of the algorithm is a configuration table which details which hardware is operational and which hardware is not. This is an input to the next stage of bootstrap, the multi-computer configuration.

MC/OS expects the host controller system to configure the multi-computer (e.g., compute elements 220). A configmc program reads a textual description of the computer system configuration, and produces a series of binary data structures that describe the system configuration. These data structures are used in MC/OS to describe the routing and configuration of the multi-computer.

The processor board 118 will use almost exactly the same sequence to configure the multi-computer. The major difference is that MC/OS expects configurations to be static, whereas the processor board configuration changes dynamically as faulty hardware cause various resources to be unavailable for use.

One embodiment of the invention uses binary data structures produced by configmc to modify flags that indicate whether a piece of hardware is usable. A modification to MC/OS prevents it from using hardware marked as broken. Another embodiment utilizes the output of the HA algorithm to produce a new configuration file input to configmc, the configmc execution is repeated with the new file, and MC/OS is configured and loaded with no knowledge of the broken hardware whatsoever. This embodiment can calculate an optimal routing table in the face of failed hardware, increasing the performance of the remaining operational components.

After the host controller has configured the compute elements 220, the runmc program loads the functional compute elements with a copy of MC/OS. Because access to the processor board 118 from a TCP/IP network is required, the host computer system acts as a connection to the TCP/IP network. The VxWorks operating system contains a fully functional TCP/IP stack. When compute elements access network resources, the host computer acts as proxy, exchanging information with the compute element utilizing DX transfers, and then making the appropriate TCP/IP calls on behalf of the compute element.

The host controller 203 needs a file system to store configuration files, executable programs, and MC/OS images. For this purpose, flash memory is utilized. Rather than have a separate flash memory from the host controller boot flash, the same flash is utilized for both bootstrap purposes and for holding file system data. The flash file system provides DOS file system semantics as well as write wear leveling.

There are in particular, two portions of code which can be remotely updated; the bootstrap code which is executed by the host controller 203 when it comes out of reset, and the rest of the code which resides on the flash file system as files.

When code is initially downloaded to the processor board 118, it is written as a group of files within a directory in the flash file system. A single top-level index tracks which directory tree is used for booting the system. This index continues to point at the existing directory tree until a download of new software is successfully completed. When a download has been completed and verified, the top-level index is updated to point to the new directory tree, the boot flash is rewritten, and the system can be rebooted.

Fault detection and reporting 820, 822 is performed by having each CPU in the system gather as much information about what it observed during a fault, and then comparing the information in order to detect which components could be the common cause of the symptoms. In some cases, it may take multiple faults before the algorithm can detect which component is at fault.

Failures within the processor board 118 can be a single point failure. Specifically, everything on the board is a single point of failure except for the compute elements. This means that the only hard failures that can be configured out are failures in the compute elements 220. However, many failures are transient or soft, and these can be recovered from with a reboot cycle.

In the case of hard failure of a compute element 220, the application executes with reduced demand for computing resources. For example, the application may work with a smaller number of interference sources, or perform interference cancellation iterations, but still within a tolerance.

Failure of more than a single compute element will cause the board to be inoperative. Therefore, the application only needs to handle two configurations: all compute elements functional and 1 compute element unavailable. Note that the single crossbar means that there are no issues as to which processes need to go on which processors—the bandwidth and latencies for any node to any other node are identical on the processor board, although others methods and techniques can be used.

DSP Connected to Processing Board

FIG. 9 shows an embodiment of the invention wherein a digital signal processor (DSP) 900 is connected with the processor board 118. Such configuration enables a DSP to communicate via DMA with processor board. One skilled in the art can appreciate that DMA transfers can be faster than bus transfers, and hence, throughput can be increased. Shown, is a DSP processor, a buffer, a FPGA and a crossbar.

The DSP 900 generates a digital signal corresponding to an analog input, e.g., a rake receiver. The DSP 900 operates in real-time, hence, the output is clocked to perform transfers of the digital output. In the illustrated embodiment, the DSP can be a Texas Instruments model TMS320C67XX series, however, other DSP processors are commercially available which can satisfy the methods and systems herein.

A buffer 902 is coupled with the DSP 900, and receives and send data in a First-In First-Out (e.g., queue) fashion, also referred to as a FIFO buffer. The buffer 902, in some embodiments, can be dual-ported RAM of sufficient size to capture data transfers. One skilled in the art can appreciate, however, that a protocol can be utilized to transfer the data where the buffer or dual-ported RAM is smaller that the data transfer size.

A FPGA 904 is coupled with both the buffer 902 and an crossbar 906 (which can be the same crossbar coupled with the compute elements 220 and host controller 203). The FPGA 904 moves data from the buffer 902 to the crossbar 906, which subsequently communicates the data to further devices, e.g., a RACEway™ or the host controller 203 or compute elements 220. The FPGA 904 also perform data transfers directly from the DSP 900 to the crossbar 906. This method is utilized in some embodiments where data transfer sizes can be accommodated without buffering, for instance, although either the buffer or direct transfers can be used.

The DSP 900 contains at least one external memory interface (EMIF) 908 device, which is connected to the buffer 902 or dual-ported RAM. RACEway™ transfers actually access the RAM, and then additional processing takes place within the DSP to move the data to the correct location in SDRAM within the DSP. In embodiments where the RAM is smaller that the data transfer size, then there is a massaging protocol between two endpoint DSPs exchanging messages, since the message will be fragmented to be contained within the buffer or RAM.

As more RACEway™ endpoints are added (for instance, to increase speed or throughput), the size of the dual-port RAM can be increased to a size of 2*F*N*P buffers of size F, where F is the fragment size, N is the number of RACEway™ endpoints in communication with the DSP, and P is the number of parallel transfers which can be active on an endpoint. The constant 2 represents double buffering so one buffer can be transferred to the RACEway™ simultaneously with a buffer being transferred to the DSP. One skilled in the art can appreciate that the constant can be four times rather than two times to emulate a full-duplex connection. With a 4 mode system, this could be, for example, 4*8K*4*4 or 512 Kbytes, plus a overhead factor for configuration and data tracking.

The FPGA 904 can program the DMA controller 910 within the DSP 900 to move data between the buffer 902 and the DSP/SDRAM 912 directly from a DSP host port 914. The host port 914 is a peripheral like the EMIF 908, but can master transfers into the DSP data-paths, e.g., it can read and write any location within the DSP. Hence, the host port 914 can access the DMA controller, 910 and can be used to initiate transfers via the DMA engine. One skilled in the art can appreciate that using this architecture, RACEway™ transfers can be initiated without the cooperation of the DSP, the thus, the DSP is free to continue processing while transfers take place and further, there is no need for protocol messaging within the buffer.

The FPGA 904 can also perform fragmentation of data. In embodiments where the buffer device is a dual-port RAM, the FPGA 904 an program the DMA controller within the DSP to move fragments into or out-of the DSP. This method can be used to match throughput of the external transfer bus, e.g., the RACEway™.

An example of the methods and systems described for a DSP, is as follows. In an embodiment where the RACEway™ reads date out of the DSP memory 912, this example assumes that another DSP is reading the SDRAM of the local DSP. The FPGA 904 detects a RACEway™ data packet arriving, and decodes the packet to determine that is contains instructions for a data-read at, for example, memory location 0x10000. The FPGA 904 writes over the host port interface 914 to program the DMA controller 910 to transfer data starting at memory location 0x10000, which refers to a location in the primary EMIF 908 corresponding to a location in the SDRAM 912, and to move that data to a location in the secondary EMIF (e.g., the buffer device) 902. As data arrives in the buffer 902, the FPGA 904 reads the data out of the buffer, and moves it onto the RACEway™ bus. When a predetermined block of data is moved, the DMA controller 910 finishes the transfer, and the FPGA 904 finishes moving the data from the buffer 902 to the RACEway™.

Another example assumes that another DSP is requesting a write instruction to the local DSP. Here, the FPGA 904 detects a data packet arriving, and determines that is it a write to location 0x20000, for instance. The FPGA 904 fills some amount of the buffer 902 with the data from the RACEway™ bus, and then writes over the host port 914 interface to program the DMA controller 910. The DMA controller 910 then transfers data from the buffer device 902 and writes that data to the primary EMIF 908 at address 0x20000. At the conclusion of the transfer, an interrupt can be sent to the DSP 900 to indicate that a data packet has arrived, or a polling of a location in the SDRAM 912 can accomplish the same requirement.

These two examples are non-limiting example, and other embodiments can utilize different methods and devices for the transfer of data between devices. For example, if the DSP 900 utilizes RapidIO interfaces, the buffer 902 and FPGA 904 can be modified to accommodate this protocol. Also, the crossbar 906 illustrated may be in common with a separate bus structure, or be in common with the processor board 118 described above. Even further, in some embodiments, the FPGA 904 can be directly coupled with the board processor, or be configured as a compute node 220.

Therefore, as can be understood by one skilled in the art, the methods and systems herein are suited for multiple user detection within base stations, and can be used to accommodate both short-code and long-code receivers.

Short-Code Processing

In one embodiment of the invention using short-code receivers, a possible mapping of matrices necessary for short-code mapping is now discussed. In order to perform MUD at the symbol rate, the correlation between the user channel-corrupted signature waveforms must be calculated. These correlations are stored as elements in matrices, here referred to as R-matrices. Because the channel is continually changing, the correlations need be updated in real-time.

The implementation of MUD at the symbol rate can be divided into two functions. The first function is the calculation of the R-matrix elements. The second function is interference cancellation, which relies on knowledge of the R-matrix elements. The calculation of these elements and the computational complexity are described in the following section. Computational complexity is expressed in Giga-Operations Per Second (GOPS). The subsequent section describes the MUD IC function. The method of interference cancellation employed is Multi-stage Decision Feedback IC (MDFIC).

The R-matrix calculations can be divided into three separate calculations, each with an associated time constant for real-time operation, as follows:

$$r_{lk}[m'] = \sum_{q=1}^{L} \sum_{q'=1}^{L} \text{Re}\left[\hat{a}_{lq}^* a_{kq} \cdot \frac{1}{2N_l} \sum_n \sum_p g[(n-p)N_c + m'T + \tau_{lq} - \tau_{lq'}] c_k[p] \cdot c_l^*[n]\right]$$

-continued $$= r_{lk}[m'] = \sum_{q=1}^{L} \sum_{q'=1}^{L} \text{Re}[a_{lq}^* a_{kq} \cdot c_{lkqq'}[m']]$$

$$C_{lkqq'}[m'] \equiv \frac{1}{2N_l} \sum_n \sum_p g[(n-p)N_c + m'T + \tau_{lq} - \tau_{lq'}] c_k[p] \cdot c_l^*[n]$$

$$= \frac{1}{2N_l} \sum_n \sum_p g[mN_c + m'T + \tau_{lq} - \tau_{lq'}]$$

$$\sum_n c_k[n-m] \cdot c_l^*[n]$$

$$= \frac{1}{2N_l} \sum_n \sum_p g[mN_c + m'T + \tau_{lq} - \tau_{lq'}] \Gamma_{lk}[m]$$

$$\Gamma_{lk}[m] = \sum_n c_k[n-m] \cdot c_l^*[n]$$

Where the hats are omitted otherwise indicating parameter estimates. Hence we must calculate the R-matrices, which depend on the C-matrices, which in turn, depend on the Γ-matrix. The Γ-matrix has the slowest time constant. This matrix represents the user code correlations for all values of offset ln. For a case of 100 voice users the total memory requirement is 21 MBytes based on two bytes (real and imaginary parts) per element. This matrix is updated only when new codes (e.g., new users) are added to the system. Hence this is essentially a static matrix. The computational requirements are negligible.

The most efficient method of calculation depends on the non-zero length of the codes. For high data-rate users the non-zero length of the codes is only 4-chips long. For these codes, a direct convolution is the most efficient method to calculation the elements. For low data-rate users it is more efficient to calculation the elements using the FFT to perform the convolutions in the frequency domain. Further, as can be appreciated by one skilled in the art, cache memory can be used where the matrix is somewhat static compared with the update of other matrices.

The C-matrix is calculated from the Γ-matrix. These elements must be calculated whenever a user's delay lag changes. For now, assume that on average each multi-path component changes every 400 ms. The length of the g[ ] function is 48 samples. Since we are over sampling by 4, there are 12 multiply-accumulations (real×complex) to be performed per element, or 48 operations per element. When there are 100 low-rate users on the system (i.e., 200 virtual users) and a single multi path lag (of 4) changes for one user a total of (1.5)(2)KvLNv elements must be calculated. The factor of 1.5 comes from the 3 C-matrices (m'=−1, 0, 1), reduced by a factor of 2 due to a conjugate symmetry condition. The factor of 2 results because both rows and columns must be updated. The factor Nv is the number of virtual users per physical user, which for the lowest rate users is Nv=2. In total then this amounts to 230,400 operations per multi-path component per physical user. Assuming 100 physical users with 4 multi-path components per user, each changing once per 400 ms gives 230 MOPS.

The R-matrices are calculated from the C-matrices. From the equation above the R-matrix elements are $$r_{lk}[m'] = \sum_{q=1}^{L} \sum_{q'=1}^{L} \text{Re}[a_{lq}^* a_{kq'} \cdot C_{lkqq'}[m']] = \text{Re}[a_l^H \cdot C_{lk}[m'] \cdot a_k]$$

where $a_k$ are L×1 vectors, and $C_{lk}[m']$ are L×L matrices. The rate at which these calculations must be performed depends on the velocity of the users. The selected update rate is 1.33 ms. If the update rate is too slow such that the estimated R-matrix values deviate significantly from the actual R-matrix values then there is a degradation in the MUD efficiency.

From the above equation the calculation of the R-matrix elements can be calculated in terms of an X-matrix which represents amplitude-amplitude multiplies:

$$r_{lk}[m'] = \text{Re}[tr[a_l^H \cdot C_{lk}[m'] \cdot a_k]]$$
$$= \text{Re}[tr[C_{lk}[m'] \cdot a_k \cdot a_l^H]]$$
$$= \text{Re}[tr[C_{lk}[m'] \cdot X_{lk}]]$$
$$= tr[C_{lk}^R[m'] \cdot X_{lk}^R] - tr[C_{lk}^I \cdot X_{lk}^I]$$

$$X_{lk} \equiv a_k \cdot a_l^H \equiv X_{lk}^R + jX_{lk}^I$$
$$C_{lk}[m'] \equiv C_{lk}^R[m'] + jC_{lk}^I[m']$$

The X-matrix multiplies can be reused for all virtual users associated with a physical user and for all m' (i.e. m'=0, 1). Hence these calculations are negligible when amortized. The remaining calculations can be expressed as a single real dot product of length 2L 2=32. The calculations are performed in 16-bit fixed-point math. The total operations is thus 1.5(4)(KvL)2=3.84 Mops. The processing requirement is then 2.90 GOPS. The X-matrix multiplies when amortized amount to an additional 0.7 GOPS. The total processing requirement is then 3.60 GOPS.

From the equation above the matched-filter outputs are given by:

$$y_l[m] = r_{ll}[0]b_l[m] + \sum_{k=1}^{K_v} r_{lk}[-1]b_k[m+1] +$$
$$\sum_{k=1}^{K_v} [r_{lk}[0] - r_{ll}[0]\delta_{lk}]b_k[m] +$$
$$\sum_{k=1}^{K_v} r_{lk}[1]b_k[m-1] + \eta_l[m]$$

The first term represents the signal of interest. All the remaining terms represent Multiple Access Interference (MAI) and noise. The multiple-stage decision-feedback interference cancellation (MDFIC) algorithm iteratively solves for the symbol estimates using $$\hat{b}_l[m] = \text{sign}\left\{y_l[m] - \sum_{k=1}^{K_v} r_{lk}[-1]\hat{b}_k[m+1] - \sum_{k=1}^{K_v} [r_{lk}[0] - r_{ll}[0]\delta_{lk}]\hat{b}_k[m] - \sum_{k=1}^{K_v} r_{lk}[1]\hat{b}_k[m-1]\right\}$$

with initial estimates given by hard decisions on the matched-filter detection statistics, $\hat{b}_l[m] = \text{sign}\{y_l[m]\}$. The MDFIC technique is closely related to the SIC and PIC technique. Notice that new estimates are immediately introduced back into the interference cancellation as they are calculated. Hence at any given cancellation step the best available symbol estimates are used. This idea is analogous to the Gauss-Siedel method for solving diagonally dominant linear systems.

The above iteration is performed on a block of 20 symbols, for all users. The 20-symbol block size represents two WCDMA time slots. The R-matrices are assumed to be constant over this period. Performance is improved under high input BER if the sign detector in is replaced by the hyperbolic tangent detector. This detector has a single slope parameter which is variable from iteration to iteration. Similarly, performance is improved if only a fraction of the total estimated interference is cancelled (e.g., partial interference cancellation), owing to channel and symbol estimation errors.

Multiple Processors Generating Complementary R-Matrices

The three R-matrices (R[-1], R[0] and R[1]) are each Kv×Kv in size. The total number of operation then is $6K_v^2$ per iteration. The computational complexity of the multi-stage MDFIC algorithm depends on the total number of virtual users, which depends on the mix of users at the various spreading factors. For Kv=200 users (e.g. 100 low-rate users) this amounts to 240,000 operations. In the current implementation two iterations are used, requiring a total of 480,000 operations. For real-time operation these operations must be performed in $\frac{1}{15}$ ms. The total processing requirement is then 7.2 GOPS. Computational complexity is markedly reduced if a threshold parameter is set such that IC is performed only for values $|y_l[m]|$ below the threshold. The idea is that if $|y_l[m]|$ is large there is little doubt as to the sign of $b_l[m]$, and IC need not be performed. The value of the threshold parameter is variable from stage to stage.

Although three R matrices are output from the R matrix calculation function, only half of the elements are explicitly calculated. This is because of symmetry that exists between R matrices:

$$R_{l,k} = \xi R_{k,l}(-m)$$

Therefore, only two matrices need to be calculated. The first one is a combination of R(1) and R(-1). The second is the R(0) matrix. In this case, the essential R(0) matrix elements have a triangular structure to them. The number of computations performed to generate the raw data for the R(1)/R(-1) and R(0) matrices are combined and optimized as a single number. This is due to the reuse of the X-matrix outer product values across the two R-matrices. Since the bulk of the computations involve combining the X-matrix and correlation values, they dominate the processor utilization. These computations are used as a cost metric in determining the optimum loading of each processor.

Processor Loading Optimization

The optimization problem is formulated as an equal area problem, where the solution results in each partition area to be equal. Since the major dimensions of the R-matrices are in terms of the number of active virtual users, the solution space for this problem is in terms of the number of virtual users per processor. By normalizing the solution space by the number of virtual users, the solution is applicable for an arbitrary number of virtual users.

Figure 10:
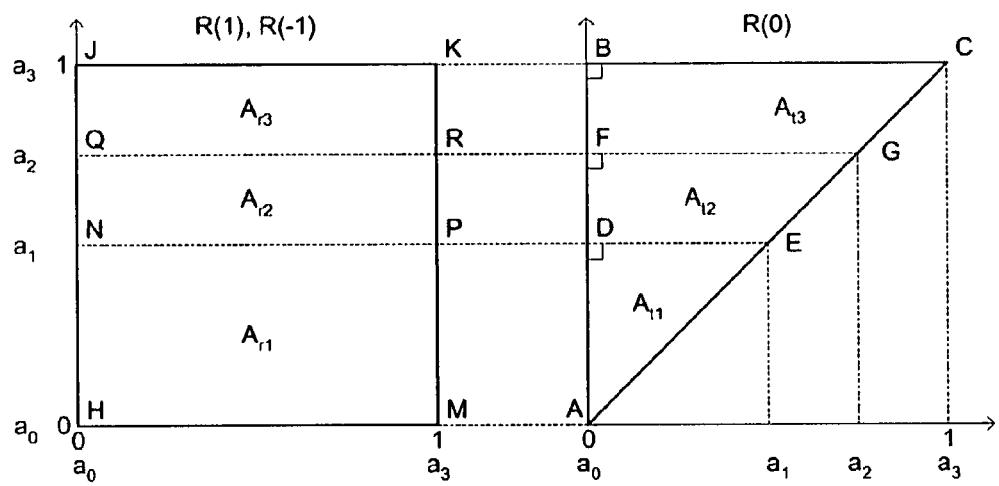
FIG. 10 illustrates an example of loading the R matrices on multiple compute nodes in a system according to the invention.

FIG. 10 shows a model of the normalized optimization scenario. The computations for the R(1)/R(-1) matrix are represented by the square HJKM, while the computations for the R(0)matrix are represented by the triangle ABC. From geometry, the area of a rectangle of length b and height h is:

$$A_r = bh$$

For a triangle with a base width b and height h, the area is calculated by:

$$A_t = \frac{1}{2}bh$$

When combined with a common height a, the formula for the area becomes:

$$A_i = A_{ri} + A_{ti}$$

$$= a_i a_e + \frac{1}{2}a_i^2$$

The formula for A gives the area for the total region below the partition line. For example, the formula for A2 gives the area within the rectangle HQRM plus the region within triangle AFG. For the cost function, the difference in successive areas is used. That is:

$$B_i = A_i - A_{i-1}$$

$$= \frac{1}{2}a_i^2 + a_i - \frac{1}{2}a_{i-1}^2 - a_{i-1}$$

For an optimum solution, the B must be equal for i=1, 2, ... ,N, where N is the number of processors performing the calculations. Because the total normalized load is equal to AN, the loading per processor load is equal to AN/N, $$B_i = \frac{A_N}{N} = \frac{A_3}{3} = \frac{3}{2N}, \text{ for } i = 1, 2 \ldots, N.$$

By combining the two equations for B, the solution for $a_i$ is found by finding the roots of the equation:

$$\frac{1}{2}a_i^2 + a_i - \frac{1}{2}a_{i-1}^2 - a_{i-1} - \frac{3}{2N} = 0_<$$

The solution for a is:

$$a_i = -1 \pm \sqrt{1 + a_{1i}^2 + 2a_{i-1} + \frac{3}{N}}, \text{ for } i - 1, 2, \ldots, N$$

Since the solution space must fall in the range [0,1], negative roots are not valid solutions to the problem. On the surface, it appears that the a must be solved by first solving for case where=1. However, by expanding the recursions of the a and using the fact that a0 equals zero, a solution that does not require previous a,=0,1, . . . ,n−1 exists. The solution is:

$$a_i = -1 + \sqrt{1 + \frac{3i}{N}}$$

As shown in the following table, the normalized partition values for two, three, and four processors. To calculate the actual partitioning values, the number of active virtual users is multiplied by the corresponding table entries. Since a fraction of a user cannot be allocated, a ceiling operation is performed that biases the number of virtual users per processor towards the processors whose loading function is less sensitive to perturbations in the number of users.

| Location | Two Processors | Three Processors | Four Processors |
| --- | --- | --- | --- |
| $a_1$ | $-1 + \sqrt{\frac{5}{2}}$ (0.5811) | $-1 + \sqrt{2}$ (0.4142) | $-1 + \sqrt{\frac{7}{4}}$ (0.3229) |
| $a_2$ | — | $-1 + \sqrt{3}$ (0.7321) | $-1 + \sqrt{\frac{5}{2}}$ (0.5811) |
| $a_3$ | — | — | $-1 + \sqrt{\frac{13}{4}}$ (0.8028) |

One skilled in the art can appreciate that the load balancing for the R-matrix results in a non-uniform partitioning of the rows of the final matrices over a number of processors. The partition sizes increase as the partition starting user index increases. When the system is running at full capacity (e.g., all co-processors are functional, and the maximum number of users is processed while still within the bounds of real-time operation), and a co-processor fails, the impact can be significant.

This impact can be minimized by allocating the first user partition to the disabled node. Also the values that would have been calculated by that node are set to zero. This reduces the effects of the failed node. By changing which user data is set to zero (e.g., which users are assigned to the failed node) the overall errors due to the lack of non-zero output data for that node are averaged over all of the users, providing a "soft" degradation.

R, C Values Contiguous in MPIC Processor Memory

Further, via connection with the crossbar multi-port connector, the multi-processor elements calculating the R-matrix (which depends on the C-matrix, which in turn depends on the gamma-matrix) can place the results in a processor element performing the MPIC functions. For one optimal solution, the values can be placed in contiguous locations accessable (or local with) the MPIC processor. This method allows adjacent memory addresses for the R and C values, and increases throughput via simply incrementing memory pointers rather that using a random access approach.

As discussed above, the values of the Γ-matrix elements which are non-zero need to be determined for efficient storage of the Γ-matrix. For high data rate users, certain elements $c_l[n]$ are zero, even within the interval $n=0:N-1$, $N=256$. These zero values reduce the interval over which $\Gamma_{lk}[m]$ is non-zero. In order to determine the interval for non-zero values consider the following relations:

$$\Gamma_{lk}[m] \equiv \frac{1}{2N_l} \sum_{n=0}^{N-1} c_l^*[n] \cdot c_k[n-m]$$

The index $j_l$ for the lth virtual user is defined such that $c_l[n]$ is non-zero only over the interval $n=j_lN_l:j_lN_l+N_l-1$. Correspondingly, the vector $c_k[n]$ is non-zero only over the interval $n=j_kN_k:j_kN_k+N_k-1$. Given these definitions, $\Gamma_{lk}[m]$ can be rewritten as $$\Gamma_{lk}[m] \equiv \frac{1}{2N_l} \sum_{n=0}^{N_l-1} c_l^*[n+j_lN_l] \cdot c_k[n+j_lN_l-m]$$

The minimum value of iii for which $\Gamma_{lk}[m]$ is non-zero is $m_{min2} = -j_kN_k+j_lN_l-N_k+1$ and the maximum value of m for which $\Gamma_{lk}[m]$ is non-zero is $m_{max2} = N_l-1-j_kN_k+j_lN_l$ The total number of non-zero elements is then $$m_{total} \equiv m_{max2} - m_{min2} + 1$$

$$= N_l + N_k - 1$$

The table below provides a sample of the the number of bytes per l,k virtual-user pair based on 2 bytes per element—one byte for the real part and one byte for the imaginary part. In other embodiments, these values vary.

|  | $N_k$ = 256 | 128 | 64 | 32 | 16 | 8 | 4 |
|---|---|---|---|---|---|---|---|
| $N_l$ = 256 | 1022 | 766 | 638 | 574 | 542 | 526 | 518 |
| 128 | 766 | 510 | 382 | 318 | 286 | 270 | 262 |
| 64 | 638 | 382 | 254 | 90 | 158 | 142 | 134 |
| 32 | 574 | 318 | 190 | 26 | 94 | 78 | 70 |
| 16 | 542 | 286 | 158 | 94 | 62 | 46 | 38 |
| 8 | 526 | 270 | 142 | 78 | 46 | 30 | 22 |
| 4 | 518 | 262 | 134 | 70 | 38 | 22 | 14 |

The memory requirements for storing the Γ-matrix for a given number of users at each spreading factor can be determined as described below. For example, for $K_q$ virtual users at spreading factor $N_q \equiv 2^{8-q}$, q=0:6, where $K_q$ is the qth element of the vector K (some elements of K may be zero), the storage requirement can be computed as follows. Let the table above be stored in matrix M with elements $M_{qq}$. For example, $M_{00}=1022$, and $M_{01}=766$. The total memory required by the Γ matrix in bytes is then given by the following relation $$M_{bytes} = \sum_{q=0}^{6} \left\{ \frac{K_q(K_q+1)}{2} M_{qq} + \sum_{q'=q+1}^{6} K_q K_{q'} M_{qq'} \right\} \quad (27)$$

$$= \frac{1}{2} \sum_{q=0}^{6} \left\{ K_q M_{qq} + \sum_{q'=0}^{6} K_q K_{q'} M_{qq'} \right\}$$

Then, continuing the example, for 200 virtual users at spreading factor $N_0=256$, $K_q=200\delta_{q0}$, which in turn results in $M_{bytes}=\frac{1}{2}K_0(K_0+1)M_{00}=100(201)(1022)=20.5$ MB. For 10 384 Kbps users, $K_q=K_0\delta_{q0}+K_6\delta_{q6}$ with $K_0=10$ and $K_6=640$, which results in a storage requirement that is given by the following relations:

$M_{bytes}=\frac{1}{2}K_0(K_0+1)M_{00}+K_0K_6M_{06}+\frac{1}{2}K_6(K_6+1)M_{66}=5$
(11)(1022)+10(640)(518)+320(641)(14)=6.2
MB.

The Γ-matrix data can be addressed, stored, and accessed as described below. In particular, for each pair (l,k), k>=l, there are 1 complex $\Gamma_{lk}[m]$ values for each value of m, where m ranges from $m_{min2}$ to $m_{max2}$, and the total number of non-zero elements is $m_{total}=m_{max2}-m_{min2}+1$. Hence, for each pair (l,k), k>=l, there exists $2m_{total}$ time-contiguous bytes.

In one embodiment, an array structure is created to access the data, as shown below:

```
struct {
    int m__min2;
    int m__max2;
    int m__total;
    char * Glk;
} G_info[N_VU_MAX][N_VU_MAX];
```

The C-matrix data can then be retrieved by utilizing the following exemplary algorithm:

```
m_min2 = G_info[l][k].m__min2
m_max2 = G_info[l][k].m__max2
N_g = L_g/N_c
Nl = m'*N - L_g/(2N_c)
for m' = 0:1
    for q = 0:L-1
        for q' = 0:L-1
            τ = m'T + τ_lq - τ_kq'
            m_min1 = Nl - n_lq + n_kq'
            m_max1 = m_min1 + N_g
            m_min = max[m_min1, m_min2]
            m_max = min[m_min1, m_min2]
            if m_max >= m_min
                m_span = m_max - m_min + 1
                sum1 = 0.0;
```

-continued

```
        ptr1 = &G_info[1][k].Glk[m_min]
        ptr2 = &g[m_min*N_c + τ]
        while m_span > 0
            sum1 += (*ptr1++)*(*ptr2++)
            m_span—
        end
        C[m'][l][k][q][q'] = sum1
      end
    end
  end
end
```

A direct method for calculating the C-matrix (in symmetry) is performance of the following equation:

$$C_{klq'q}[m'] = \frac{N_l}{N_k} C^*_{lkqq'}[m']$$

Due to symmetry, there are $1.5(K_v L)^2$ elements to calculate. Assuming all users are at SF 256, each calculation requires 256 cmacs, or 2048 operations. The probability that a multipath changes in a 10 ms time period is approximately 10/200=0.05 if all users are at 120 kmph. Assuming a mix of user velocities, a reasonable probability is 0.025. Because the C-matrix represents the interaction between two users, the probability that C-matrix elements change in a 10 ms time period is approximately 0.10 for all users at 120 kmph, or 0.05 for a mix of users velocities. Hence, the GOPS are shown in the following table.

| $K_V$ | High velocity users | $15(K_V L)2$ | Gops | Percentage change | GOPS |
|---|---|---|---|---|---|
| 200 | 100% | 960,000 | 1.966 | 20 | 39.3 |
| 200 | 50% | 960,000 | 1.966 | 15 | 29.5 |
| 128 | 100% | 393,216 | 0.805 | 20 | 16.1 |
| 128 | 50% | 393,216 | 0.805 | 15 | 12.1 |

One skilled in the art can appreciate that a fast fourier transform (FFT) can be used to calculate the correlations for a range of offsets, tau, using:

$$C_{klq'q}[m'] = \frac{1}{2N_l} \sum_n s_k[nN_c + m'T + \hat{\tau}_{lq} - \hat{\tau}_{lq'}] \cdot c_l^*[n]$$

$$= C_{lk}[\tau_{lkqq'}[m']]$$

$$C_{lk}[\tau] \equiv \frac{1}{2N_l} \sum_n s_k[nN_c + \tau] \cdot c_l^*[n]$$

$$\tau_{lkqq'}[m']=m'T+\hat{\tau}_{lq}-\hat{\tau}_{lq'}$$

The length of the waveform $s_k[t]$ is $L_g+255N_c=1068$ for $L_g=48$ and $N_c=4$. This is represented as $N_c$ waveforms of length $L_g/N_c+255=267$. One advantage of this approach is that elements can be stored for a range of offsets tau so that calculations do not need to be performed when lags change. For delay spreads of about 4 micro-seconds 32 samples need to be stored for each m'.

The C-matrix elements need be updated when the spreading factor changes. The spreading factor can change du to AMR codec rate changes, multiplexing of the dedicated channels, or multiplexing of data services, to name a few reasons. It is reasonable to assume that 5% of the users, hence 10% of the elements, change every 10 ms.

Gamma-Matrix Generated in FPGA

The C-matrix elements can be represented in terms of the underlying code correlations using:

$$C_{klq'q}[m'] = \frac{1}{2N_l} \sum_n s_k[nN_c + m'T + \hat{\tau}_{lq} - \hat{\tau}_{lq'}] \cdot c_l^*[n]$$

$$= \sum_m g[mN_c + \tau] \cdot \Gamma_{lk}[m]$$

$$\Gamma_{lk}[m] = \frac{1}{2N_l} \sum_n c_l^*[n] \cdot c_k[n-m]$$

$$\tau=m'T+\hat{\tau}_{lq}-\hat{\tau}_{lq'}$$

If the length of g[t] is Lg=48 and Nc=4, then the summation over m requires 48/4=12 macs for the real part and 12 macs for the imaginary part. The total ops is then 48 ops per element. (Compare with 2048 operations for the direct method.) Hence for the ease where there are 200 virtual users and 20% of the C-matrix needs updating every 10 ms the required complexity is (960000 cl)(48 ops/cl)(0.20)/(0.010 see)=921.6 MOPS. This is the required complexity to compute the C-matrix from the Tau-matrix. The cost of computing the Tau-matrix must also be considered. The Tau-matrix can be efficiently computed since the fundamental operation is a convolution of codes with elements constrained to bc+/−1+/−j. Further, the Tau-matrix can be calculated using modulo-2 addition (e.g., XOR) using several method, e.g. register shifting, XOR logic gates, and so on.

The Gamma matrix (Γ) represents the correlation between the complex user codes. The complex code for user 1 is assumed to be infinite in length, but with only $N_l$ non-zero values. The non-zero values are constrained to bc±1±j. The Γ-matrix can be represented in terms of the real and imaginary parts of the complex user codes, and is based on the relationship:

$$\Gamma_{lk}^{XY}[m] \equiv \frac{1}{2N_l}\{M_{lk}^{XY}[m] - 2N_{lk}^{XY}[m]\}$$

$$M_{lk}^{XY}[m] \equiv \sum_n \cdot m_l^X[n] \cdot m_k^Y[n-m]$$

$$N_{lk}^{XY}[m] \equiv \sum_n (\gamma_l^X[n] \oplus \gamma_k^Y[n-m]) \cdot m_l^X[n] \cdot m_k^Y[n-m]$$

which can be performed using a dual-set of shift registers and a logical circuit containing modulo-2 (e.g., Exclusive-OR "XOR") logic elements. Further, one skilled in the art can appreciate that such a logic device can be implemented in a field programmable gate array, which can be programmed via the host controller, a compute element, or other device including an application specific integrated circuit. Further, the FPGA can be progammed via the RACE-way™ bus, for example.

The above shift registers together with a summation device calculates the functions $M_{lk}^{XY}[m]$ and $N_{lk}^{XY}[m]$. The remaining calculations to form $\Gamma_{lk}^{XY}[m]$ and subsequently $\Gamma_{lk}[m]$ can be performed in software. Note that the four functions $\Gamma_{lk}^{XY}[m]$ corrsponding to X, Y=R, I which are components of can be calculated in parallel. For $K_v$=200 virtual users, and assuming that 10% of all (l, k) pairs must be calculated in 2 ms, then for real-time operation we must calculate $0.10(200)^2$=4000 elements (all shifts) in 2 ms, or about 2M elements (all shifts) per second. For $K_v$=128 virtual users the requirement drops to 0.8192M elements (all shifts) per second.

In what has been presented the elements are calculated for all 512 shifts. Not all of these shifts are needed, so it is possible to reduce the number of calculations per elements. The cost is increased design complexity.

Figure 11:
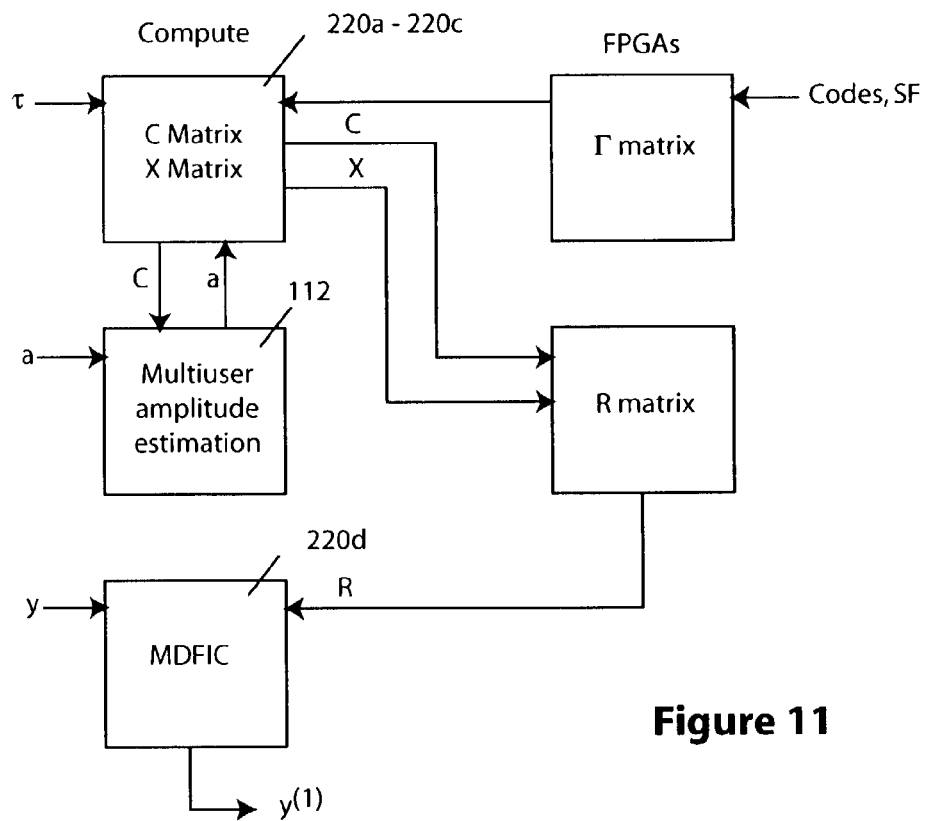
FIG. 11 depicts a short-code loading implementation with parallel processing of the matrices in a system according to the invention.

Therefore, a possible loading scenaio for performing short-code multiple user detection on the hardware described herein is illustrated in FIG. 11. A processor board 118 with four compute elements 220 can be used as shown. Three of the compute nodes (e.g., 220a-220c) can be used to calculate the C-matrix and R-matrix. One of the compute nodes (e.g., 220d) can be used for multiple-stage decision-feedback interference cancellation (MDFIC) techniques. The Tau-Matrix and R-Matrix is calculated using FPGA's that can be programmed by the host controller 203, or ASICs. Further, multiuser amplitude estimation is performed within the modem card 112.

Long-Code Processing

Figure 12:
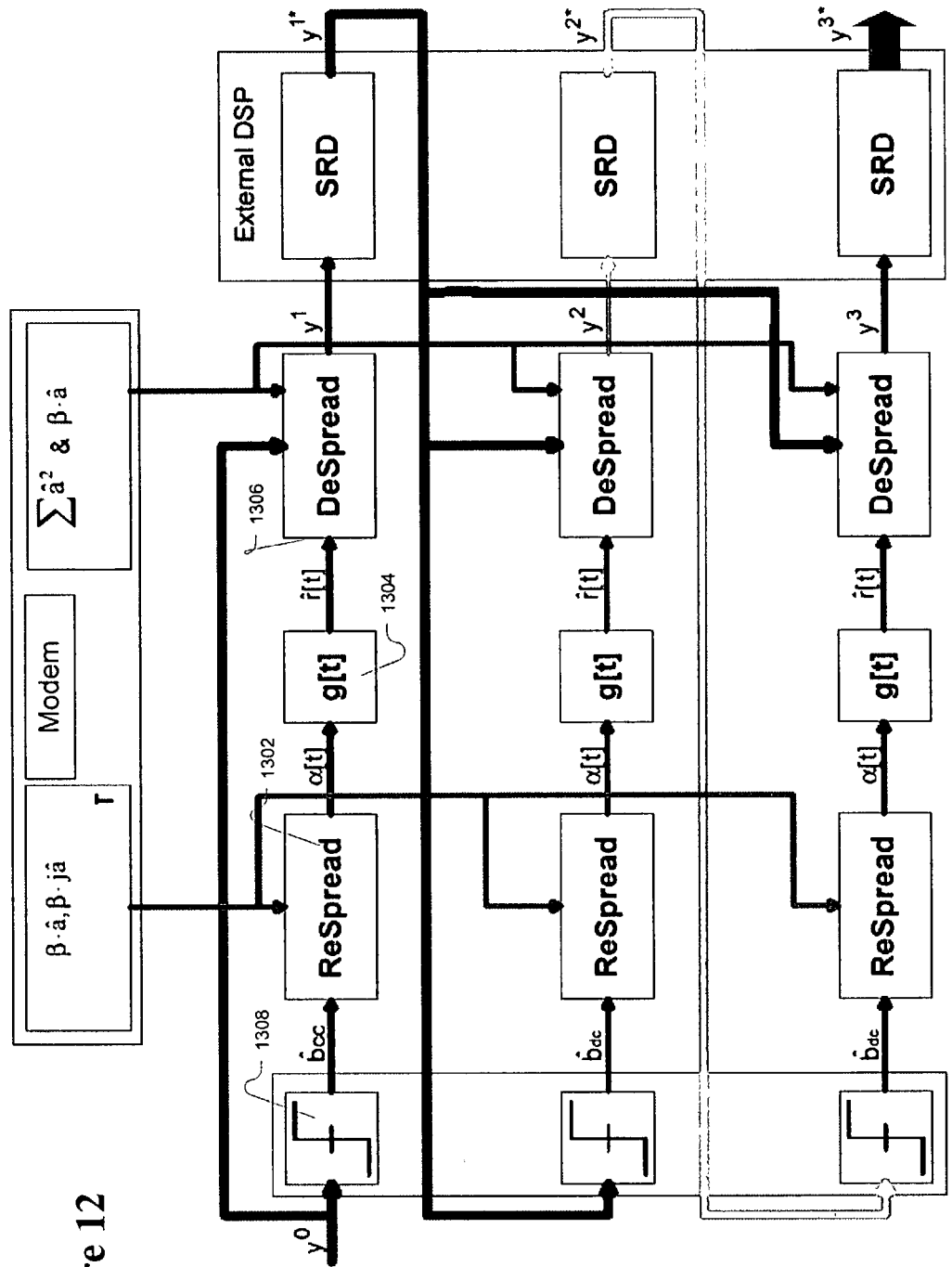
FIG. 12 depicts a long-code loading implementation utilizing pipelined processing and a triple-iteration of refinement in a system according to the invention.

Therefore it can be appreciated by one skilled in the art that short-code MUD can be performed using the system architecture described herein. FIG. 12 shows a preferred embodiment for long-code MUD processing. In this embodiment, each frame of data is processed three times by the MUD processor, although it can be recognized that multiple processors can perform the iterative nature of the embodiment. During the first pass, only the control channels are respread which the maximum ratio combination (MRC) and MUD processing is performed on the data channels. During subsequent passes, data channels are processed exclusively. New y (i.e., soft decisions) and b (i.e., hard decisions) data are derived as shown in the diagram.

Amplitude ratios and amplitudes are determined via the DSP (e.g., element 900, or a DSP otherwise coupled with the processor board 118 and receiver 110), as well as certain waveform statistics. These values (e.g., matrices and vectors) are used by the MUD processor in various ways. The MUD processor is decomposed into four stages that closely match the structure of the software simulation: Alpha Calculation and Respread 1302, raised-cosine filtering 1304, de-spreading 1306, and MRC 1308. Each pass through the MUD processor is equivalent to one processing stage of the software implementation. The design is pipelined and "parallelized." In the illustrated embodiment, the clock speed can be 132 MHz resulting in a throughput of 2.33 ms/frame, however, the clock rate and throughput varies depending on the requirements. The illustrated embodiment allows for three-pass MUD processing with additional overhead from external processing, resulting in a 4-times real-time processing throughput.

The alpha calculation and respread operations 1302 are carried out by a set of thirty-two processing elements arranged in parallel. These can be processing elements within an ASIC, FPGA, PLD or other such device, for example. Each processing element processes two users of four fingers each. Values for b are stored in a double-buffered lookup table. Values of a(hat) and ja(hat) are pre-multiplied with beta by an external processor and stored in a quad-buffered lookup table. The alpha calculation state generated the following values for each finger, where subscripts indicate antenna identifier:

$$\alpha_0 = \beta_0 \cdot (C \cdot \hat{a}_0 - jC \cdot j\hat{a}_0)$$

$$j\alpha_0 = \beta_0 \cdot (jC \cdot \hat{a}_0 + C \cdot j\hat{a}_0)$$

$$\alpha_1 = \beta_1 \cdot (C \cdot \hat{a}_1 - jC \cdot j\hat{a}_1)$$

$$j\alpha_1 = \beta_1 \cdot (jC \cdot \hat{a}_1 + C \cdot j\hat{a}_1)$$

These values are accumulated during the serial processing cycle into four independent 8-times oversampling buffers. There are eight memory elements in each buffer and the element used is determined by the sub-chip delay setting for each finger.

Once eight fingers have been accumulated into the oversampling buffer, the data is passed into set of four independent adder-trees. These adder-trees each termination in a single output, completing the respread operation.

The four raised-cosine filters 1304 convolve the alpha data with a set of weights determined by the following equation:

$$g_{rc}(t) = \frac{\sin\left(\pi\frac{1}{t}\right) \cdot \cos\left(\alpha\pi\frac{1}{T}\right)}{\pi\frac{1}{t}\left(1 - \left(2\alpha\frac{1}{T}\right)^2\right)}$$

The filters can be implemented with 97 taps with odd symmetry. The filters illustrated run at 8-times the chip rate, however, other rates are possible. The filters can be implemented in a variety of compute elements 220, or other devices such as ASICs, FPGAs for example.

The despread function 1306 can be performed by a set of thirty-two processing elements arranged in parallel. Each processing element serially processes two users of four fingers each.

For each finger, one chip value out of eight, selected based on the sub-chip delay, is accepted from the output of the raised-cosine filter. The despread state performs the following calculations for each finger (subscripts indicate antenna):

$$y_0 = \sum_0^{SF-1} C \cdot r_0 + jC \cdot jr_0$$

$$jy_0 = \sum_0^{SF-1} C \cdot jr_0 - jC \cdot r_0$$

$$y_1 = \sum_0^{SF-1} C \cdot r_1 + jC \cdot jr_1$$

$$jy_1 = \sum_0^{SF-1} C \cdot jr_1 - jC \cdot r_1$$

The MRC operations are carried out by a set of four processing elements arranged in parallel, such as the compute elements 220 for example. Each processor is capable of serially processing eight users of four fingers each. Values for y are stored in a double-buffered lookup table. Values for b are derived from the MSB of the y data. Note that the b data used in the MUD stage is independent of the b data used in the respread stage. Values of â and jâ<are pre-multiplied with β by an external processor and stored in a quad-buffered lookup table. Also, $\Sigma(\hat{a}^2 + j\hat{a}^2)$ for each channel is stored in a quad-buffered table.

The output stage contains a set of sequential destination buffer pointers for each channel. The data generated by each channel, on a slot basis, is transferred to the RACEway™ destination indicated by these buffers. The first word of each of these transfers will contain a counter in the lower sixteen bits indicating how many y values were generated. The upper sixteen bits will contain the constant value 0xAA55. This will allow the DSP to avoid interrupts by scanning the first word of each buffer.

In addition, the DSP_UPDATE register contains a pointer to single RACEway™ location. Each time a slot or channel data is transmitted, an internal counter is written to this location. The counter is limited to 10 bits and will wrap around with a terminal count value of 1023.

The method of operation for the long-code multiple user detection algorithm (LCMUD) is as follows. Spread factor for four-channels requires significant amount of data transfer. In order to limit the gate count of the hardware implementation, processing an SF4 channel can result in reduced capability.

A SF4 user can be processed on certain hardware channels. When one of these special channels is operating on an SF4 user, the next three channels are disabled and are therefore unavailable for processing. This relationship is as shown in the following table:

| SF4 Chan | Disabled Channels | SF4 Chan | Disabled Channels |
|---|---|---|---|
| 0 | 1, 2, 3 | 32 | 33, 34, 35 |
| 4 | 5, 6, 7 | 36 | 37, 38, 39 |
| 8 | 9, 10, 11 | 40 | 41, 42, 43 |
| 12 | 12, 14, 15 | 44 | 45, 46, 47 |
| 16 | 17, 18, 19 | 48 | 49, 50, 51 |
| 20 | 21, 22, 23 | 52 | 53, 54, 55 |
| 24 | 25, 26, 27 | 56 | 57, 58, 59 |
| 28 | 29, 30, 31 | 60 | 61, 62, 63 |

The default y and b data buffers do not contain enough space for SF4 data. When a channel is operating on SF4 data, the y and b buffers extend into the space of the next channel in sequence. For example, if channel 0 is processing SF data, the channel 0 and channel 1 b buffers are merged into a single large buffer of 0x40 32-bit words. The y buffers are merged similarly.

In typical operation, the first pass of the LCMUD algorithm will respread the control channels in order to remove control interference. For this pass, the b data for the control channels should be loaded into BLUT while the y data for data channels should be loaded into YDEC. Each channel should be configured to operate at the spread factor of the data channel stored into the YDEC table.

Control channels are always operated at SF 256, so it is likely that the control data will need to be replicated to match the data channel spread factor. For example, each bit (b entry) of control data would be replicated 64 times if that control channel were associated with an SF 4 data channel.

Each finger in a channel arrives at the receiver with a different delay. During the Respread operation, this skew among the fingers is recreated. During the MRC stage of MUD processing, it is necessary to remove this skew and realign the fingers of each channel.

This is accomplished in the MUD processor by determining the first bit available from the most delayed finger and discarding all previous bits from all other fingers. The number of bits to discard can be individually programmed for each finger with the Discard field of the MUDPARAM registers.

This operation will typically result in a 'short' first slot of data. This is unavoidable when the MUD processor is first initialized and should not create any significant problems. The entire first slot of data can be completely discarded if 'short' slots are undesirable.

A similar situation will arise each time processing is begun on a frame of data. To avoid losing data, it is recommended that a partial slot of data from the previous frame be overlapped with the new frame. Trimming any redundant bits created this way can be accomplished with the Discard register setting or in the system DSP. In order to limit memory requirements, the LCMUD FPGA processes one slot of data at a time. Doubling buffering is used for b and y data so that processing can continue as data is streamed in. Filling these buffers is complicated by the skew that exists among fingers in a channel.

Figure 13:
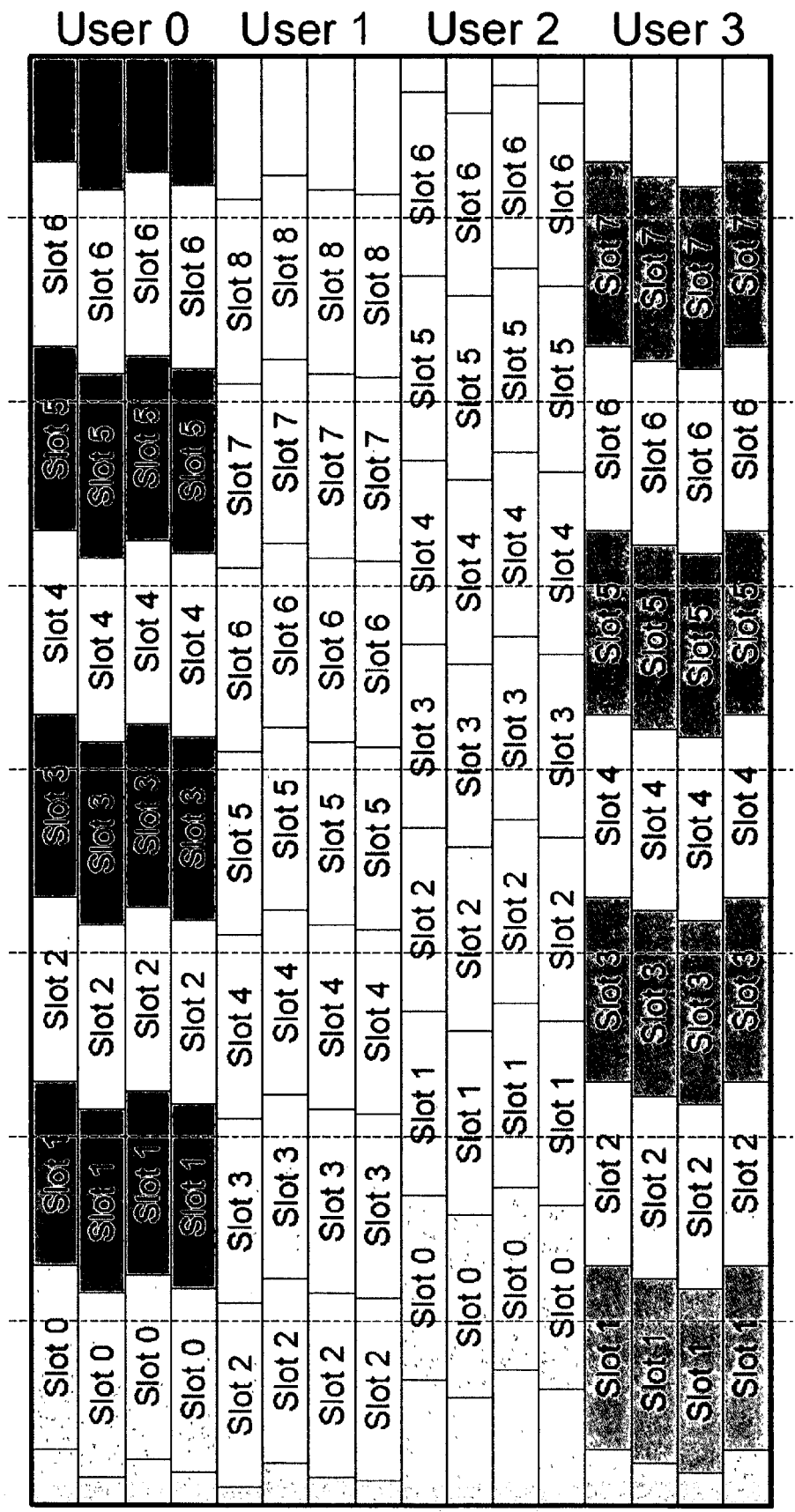
FIG. 13 illustrates skewing of multiple user waveforms.

FIG. 13 illustrates the skew relationship among fingers in a channel and among the channels themselves. The illustrated embodiment allows for 20 us (77.8 chips) of skew among fingers in a channel and certain skew among channels, however, in other embodiments these skew allowances vary.

There are three related problems that are introduced by skew: Identifying frame & slot boundaries, populating b and y tables and changing channel constants.

Because every finger of every channel can arrive at a different time, there are no universal frame and slot boundaries. The DSP must select an arbitrary reference point. The data stored in b & y tables is likely to come from two adjacent slots.

Because skew exists among fingers in a channel, it is not enough to populate the b & y tables with 2,560 sequential chips of data. There must be some data overlap between buffers to allow lagging channels to access "old" data. The amount of overlap can be calculated dynamically or fixed at some number greater than 78 and divisible by four (e.g. 80 chips). The starting point for each register is determined by the Chip Advance field of the MUDPARAM register.

A related problem is created by the significant skew among channels. As can be seen in FIG. 13, Channel 0 is receiving Slot 0 while Channel 1 is receiving Slot 2. The DSP must take this skew into account when generating the b and y tables and temporally align channel data.

Selecting an arbitrary "slot" of data from a channel implies that channel constants tied to the physical slot boundaries may change while processing the arbitrary slot. The Constant Advance field of the MUDPARAM register is used to indicate when these constants should change.

Registers affected this way are quad-buffered. Before data processing begins, at least two of these buffers should be initialized. During normal operation, one additional buffer is initialized for each slot processed. This system guarantees that valid constants data will always be available.

The following two tables shown the long-code MUD FPGA memory map and control/status register:

| Start Addr | End Addr | Name | Description |
|---|---|---|---|
| 0000_0000 | 0000_0000 | CSR | Control & Status Register |
| 0000_0008 | 0000_000C | DSP_UPDATE | Route & Address for DSP updating |
| 0001_0000 | 0001_FFFF | MUDPARAM | MUD Parameters |

-continued

| Start Addr | End Addr  | Name   | Description                         |
|------------|-----------|--------|-------------------------------------|
| 0002_0000  | 0002_FFFF | CODE   | Spreading Codes                     |
| 0003_0000  | 0004_FFFF | BLUT   | Respread: b Lookup Table            |
| 0005_0000  | 0005_FFFF | BETA_A | Respread: Beta * a_hat Lookup Table |
| 0006_0000  | 0007_FFFF | YDEC   | MUD & MRC: y Lookup Table           |
| 0008_0000  | 0008_FFFF | ASQ    | MUD & MRC: Sum a_hat squared LUT    |
| 000A_0000  | 000A_FFFF | OUTPUT | Output Routes & Addresses           |

| Bit   | 31 | 30 | 29 | 28 | 27 | 26 | 25 | 24 | 23 | 22 | 21 | 20 | 19 | 18 | 17 | 16 |
|-------|----|----|----|----|----|----|----|----|----|----|----|----|----|----|----|----|
| Name  |    |    |    |    |    |    |    |    |    | Reserved |  |  |  |  |  |  |
| R/W   |    |    |    |    |    |    |    |    |    | RO       |  |  |  |  |  |  |
| Reset | X  | X  | X  | X  | X  | X  | X  | X  | X  | X  | X  | X  | X  | X  | X  | X  |

| Bit   | 15 | 14 | 13 | 12 | 11 | 10 | 9  | 8  | 7    | 6  | 5  | 4  | 3  | 2   | 1   |
|-------|----|----|----|----|----|----|----|----|------|----|----|----|----|-----|-----|
| Name  |    |    | Reserved |  |  |  |    | YB | CBUF | A1 | A0 | R1 | R0 | Lst | Rst |
| R/W   |    |    | RO       |  |  |  |    | RO | RO   | RO | RO | Rw | Rw | Rw  | Rw  |
| Reset | X  | X  | X  | X  | X  | X  | X  | 0  | 0    | 0  | 0  | 0  | 0  | 0   | 0   |

The register YB indicates which of two y and b buffers are in use. If the system is currently not processing, YB indicates the buffer that will be used when processing is initiated.

CBUF indicates which of four round-robin buffers for MUD constants (a^ beta) is currently in use. Finger skew will result in some fingers using a buffer one in advance of this indicator. To guarantee that valid data is always available, two full buffers should be initialized before operation begins.

If the system is currently not processing, CBUF indicates the buffer that will be used when processing is restarted. It is technically possible to indicate precisely which buffer is in use for each finger in both the Respread and Despread processing stages. However, this would require thirty-two 32-bit registers. Implementing these registers would be costly, and the information is of little value.

A1 and A0 indicate which y and b buffers are currently being processed. A1 and A0 will never indicate '1' at the same time. An indication of '0' for both A1 and A0 means that MUD processor is idle.

R1 and R0 are writable fields that indicate to the MUD processor that data is available. R1 corresponds to y and b buffer 1 and R0 corresponds to y and b buffer 0. Writing a '1' into the correct register will initiate MUD processing. Note that these buffers follow strict round-robin ordering. The YB register indicates which buffer should be activated next.

These registers will be automatically reset to '0' by the MUD hardware once processing is completed. It is not possible for the external processor to force a '0' into these registers.

A '1' in this bit indicates that this is the last slot of data in a frame. Once all available data for the slot has been processed, the output buffers will be flushed.

A '1' in this bit will place the MUD processor into a reset state. The external processor must manually bring the MUD processor out of reset by writing a '0' into this bit.

DSP_UPDATE is arranged as two 32-bit registers. A RACEway™ route to the MUD DSP is stored at address 0x0000_0008. A pointer to a status memory buffer is located at address 0x0000_000C.

Each time the MUD processor writes a slot of channel data to a completion buffer, an incrementing count value is written to this address. The counter is fixed at 10 bits and will wrap around after a terminal count of 1023.

A quad-buffered version of the MUD parameter control register exists for each finger to be processed. Execution begins with buffer 0 and continues in round-robin fashion. These buffers are used in synchronization with the MUD constants (Beta * a_hat, etc.) buffers. Each finger is provided with an independent register to allow independent switching of constant values at slot and frame boundaries. The following table shows offsets for each MUD channel:

| Offset | User |
|--------|------|
| 0x0000 | 0    |
| 0x0040 | 1    |
| 0x0080 | 2    |
| 0x00C0 | 3    |
| 0x0100 | 4    |
| 0x0140 | 5    |
| 0x0180 | 6    |
| 0x01C0 | 7    |
| 0x0200 | 8    |
| 0x0240 | 9    |
| 0x0280 | 10   |
| 0x02C0 | 11   |
| 0x0300 | 12   |
| 0x0340 | 13   |
| 0x0380 | 14   |
| 0x03C0 | 15   |
| 0x0400 | 16   |
| 0x0440 | 17   |
| 0x0480 | 18   |
| 0x04C0 | 19   |
| 0x0500 | 20   |
| 0x0540 | 21   |
| 0x0580 | 22   |
| 0x05C0 | 23   |
| 0x0600 | 24   |
| 0x0640 | 25   |
| 0x0680 | 26   |
| 0x06C0 | 27   |
| 0x0700 | 28   |
| 0x0740 | 29   |
| 0x0780 | 30   |
| 0x07C0 | 31   |

-continued

| Offset | User |
|---|---|
| 0x0800 | 32 |
| 0x0840 | 33 |
| 0x0880 | 34 |
| 0x08C0 | 35 |
| 0x0900 | 36 |
| 0x0940 | 37 |
| 0x0980 | 38 |
| 0x09C0 | 39 |
| 0x0A00 | 40 |
| 0x0A40 | 41 |
| 0x0A80 | 42 |
| 0x0AC0 | 43 |
| 0x0B00 | 44 |
| 0x0B40 | 45 |
| 0x0B80 | 46 |
| 0x0BC0 | 47 |
| 0x0C00 | 48 |
| 0x0C40 | 49 |
| 0x0C80 | 50 |
| 0x0CC0 | 51 |
| 0x0D00 | 52 |
| 0x0D40 | 53 |
| 0x0D80 | 54 |
| 0x0DC0 | 55 |
| 0x0E00 | 56 |
| 0x0E40 | 57 |
| 0x0E80 | 58 |
| 0x0EC0 | 59 |
| 0x0F00 | 60 |
| 0x0F40 | 61 |
| 0x0F80 | 62 |
| 0x0FC0 | 63 |

The following table shows buffer offsets within each channel:

| Offset | Finger | Buffer |
|---|---|---|
| 0x0000 | 0 | 0 |
| 0x0004 |   | 1 |
| 0x0008 |   | 2 |
| 0x000C |   | 3 |
| 0x0010 | 1 | 0 |
| 0x0014 |   | 1 |
| 0x0018 |   | 2 |
| 0x001C |   | 3 |
| 0x0020 | 2 | 0 |
| 0x0024 |   | 1 |
| 0x0028 |   | 2 |
| 0x002C |   | 3 |
| 0x0030 | 3 | 0 |
| 0x0034 |   | 1 |
| 0x0038 |   | 2 |
| 0x003C |   | 3 |

The following table shown details of the control register:

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | Spread Factor | | | Subchip Delay | | | | | | Discard | | | | | | |
| R/W | RW | | | RW | | | | | | RW | | | | | | |
| Reset | X | X | X | X | X | X | X | X | X | X | X | X | X | X | X | X |

| Bit | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Name | Chip Advance | | | | | | | | Constant Advance | | | | | | | |
| R/W | RW | | | | | | | | RW | | | | | | | |
| Reset | X | X | X | X | X | X | X | X | X | X | X | X | X | X | X | X |

The spread factor field determines how many chip samples are used to generate a data bit. In the illustrated embodiment, all fingers in a channel have the same spread factor setting, however, it can be appreciated by one skilled in the art that such constant factor setting can be variable in other embodiments. The spread factor is encoded into a 3-bit value as shown in the following table:

| SF Factor | Spread Factor |
|---|---|
| 000 | 256 |
| 001 | 128 |
| 010 | 64 |
| 011 | 32 |
| 100 | 16 |
| 101 | 8 |
| 110 | 4 |
| 111 | RESERVED |

The field specifies the sub-chip delay for the finger. It is used to select one of eight accumulation buffers prior to summing all Alpha values and passing them into the raised-cosine filter.

Discard determines how many MUD-processed soft decisions (y values) to discard at the start of processing. This is done so that the first y value from each finger corresponds to the same bit. After the first slot of data is processed, the Discard field should be set to zero.

The behavior of the discard field is different than that of other register fields. Once a non-zero discard setting is detected, any new discard settings from switching to a new table entry are ignored until the current discard count reaches zero. After the count reaches zero, a new discard setting may be loaded the next time a new table entry is accessed.

All fingers within a channel will arrive at the receiver with different delays. Chip Advance is used to recreate this signal skew during the Respread operation. Y and b buffers are arranged with older data occupying lower memory addresses. Therefore, the finger with the earliest arrival time has the highest value of chip advance. Chip Advanced need not be a multiple of Spread Factor.

Constant advance indicates on which chip this finger should switch to a new set of constants (e.g. a^) and a new control register setting. Note that the new values take effect on the chip after the value stored here. For example, a value of 0x0 would cause the new constants to take effect on chip 1. A value of 0xFF would cause the new constants to take effect on chip 0 of the next slot. The b lookup tables are arranged as shown in the following table. B values each occupy two bits of memory, although only the LSB is utilized by LCMUD hardware.

| Offset | Buffer |
|---|---|
| 0x0000 | U0 B0 |
| 0x0020 | U1 B0 |
| 0x0040 | U0 B1 |
| 0x0060 | U1 B1 |
| 0x0080 | U2 B0 |
| 0x00A0 | U3 B0 |
| 0x00C0 | U2 B1 |
| 0x00E0 | U3 B1 |
| 0x0100 | U4 B0 |
| 0x0120 | U5 B0 |
| 0x0140 | U4 B1 |
| 0x0160 | U5 B1 |
| 0x0180 | U6 B0 |
| 0x01A0 | U7 B0 |
| 0x01C0 | U6 B1 |
| 0x01E0 | U7 B1 |
| 0x0200 | U8 B0 |
| 0x0220 | U9 B0 |
| 0x0240 | U8 B1 |
| 0x0260 | U9 B1 |
| 0x0280 | U10 B0 |
| 0x02A0 | U11 B0 |
| 0x02C0 | U10 B1 |
| 0x02E0 | U11 B1 |
| 0x0300 | U12 B0 |
| 0x0320 | U13 B0 |
| 0x0340 | U12 B1 |
| 0x0360 | U13 B1 |
| 0x0380 | U14 B0 |
| 0x03A0 | U15 B0 |
| 0x03C0 | U14 B1 |
| 0x03E0 | U15 B1 |
| 0x0400 | U16 B0 |
| 0x0420 | U17 B0 |
| 0x0440 | U16 B1 |
| 0x0460 | U17 B1 |
| 0x0480 | U18 B0 |
| 0x04A0 | U19 B0 |
| 0x04C0 | U18 B1 |
| 0x04E0 | U19 B1 |
| 0x0500 | U20 B0 |
| 0x0520 | U21 B0 |
| 0x0540 | U20 B1 |
| 0x0560 | U21 B1 |
| 0x0580 | U22 B0 |
| 0x05A0 | U23 B0 |
| 0x05C0 | U22 B1 |
| 0x05E0 | U23 B1 |
| 0x0600 | U24 B0 |
| 0x0620 | U25 B0 |
| 0x0640 | U24 B1 |
| 0x0660 | U25 B1 |
| 0x0680 | U26 B0 |
| 0x06A0 | U27 B0 |
| 0x06C0 | U26 B1 |
| 0x06E0 | U27 B1 |
| 0x0700 | U28 B0 |
| 0x0720 | U29 B0 |
| 0x0740 | U28 B1 |
| 0x0760 | U29 B1 |
| 0x0780 | U30 B0 |
| 0x07A0 | U31 B0 |
| 0x07C0 | U30 B1 |
| 0x07E0 | U31 B1 |
| 0x0800 | U32 B0 |
| 0x0820 | U33 B0 |
| 0x0840 | U32 B1 |
| 0x0860 | U33 B1 |
| 0x0880 | U34 B0 |
| 0x08A0 | U35 B0 |
| 0x08C0 | U34 B1 |
| 0x08E0 | U35 B1 |
| 0x0900 | U36 B0 |
| 0x0920 | U37 B0 |
| 0x0940 | U36 B1 |
| 0x0960 | U37 B1 |
| 0x0980 | U38 B0 |
| 0x09A0 | U39 B0 |
| 0x09C0 | U38 B1 |
| 0x09E0 | U39 B1 |
| 0x0A00 | U40 B0 |
| 0x0A20 | U41 B0 |
| 0x0A40 | U40 B1 |
| 0x0A60 | U41 B1 |
| 0x0A80 | U42 B0 |
| 0x0AA0 | U43 B0 |
| 0x0AC0 | U42 B1 |
| 0x0AE0 | U43 B1 |
| 0x0B00 | U44 B0 |
| 0x0B20 | U45 B0 |
| 0x0B40 | U44 B1 |
| 0x0B60 | U45 B1 |
| 0x0B80 | U46 B0 |
| 0x0BA0 | U47 B0 |
| 0x0BC0 | U46 B1 |
| 0x0BE0 | U47 B1 |
| 0x0C00 | U48 B0 |
| 0x0C20 | U49 B0 |
| 0x0C40 | U48 B1 |
| 0x0C60 | U49 B1 |
| 0x0C80 | U50 B0 |
| 0x0CA0 | U51 B0 |
| 0x0CC0 | U50 B1 |
| 0x0CE0 | U51 B1 |
| 0x0D00 | U52 B0 |
| 0x0D20 | U53 B0 |
| 0x0D40 | U52 B1 |
| 0x0D60 | U53 B1 |
| 0x0D80 | U54 B0 |
| 0x0DA0 | U55 B0 |
| 0x0DC0 | U54 B1 |
| 0x0DE0 | U55 B1 |
| 0x0E00 | U56 B0 |
| 0x0E20 | U57 B0 |
| 0x0E40 | U56 B1 |
| 0x0E60 | U57 B1 |
| 0x0E80 | U58 B0 |
| 0x0EA0 | U59 B0 |
| 0x0EC0 | U58 B1 |
| 0x0EE0 | U59 B1 |
| 0x0F00 | U60 B0 |
| 0x0F20 | U61 B0 |
| 0x0F40 | U60 B1 |
| 0x0F60 | U61 B1 |
| 0x0F80 | U62 B0 |
| 0x0FA0 | U63 B0 |
| 0x0FC0 | U62 B1 |
| 0x0FE0 | U63 B1 |

The following table illustrates how the two-bit values are packed into 32-bit words. Spread Factor 4 channels require more storage space than is available in a single channel buffer. To allow for SF4 processing, the buffers for an even channel and the next highest odd channel are joined together. The even channel performs the processing while the odd channel is disabled.

| Bit | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| Name | b(0) | | b(1) | | b(2) | | b(3) | | b(4) | | b(5) | | b(6) | | b(7) | |
| Bit | 15 | 14 | 13 | 12 | 11 | 10 | 9 | 8 | 7 | 6 | 5 | 4 | 3 | 2 | 1 | 0 |
| Name | b(8) | | b(9) | | b(10) | | b(11) | | b(12) | | b(13) | | b(14) | | b(15) | |

The beta*a-hat table contains the amplitude estimates for each finger pre-multiplied by the value of Beta. The following table shows the memory mappings for each channel.

| Offset | User |
|---|---|
| 0x0000 | 0 |
| 0x0080 | 1 |
| 0x0100 | 2 |
| 0x0180 | 3 |
| 0x0200 | 4 |
| 0x0280 | 5 |
| 0x0300 | 6 |
| 0x0380 | 7 |
| 0x0400 | 8 |
| 0x0480 | 9 |
| 0x0500 | 10 |
| 0x0580 | 11 |
| 0x0600 | 12 |
| 0x0680 | 13 |
| 0x0700 | 14 |
| 0x0780 | 15 |
| 0x0800 | 16 |
| 0x0880 | 17 |
| 0x0900 | 18 |
| 0x0980 | 19 |
| 0x0A00 | 20 |
| 0x0A80 | 21 |
| 0x0B00 | 22 |
| 0x0B80 | 23 |
| 0x0C00 | 24 |
| 0x0C80 | 25 |
| 0x0D00 | 26 |
| 0x0D80 | 27 |
| 0x0E00 | 28 |
| 0x0E80 | 29 |
| 0x0F00 | 30 |
| 0x0F80 | 31 |
| 0x1000 | 32 |
| 0x1080 | 33 |
| 0x1100 | 34 |
| 0x1180 | 35 |
| 0x1200 | 36 |
| 0x1280 | 37 |
| 0x1300 | 38 |
| 0x1380 | 39 |
| 0x1400 | 40 |
| 0x1480 | 41 |
| 0x1500 | 42 |
| 0x1580 | 43 |
| 0x1600 | 44 |
| 0x1680 | 45 |
| 0x1700 | 46 |
| 0x1780 | 47 |
| 0x1800 | 48 |
| 0x1880 | 49 |
| 0x1900 | 50 |
| 0x1980 | 51 |
| 0x1A00 | 52 |
| 0x1A80 | 53 |
| 0x1B00 | 54 |
| 0x1B80 | 55 |
| 0x1C00 | 56 |
| 0x1C80 | 57 |
| 0x1D00 | 58 |
| 0x1D80 | 59 |
| 0x1E00 | 60 |
| 0x1E80 | 61 |
| 0x1F00 | 62 |
| 0x1F80 | 63 |

The following table shows buffers that are distributed for each channel:

| Offset | User Buffer |
|---|---|
| 0x00 | 0 |
| 0x20 | 1 |
| 0x40 | 2 |
| 0x80 | 3 |

The following table shows a memory mapping for individual fingers of each antenna.

| Offset | Finger | Antenna |
|---|---|---|
| 0x00 | 0 | 0 |
| 0x04 | 1 | |
| 0x08 | 2 | |
| 0x0C | 3 | |
| 0x10 | 0 | 1 |
| 0x14 | 1 | |
| 0x18 | 2 | |
| 0x1C | 3 | |

The y (soft decisions) table contains two buffers for each channel. Like the b lookup table, an even and odd channel are bonded together to process SF4. Each y data value is stored as a byte. The data is written into the buffers as packed 32-bit words.

| Offset | Buffer |
|---|---|
| 0x0000 | U0 B0 |
| 0x0200 | U1 B0 |
| 0x0400 | U2 B1 |
| 0x0600 | U3 B1 |
| 0x0800 | U0 B0 |
| 0x0A00 | U1 B0 |
| 0x0C00 | U2 B1 |
| 0x0E00 | U3 B1 |
| 0x0000 | U4 B0 |
| 0x0200 | U5 B0 |
| 0x0400 | U6 B1 |
| 0x0600 | U7 B1 |
| 0x0800 | U4 B0 |

| Offset | Buffer |
|---|---|
| 0x0A00 | U5 B0 |
| 0x0C00 | U6 B1 |
| 0x0E00 | U7 B1 |
| 0x0000 | U8 B0 |
| 0x0200 | U9 B0 |
| 0x0400 | U10 B1 |
| 0x0600 | U11 B1 |
| 0x0800 | U8 B0 |
| 0x0A00 | U9 B0 |
| 0x0C00 | U10 B1 |
| 0x0E00 | U11 B1 |
| 0x0000 | U12 B0 |
| 0x0200 | U13 B0 |
| 0x0400 | U14 B1 |
| 0x0600 | U15 B1 |
| 0x0800 | U12 B0 |
| 0x0A00 | U13 B0 |
| 0x0C00 | U14 B1 |
| 0x0E00 | U15 B1 |
| 0x4000 | U16 B0 |
| 0x4200 | U17 B0 |
| 0x4400 | U18 B1 |
| 0x4600 | U19 B1 |
| 0x4800 | U16 B0 |
| 0x4A00 | U17 B0 |
| 0x4C00 | U18 B1 |
| 0x4E00 | U19 B1 |
| 0x5000 | U20 B0 |
| 0x5200 | U21 B0 |
| 0x5400 | U22 B1 |
| 0x5600 | U23 B1 |
| 0x5800 | U20 B0 |
| 0x5A00 | U21 B0 |
| 0x5C00 | U22 B1 |
| 0x5E00 | U23 B1 |
| 0x6000 | U24 B0 |
| 0x6200 | U25 B0 |
| 0x6400 | U26 B1 |
| 0x6600 | U27 B1 |
| 0x6800 | U24 B0 |
| 0x6A00 | U25 B0 |
| 0x6C00 | U26 B1 |
| 0x6E00 | U27 B1 |
| 0x7000 | U28 B0 |
| 0x7200 | U29 B0 |
| 0x7400 | U30 B1 |
| 0x7600 | U31 B1 |
| 0x7800 | U28 B0 |
| 0x7A00 | U29 B0 |
| 0x7C00 | U30 B1 |
| 0x7E00 | U31 B1 |
| 0x8000 | U32 B0 |
| 0x8200 | U33 B0 |
| 0x8400 | U34 B1 |
| 0x8600 | U35 B1 |
| 0x8800 | U32 B0 |
| 0x8A00 | U33 B0 |
| 0x8C00 | U34 B1 |
| 0x8E00 | U35 B1 |
| 0x9000 | U36 B0 |
| 0x9200 | U37 B0 |
| 0x9400 | U38 B1 |
| 0x9600 | U39 B1 |
| 0x9800 | U36 B0 |
| 0x9A00 | U37 B0 |
| 0x9C00 | U38 B1 |
| 0x9E00 | U39 B1 |
| 0xA000 | U40 B0 |
| 0xA200 | U41 B0 |
| 0xA400 | U42 B1 |
| 0xA600 | U43 B1 |
| 0xA800 | U40 B0 |
| 0xAA00 | U41 B0 |
| 0xAC00 | U42 B1 |
| 0xAE00 | U43 B1 |
| 0xB000 | U44 B0 |
| 0xB200 | U45 B0 |
| 0xB400 | U46 B1 |
| 0xB600 | U47 B1 |
| 0xB800 | U44 B0 |
| 0xBA00 | U45 B0 |
| 0xBC00 | U46 B1 |
| 0xBE00 | U47 B1 |
| 0xC000 | U48 B0 |
| 0xC200 | U49 B0 |
| 0xC400 | U50 B1 |
| 0xC600 | U51 B1 |
| 0xC800 | U48 B0 |
| 0xCA00 | U49 B0 |
| 0xCC00 | U50 B1 |
| 0xCE00 | U51 B1 |
| 0xD000 | U52 B0 |
| 0xD200 | U53 B0 |
| 0xD400 | U54 B1 |
| 0xD600 | U55 B1 |
| 0xD800 | U52 B0 |
| 0xDA00 | U53 B0 |
| 0xDC00 | U54 B1 |
| 0xDE00 | U55 B1 |
| 0xE000 | U56 B0 |
| 0xE200 | U57 B0 |
| 0xE400 | U58 B1 |
| 0xE600 | U59 B1 |
| 0xE800 | U56 B0 |
| 0xEA00 | U57 B0 |
| 0xEC00 | U58 B1 |
| 0xEE00 | U59 B1 |
| 0xF000 | U60 B0 |
| 0xF200 | U61 B0 |
| 0xF400 | U62 B1 |
| 0xF600 | U63 B1 |
| 0xF800 | U60 B0 |
| 0xFA00 | U61 B0 |
| 0xFC00 | U62 B1 |
| 0xFE00 | U63 B1 |

The sum of the a-hat squares is stored as a 16-bit value. The following table contains a memory address mapping for each channel.

| Offset | User |
|---|---|
| 0x0000 | 0 |
| 0x0020 | 1 |
| 0x0040 | 2 |
| 0x0060 | 3 |
| 0x0080 | 4 |
| 0x00A0 | 5 |
| 0x00C0 | 6 |
| 0x00E0 | 7 |
| 0x0100 | 8 |
| 0x0120 | 9 |
| 0x0140 | 10 |
| 0x0160 | 11 |
| 0x0180 | 12 |
| 0x01A0 | 13 |
| 0x01C0 | 14 |
| 0x01E0 | 15 |
| 0x0200 | 16 |
| 0x0220 | 17 |
| 0x0240 | 18 |
| 0x0260 | 19 |
| 0x0280 | 20 |
| 0x02A0 | 21 |
| 0x02C0 | 22 |
| 0x02E0 | 23 |
| 0x0300 | 24 |
| 0x0320 | 25 |
| 0x0340 | 26 |
| 0x0360 | 27 |

-continued

| Offset | User |
|---|---|
| 0x0380 | 28 |
| 0x03A0 | 29 |
| 0x03C0 | 30 |
| 0x03E0 | 31 |
| 0x0400 | 32 |
| 0x0420 | 33 |
| 0x0440 | 34 |
| 0x0460 | 35 |
| 0x0480 | 36 |
| 0x04A0 | 37 |
| 0x04C0 | 38 |
| 0x04E0 | 39 |
| 0x0500 | 40 |
| 0x0520 | 41 |
| 0x0540 | 42 |
| 0x0560 | 43 |
| 0x0580 | 44 |
| 0x05A0 | 45 |
| 0x05C0 | 46 |
| 0x05E0 | 47 |
| 0x0600 | 48 |
| 0x0620 | 49 |
| 0x0640 | 50 |
| 0x0660 | 51 |
| 0x0680 | 52 |
| 0x06A0 | 53 |
| 0x06C0 | 54 |
| 0x06E0 | 55 |
| 0x0700 | 56 |
| 0x0720 | 57 |
| 0x0740 | 58 |
| 0x0760 | 59 |
| 0x0780 | 60 |
| 0x07A0 | 61 |
| 0x07C0 | 62 |
| 0x07E0 | 63 |

Within each buffer, the value for antenna 0 is stored at address offset 0x0 with the value for antenna one stored at address offset 0x04. The following table demonstrates a mapping for each finger.

| Offset | User Buffer |
|---|---|
| 0x00 | 0 |
| 0x08 | 1 |
| 0x10 | 2 |
| 0x1C | 3 |

Each channel is provided a RACEway™ route on the bus, and a base address for buffering output on a slot basis. Registers for controlling buffers are allocated as shown in the following two tables. External devices are blocked from writing to register addresses marked as reserved.

| Offset | User |
|---|---|
| 0x0000 | 0 |
| 0x0020 | 1 |
| 0x0040 | 2 |
| 0x0060 | 3 |
| 0x0080 | 4 |
| 0x00A0 | 5 |
| 0x00C0 | 6 |
| 0x00E0 | 7 |
| 0x0100 | 8 |
| 0x0120 | 9 |
| 0x0140 | 10 |

-continued

| Offset | User |
|---|---|
| 0x0160 | 11 |
| 0x0180 | 12 |
| 0x01A0 | 13 |
| 0x01C0 | 14 |
| 0x01E0 | 15 |
| 0x0200 | 16 |
| 0x0220 | 17 |
| 0x0240 | 18 |
| 0x0260 | 19 |
| 0x0280 | 20 |
| 0x02A0 | 21 |
| 0x02C0 | 22 |
| 0x02E0 | 23 |
| 0x0300 | 24 |
| 0x0320 | 25 |
| 0x0340 | 26 |
| 0x0360 | 27 |
| 0x0380 | 28 |
| 0x03A0 | 29 |
| 0x03C0 | 30 |
| 0x03E0 | 31 |
| 0x0400 | 32 |
| 0x0420 | 33 |
| 0x0440 | 34 |
| 0x0460 | 35 |
| 0x0480 | 36 |
| 0x04A0 | 37 |
| 0x04C0 | 38 |
| 0x04E0 | 39 |
| 0x0500 | 40 |
| 0x0520 | 41 |
| 0x0540 | 42 |
| 0x0560 | 43 |
| 0x0580 | 44 |
| 0x05A0 | 45 |
| 0x05C0 | 46 |
| 0x05E0 | 48 |
| 0x0600 | 48 |
| 0x0620 | 49 |
| 0x0640 | 50 |
| 0x0660 | 51 |
| 0x0680 | 52 |
| 0x06A0 | 53 |
| 0x06C0 | 54 |
| 0x06E0 | 55 |
| 0x0700 | 56 |
| 0x0720 | 57 |
| 0x0740 | 58 |
| 0x0760 | 59 |
| 0x0780 | 60 |
| 0x07A0 | 61 |
| 0x07C0 | 62 |
| 0x07E0 | 63 |

| Offset | Entry |
|---|---|
| 0x0000 | Route to Channel Destination |
| 0x0004 | Base Address for Buffers |
| 0x0008 | Buffers |
| 0x000C | RESERVED |
| 0x0010 | RESERVED |
| 0x0014 | RESERVED |
| 0x0018 | RESERVED |
| 0x001C | RESERVED |

Slot buffer size is automatically determined by the channel spread factor. Buffers are used in round-robin fashion and all buffers for a channel must be arranged contiguously. The buffers control register determines how many buffers are allocated for each channel. A setting of 0 indicates one available buffer, a setting of 1 indicates two available buffers, and so on.

Methods for Estimating Symbols Embodied in Short-Code User Waveforms

As discussed above, systems according to the invention perform multi-user detection by determining correlations among the user channel-corrupted waveforms and storing these correlations as elements of the R-matrices. The correlations are updated in real time to track continually changing channel characteristics. The changes can stem from changes in user code correlations, which depend on the relative lag among various user multi-path components, as well as from the much faster variations of the Rayleigh-fading multi-path amplitudes. The relative lags among multi-path components can change with a time constant, for example, of about 400 ms whereas the multi-path amplitudes can vary temporally with a time constant of, for example, 1.33 ms. The R-matrices are used to cancel the multiple access interference through the Multi-stage Decision-Feedback Interference Cancellation (MDFIC) technique.

In the preceding discussion and those that follow, the tern physical user refers to a CDMA signal source, e.g., a user cellular phone, modem or other CDMA signal source, the transmitted waveforms from which are processed by a base station and, more particularly, by MUD processing card 118. In the illustrated embodiment, each physical user is considered to be composed of a one or more virtual users and, more typically, a plurality of virtual users.

A virtual user is deemed to "transmit" a single bit per symbol period, where a symbol period can be, for example, a time duration of 256 chips (1/15 ms). Thus, the number of virtual users, for a given physical user, is equal to the number of bits transmitted in a symbol period. In the illustrated embodiment, each physical user is associated with at least two virtual users, one of which corresponds to a Dedicated Physical Control Channel (DPCCH) and the other of which corresponds to a Dedicated Physical Data Channel (DPDCH). Other embodiments may provide for a single virtual user per physical user, as well, of course, to three or more virtual users per physical user.

In the illustrated embodiment, when a Spreading Factor (SF) associated with a physical user is less than 256, the J=256/SF data bits and one control bit are transmitted per symbol period. Hence, for the $r^{th}$ physical user with data-channel spreading factor $SF_r$, there are a total of $1+256/SF_r$ virtual users. The total number of virtual users can then be denoted by:

$$K_v \equiv \sum_{i=1}^{K} \left[ 1 + \frac{256}{SF_r} \right] \quad (1)$$

The waveform transmitted by the rth physical user can be written as:

$$x_r[t] = \sum_{k=1}^{1+J_r} \beta_k \sum_m s_k[t - mT] b_k[m] \quad (2)$$

-continued $$s_k[t] \equiv \sum_{p=0}^{N-1} h[t - pN_c] c_k[p]$$

where t is the integer time sample index, $T=NN_c$ represents the data bit duration, N=256 represents short-code length, $N_c$ is the number of samples per chip, and where $\beta_k=\beta_c$ if the kth virtual user is a control channel and $\beta_k=\beta_d$ if the kth virtual user is a data channel. The multipliers $\beta_c$ and $\beta_d$ are utilized to select the relative amplitudes of the control and data channels. In the illustrated embodiment, at least one of the above constants equals 1 for any given symbol period, m.

The waveform sk[t], which is herein referred to as the transmitted signature waveform for the kth virtual user, is generated by the illustrated system by passing the spread code sequence ck[n] through a root-raised-cosine pulse shaping filter h[t]. When the kth virtual user corresponds to a data user with a spreading factor that is less than 256, the code ck[n] retains a length of 256, but only Nk of these 256 elements are non-zero, where Nk is the spreading factor for the kth virtual user. The non-zero values are extracted from the code $C_{ch,256,64}[n] \cdot s_{sh}[n]$.

The baseband received signal can be written as:

$$r[t] = \sum_{k=1}^{K_v} \sum_m \tilde{s}_k[t - mT] b_k[m] + w[t] \quad (3)$$

$$s_k[t] \equiv \sum_{q'=1}^{L} a_{kq} s_k[t - \tau_{kq'}]$$

where w[t] is receiver noise, $\tilde{s}_k[t]$ is the channel-corrupted signature waveform for virtual user k, L is the number of multipath components, and $a_{kq'}$ are the complex multipath amplitudes. The amplitude ratios $\beta_k$ are incorporated into the amplitudes $a_{kq'}$. If k and l are two virtual users that correspond to the same physical user then, aside from scaling factors $\beta_k$ and $\beta_l$, $a_{kq'}$ and $a_{lq'}$ are equal. This is due to the fact that the signal waveforms of all virtual users corresponding to the same physical user pass through the same channel. Further, the waveform $s_k[t]$ represents the received signature waveform for the $k^{th}$ virtual user, and it differs from the transmitted signature waveform given in Equation (2) in that the root-raised-cosine pulse h[t] is replaced with the raised-cosine pulse g[t].

The received signal that has been match-filtered to the chip pulse is also match-filtered in the illustrated embodiment to the user code sequence in order to obtain detection statistic, herein referred to as $y_k$, for the $k^{th}$ virtual user. Because there are $K_v$ codes, there are $K_v$ such detection statistics. For each virtual user, the detection statistics can be collected into a column vector y[m] whose $m^{th}$ entry corresponds to the $m^{th}$ symbol period. More particularly, the matched filter output $y_l[m]$ for the $l^{th}$ virtual user can be written as:

$$y_l[m] \equiv \text{Re} \left\{ \sum_{q=1}^{L} \hat{a}_{lq}^* \cdot \frac{1}{2N_l} \sum_n r[nN_c + \hat{\tau}_{lq} + mT] \cdot c_l^*[n] \right\} \quad (4)$$

where $\hat{a}_{lq}^*$ is an estimate of $a_{lq}^*$, $\hat{\tau}_{lq}$ is an estimate of $\tau_{lq}$, $N_l$ is the (non code $c_l[n]$), and $\eta_l[m]$ represents the match-filtered receiver noise. Substituting the expression for $r[t]$ from Equation (3) in Equation (4) results in the following equation:

$$y_l[m] \equiv \sum_{m'} \sum_{k=1}^{K_v}$$  (5)

$$\mathrm{Re}\left\{\sum_{q=1}^{L} \hat{a}_{lq}^* \cdot \frac{1}{2N_l} \sum_n \tilde{s}_k[nN_c + \hat{\tau}_{lq} + m'T] \cdot c_l^*[n]\right\}$$

$$b_k[m - m'] + \eta_l[m]$$

$$= \sum_{m'} \sum_{k=1}^{K_v} r_{lk}[m'] b_k[m - m'] + \eta_l[m]$$

$$r_{lk}[m'] \equiv \mathrm{Re}\left\{\sum_{q=1}^{L} \hat{a}_{lq}^* \cdot \frac{1}{2N_l} \sum_n \tilde{s}_k[nN_c + \hat{\tau}_{lq} + m'T] \cdot c_l^*[n]\right\}$$

$$= \sum_{q=1}^{L} \sum_{q'=1}^{L}$$

$$\mathrm{Re}\left\{\hat{a}_{lq}^* a_{kq'} \cdot \frac{1}{2N_l} \sum_n s_k[nN_c + m'T + \hat{\tau}_{lq} - \tau_{kq'}] \cdot c_l^*[n]\right\}$$

$$= \sum_{q=1}^{L} \sum_{q'=1}^{L}$$

$$\mathrm{Re}\left\{\hat{a}_{lq}^* a_{kq'} \cdot \frac{1}{2N_l} \sum_n \sum_p g[(n-p)N_c + m'T + \hat{\tau}_{lq} - \tau_{kq'}] \cdot c_k[p] c_l^*[n]\right\}$$

The terms for m'=0 result from asynchronous users.

Calculation of the R-Matrix

Determination of the R-matrix elements defined by Equation (5) above can be divided into two or more separate calculations, each having an associated time constant or period of execution corresponding to a time constant or period during which a corresponding characteristic of the user waveforms are expected to change in real time. In the illustrated embodiment, three sets of calculations are employed as reflected in the following equations:

$$r_{lk}[m'] = \sum_{q=1}^{L} \sum_{q'=1}^{L}$$  (6)

$$\mathrm{Re}\left\{a_{lq}^* a_{kq'} \cdot \frac{1}{2N_l} \sum_n \sum_p g[(n-p)N_c + m'T + \tau_{lq} - \tau_{kq'}] c_k[p] \cdot c_l^*[n]\right\}$$

$$= \sum_{q=1}^{L} \sum_{q'=1}^{L} \mathrm{Re}\{a_{lq}^* a_{kq'} \cdot C_{lkqq'}[m']\}$$

-continued $$C_{lkqq'}[m'] \equiv \frac{1}{2N_l} \sum_n \sum_p g[(n-p)N_c + m'T + \tau_{lq} - \tau_{kq'}] c_k[p] \cdot c_l^*[n]$$

$$= \frac{1}{2N_l} \sum_m g[mN_c + m'T + \tau_{lq} - \tau_{kq'}]$$

$$\sum_n c_k[n-m] \cdot c_l^*[n]$$

$$= \frac{1}{2N_l} \sum_m g[mN_c + m'T + \tau_{lq} - \tau_{kq'}] \Gamma_{lk}[m]$$

$$\Gamma_{lk}[m] \equiv \sum_n c_k[n-m] \cdot c_l^*[n]$$

where the hats ($\hat{\ }$), indicating parameter estimates, have been omitted.

With reference to Equation (6), the Γ-matrix, whose elements vary with the slowest time constant, represents the user code correlations for all values of offset m. For the case of 100 voice users, the total memory requirement for storing the Γ-matrix elements is 21 Mbytes based on two bytes (e.g., the real and imaginary parts) per element. In the illustrated embodiment, the Γ-matrix matrix is updated only when new codes associated with new users are added to the system. Hence, the Γ-matrix is effectively a quasi-static matrix, and thus, its computational requirements are minimal.

The selection of the most efficient method for calculating the Γ-matrix elements depends on the non-zero length of the codes. For example, the non-zero length of the codes in case of high data-rate users can be only 4 chips long. In such a case, a direct convolution, e.g., convolution in the time domain, can be the most efficient method of calculating the elements of the Γ-matrix. For low data-rate users, it may be more efficient to calculate the elements of the Γ-matrix by utilizing Fast Fourier Transforms (FFTs) to perform convolutions in the frequency domain.

In one method according to the teachings of the invention, the C-matrix elements are calculated by utilizing the Γ-matrix elements. The C-matrix elements need to be calculated upon occurrence of a change in a user's delay lag (e.g., time-lag). For example, consider a case in which each multi-path component changes on average every 400 ms, and the length of the g[ ] function is 48 samples. In such a case, assuming an over-sampling by four, then forty-eight operations per element need to be performed (for example, 12 multiple accumulations, real x complex, for each element). Further, if 100 low-rate users (i.e., 200 virtual users) are utilizing the system, and assuming a single multipath lag of four changes for one user, a total of $(1.5)(2)K_vLN_v$ elements need to be calculated. The factor of 1.5 arises from the three C-matrices (e.g., m'=−1,0,1) which is reduced by a factor two as a result of a conjugate symmetry condition. Moreover, the factor two arises based on the fact that both rows and columns need to be updated. The factor $N_v$ represents the number of virtual users per physical user, which for the lowest rate users is $N_v=2$ as stated above. In total, this amounts to approximately 230,400 operations per multipath component per physical user. Accordingly, it gives rise to 230 MOPS based on 100 physical users with four multipath components per user, each changing once per 400 msec. Of course, in other embodiments these values can differ.

Figure 14:
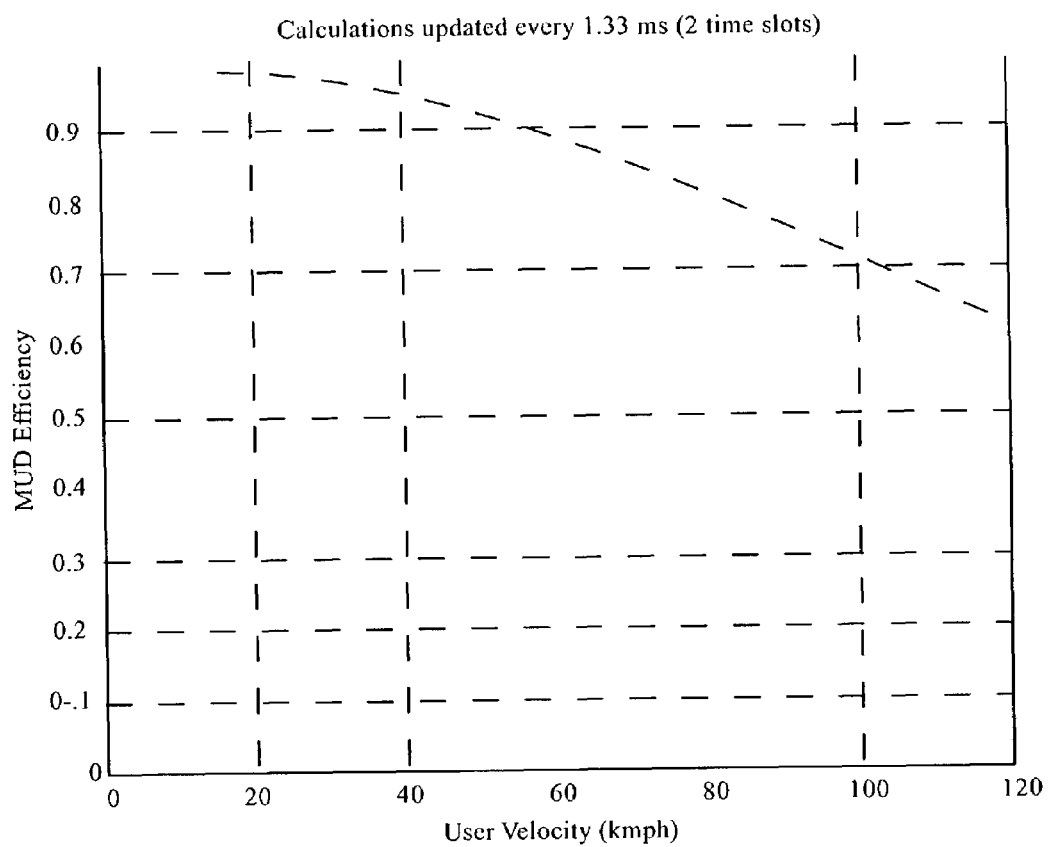
FIG. 14 is a graph illustrating MUD efficiency as a function of user velocity in units of Km/hr.

The C-matrices are then utilized to calculate the R-matrices. More particularly, the elements of the R-matrix can be obtained as follows by utilizing Equation (6) above:

$$r_{lk}[m'] = \sum_{q=1}^{L}\sum_{q'=1}^{L} \text{Re}\{\hat{a}_{lq}^* a_{kq'} \cdot C_{lkqq'}[m']\} \qquad (7)$$
$$= \text{Re}\{a_l^H \cdot C_{lk}[m'] \cdot a_k\}$$

where $a_k$ are L×1 vectors, and $C_{lk}[m']$ are L×L matrices. The rate at which the above calculations need to be performed depends on the velocity of the users. For example, in one embodiment, the update rate is selected to be 1.33 msec. An update rate that is too slow such that the estimated values of the R-matrix deviate significantly from the actual R-matrix values results in a degradation of the MUD efficiency. For example, FIG. 14 presents a graph that depicts the change in the MUD efficiency versus user velocity for an update rate of 1.33 msec, which corresponds to two WCDMA time slots. This graph indicates that the MUD efficiency is high for users having velocities that are less than about 100 km/h. The graph further shows that the interference corresponding to fast users is not canceled as effectively as the interference corresponding to slow users. Thus, for a system that is utilized by a mix of fast and slow users, the total MUD efficiency is an average of the MUD efficiency for the range of user velocities. Utilizing the above Equation (7), the R-matrix elements can be calculated in terms of an X matrix that represents amplitude-amplitude multiplies as shown below:

$$r_{lk}[m']=\text{Re}\{tr[a_l^H \cdot C_{lk}[m'] \cdot a_k]\}=\text{Re}\{tr[C_{lk}[m'] \cdot a_k \cdot a_l^H]\}=\text{Re}\{tr[C_{lk}[m'] \cdot X_{lk}]\}=tr[C_{lk}^R[m'] \cdot X_{lk}^R]-tr[C_{lk}^I[m'] \cdot X_{lk}^I]$$

$$X_{lk}=a_k \cdot a_l^H \equiv X_{lk}^R+jX_{lk}^I$$

$$C_{lk}[m']=C_{lk}^R[m']+jC_{lk}^I[m'] \qquad (8)$$

The use of the X-matrix as illustrated above advantageously allows reusing the X-matrix multiplies for all virtual users associated with a physical user and for all m' (i.e., m=0, 1). The remaining calculations can be expressed as a single real dot product of length 2L2=32. The calculations can be performed, for example, in 16-bit fixed point math. Then, the total operations can amount to 1.5(4)($K_v$L)2=3.84 MOPS resulting in a processing requirement of 2.90 GOPS. The X-matrix multiplies, when amortized, amount to an additional 0.7 GOPS. Thus, the total processing requirement can be 3.60 GOPS.

The matched-filter outputs can be obtained from the above Equation (5) as follows:

$$y_l[m] = r_{ll}[0]b_l[m] + \sum_{k=1}^{K_v} r_{lk}[-1]b_k[m+1] + \qquad (9)$$
$$\sum_{k=1}^{K_v} [r_{lk}[0] - r_{ll}[0]\delta_{lk}]b_k[m] +$$
$$\sum_{k=1}^{K_v} r_{lk}[1]b_k[m-1] + \eta_l[m]$$

wherein the first term represents a signal of interest, and the remaining terms represent Multiple Access Interference (MAI) and noise. The illustrated embodiment uses a Multistate Decision Feedback interference Cancellation (MDFIC) algorithm can be utilized to solve for the symbol estimates in accord with the following relationship:

$$\hat{b}_l[m] = \text{sign}\left\{y_l[m] - \sum_{k=1}^{K_v} r_{lk}[-1]\hat{b}_k[m+1] - \qquad (10)\right.$$
$$\sum_{k=1}^{K_v} [r_{lk}[0] - r_{ll}[0]\delta_{lk}]\hat{b}_k[m] -$$
$$\left.\sum_{k=1}^{K_v} r_{lk}[1]\hat{b}_k[m-1]\right\}$$

with initial estimates given by hard decisions on the matched-filter detection statistics, $$\hat{b}_l[m]=\text{sign}\{y_l[m]\}.$$

A further appreciation of these and alternate MDFIC techniques may be attained by reference to An MDFIC technique which is described in an article by T. R. Giallorenzi and S. G. Wilson, titled, "Decision feedback multi-user receivers for asynchronous CDMA systems", published in IEEE Global Telecommunications Conference, pages 1677-1682 (June 1993), and herein incorporated by reference. Related techniques, known as, is closely related to Successive Interference Cancellation (SIC) and Parallel Interference Cancellation (PIC), can be used in addition or instead.

In the illustrated embodiment, the new estimates $\hat{b}_l[m]$ are immediately introduced back into the interference cancellation as they are calculated. Hence at any given cancellation step, the best available symbol estimates are used. In one embodiment, the above iteration can be performed on a block of 20 symbols, which represents two WCDMA time slots. The R-matrices are assumed to be constant over this period. The sign detector in Equation (10) above can be replaced by a hyperbolic tangent detector to improve performance under high input BER. A hyperbolic tangent detector has a single slope parameter which varies from one iteration to another.

The three R-matrices (R[−1], R[0] and R[1]) are each $K_v$x$K_v$ in size. Hence, the total number of operation per iteration is $6K_v^2$. The computational complexity of the MDFIC algorithm depends on the total number of virtual users, which in turn depends on the mix of users at various spreading factors. For $K_v$=200 users (e.g. 100 low-rate users), the computation requires 240,000 operations. In one embodiment, two iterations are employed which require a total of 480,000 operations. For real-time applications, these operations must be performed in 1/15 ms or less. Thus, the total processing requirement is 7.2 GOPS. Computational complexity is markedly reduced if a threshold parameter is set such that IC is performed only for those |$y_l[m]$| below the threshold. If |$y_l[m]$| is large, there is little doubt as to the sign of $b_l[m]$IC need not be performed. The value of the threshold parameter can be variable from stage to stage.

C-Matrix Calculation

As discussed above, the C-matrix elements are utilized to calculate the R-matrices, which in turn are employed by an MDF Interference Cancellation routine. The C-matrix elements can be calculated by utilizing different techniques, as described elsewhere herein. In one approach, the C-matrix elements are calculated directly whereas in another approach the C-matrix elements are computed from the Γ-matrix elements, as discussed in detail below and illustrated elsewhere herein.

More particularly, in one method for calculating the C matrix elements, each C-matrix element can be calculated as a dot product between the kth user's waveform and the lth user's code stream, each offset by some multipath delay. For this method of calculation, each time a user's multipath profile changes, all the C-matrix elements associated with the changed profile need to be recalculated. A user's profile can change very rapidly, for example, every 100 msec or faster, thereby necessitating frequent updates of the C-matrix elements. Such frequent updates of the C-matrix elements can give rise to a large amount of overhead associated with computations that need to be performed before obtaining each dot product. In fact, obtaining the C-matrix elements by the above approach may require dedicating an entire processor for performing the requisite calculations.

Another approach according to the teachings of the invention for calculating the C-matrix elements pre-calculates the code correlations up-front when a user is added to the system. The calculations are performed over all possible code offsets and can be stored, for example, in a large array (e.g., approximately 21 Mbytes in size), herein referred to as the Γ-matrix. This allows updating C-matrix elements when a user's profile changes by extracting the appropriate elements from the Gamma matrix and performing minor calculations. Since the Γ-matrix elements are calculated for all code offsets, FFT can be effectively employed to speed up the calculations. Further, because all code offsets are pre-calculated, rapidly changing multipath profiles can be readily accommodated. This approach has a further advantage in that it minimizes the use of resources that need to be allocated for extracting the C-matrix elements when the number of users accessing system is constant.

C-Matrix Elements Expressed in Terms of Code Correlations

As discussed above, the R-matrix elements can be given in terms of the C-matrix elements as follows:

$$\hat{\rho}_{lk}[m']A_l A_k = \sum_{q=1}^{L}\sum_{q'=1}^{L} \mathrm{Re}\{\hat{a}_{lq}^* \hat{a}_{kq'} \cdot C_{lkqq'}[m']\} \quad (11)$$

$$C_{lkqq'}[m'] \equiv \frac{1}{2N_l}\sum_{n} s_k[nN_c + m'T + \hat{\tau}_{lq} - \hat{\tau}_{kq'}] \cdot c_l^*[n]$$

where $C_{lkqq}[m']$ is a five-dimensional matrix of code correlations. Both l and k range from 1 to $K_v$, where $K_v$ is the number of virtual users. The indices q and q' range from 1 to L, representing the number of multipath components, which in this exemplary embodiment is assumed to be 4. The symbol period offset m' ranges from −1 to 1. The total number of matrix elements to be calculated is then $N_c=3 (K_v L)^2=3(800)^2=1.92M$ complex elements, requiring 3.84 MB of storage if each element is a byte. The following symmetry property of the C-matrix elements can be utilized to halve the storage requirement, for example, in this case to 1.92 MB:

$$C_{klq'q}[-m'] = \frac{N_l}{N_k} C_{lkqq'}^*[m'] \quad (12)$$

It is evident from the above Equation (12) that each element of $C_{lkqq'}[m']$ is formed as a complex dot product between a code vector $c_l$ and a waveform vector $s_{kqq'}$. In this exemplary embodiment, the length of the code vector is 256.

The waveform $s_k[t]$, herein referred to as the signature waveform for the kth virtual user, is generated by applying a pulse-shaping filter g[t] to the spread code sequence $c_k[n]$ as follows:

$$s_k[t] = \sum_{p=0}^{N-1} g[t - pN_c] c_k[p] \quad (13)$$

where N=256 and g[t] is the raised-cosine pulse shape. Since g[t] is a raised-cosine pulse as opposed to a root-raised-cosine pulse, the signature waveform $s_k[t]$ includes the effects of filtering by the matched chip filter. For spreading factors less than 256, some of the chips $c_k[p]$ are zero. The length of the waveform vector $s_k[t]$ is $L_g+255N_c$, where $L_g$ is the length of the raised-cosine pulse vector g[t] and $N_c$ is the number of samples per chip. The values for these parameters in this exemplary embodiment are selected to be $L_g=48$ and $N_c=4$. The length of the waveform vector is then 1068, but for performing the dot product, it is accessed at a stride of $N_c=4$, which results in an effective length of 267.

In this exemplary embodiment, the raised-cosine pulse vector g[t] is defined to be non-zero from $t=-L_g/2+1:L_g/2$, with g[0]=1. With this definition the waveform $s_k[t]$ is non-zero in a range from $t=-L_g/2+1:L_g/2+255N_c$.

By combining Equations (11) and (13), the calculation of the C-matrix elements can be expressed directly in terms of the user code correlations. These correlations can be calculated up front and stored, for example, in SDRAM. The C-matrix elements expressed in terms of the code correlations $\Gamma_{lk}[m]$ are:

$$C_{lkqq'}[m'] \equiv \frac{1}{2N_l}\sum_{n} s_k[nN_c + m'T + \hat{\tau}_{lq} - \hat{\tau}_{kq'}] \cdot c_l^*[n] \quad (14)$$

$$= \frac{1}{2N_l}\sum_{n}\sum_{p} g[(n-p)N_c + m'T + \hat{\tau}_{lq} - \hat{\tau}_{kq'}] \cdot c_k[p] \cdot c_l^*[n]$$

$$= \frac{1}{2N_l}\sum_{n}\sum_{m} g[mN_c + \tau] \cdot c_k[n-m] \cdot c_l^*[n]$$

$$= \sum_{m} g[mN_c + \tau] \cdot \frac{1}{2N_l}\sum_{n} c_l^*[n] \cdot c_k[n-m]$$

$$= \sum_{m} g[mN_c + \tau] \cdot \Gamma_{lk}[m]$$

$$\Gamma_{lk}[m] \equiv \frac{1}{2N_l}\sum_{n} c_l^*[n] \cdot c_k[n-m]$$

$$\tau \equiv m'T + \hat{\tau}_{lq} - \hat{\tau}_{kq'}$$

Since the pulse shape vector g[n] is of length $L_g$, at most $2L_g/N_c=24$ real macs need to be performed to calculate each element $C_{lkqq'}[m']$ (the factor of 2 arises because the code correlations $\Gamma_{lk}[m]$ are complex). For a given τ, the method of the invention efficiently calculates the range of m values for which $g[mN_c+\tau]$ is non-zero as described below. The minimum value of m is given by $m_{min1}N_c+\tau=-L_g/2+1$, and τ is given by $\tau=m'NN_c+\tau_{lq}-\tau_{kq'}$. If each τ value is decomposed as $\tau_{lq}=n_{lq}N_c+p_{lq}$, then $m_{min1}=\mathrm{ceil}[(-\tau-L_g/2+1)/N_c]=-m'N-n_{lq}+n_{kq'}-L_g/(2N_c)+\mathrm{ceil}[(p_{kq'}-p_{lq}+1)/N_c]$, where $\mathrm{ceil}[(p_{kq'}-p_{lq}+1)/N_c]$ will be either 0 or 1. It is convenient to set this value to 0. In order to avoid accessing values outside the allocation for g[n], g[n]=0.0 for n=$-L_g/2$:$-L_g/2-(N_c-1)$. All but one of the $N_c^2$ possible values for ceil$[(p_{kq}-p_{lq}+1)/N_c]$ are 0.

Accordingly, the following relation holds:

$$m_{min1} = -m'N - n_{lq} + n_{kq} - L_g/(2N_c) \tag{15}$$

wherein $L_R$ is divisible by $2N_c$, and $L_g/(2N_c)$ is a system constant.

Since, the maximum value of m is given by $m_{max1}N_c + \tau = L_g/2$, the following holds:

$$m_{max1} = \text{floor}[(-\tau+L_g/2)/N_c] = -m'N - n_{lq} + n_{kq} + L_g/(2N_c) + \text{floor}[(p_{kq}-p_{lq})/N_c].$$

Further, floor$[(p_{kq}-p_{lq})/N_c]$ can be either $-1$ or $0$. In this exemplary embodiment, it is convenient to set this value to 0. In order to avoid accessing values outside the allocation for g[n], g[n] is set to 0.0 (g[n]=0.0) for n=$-L_g/2+1$:$L_g/2+N_c$. It is noted that half of the $N_c^2$ half of the $N_c^2$ possible values for floor$[(p_{kq}-p_{lq})/N_c]$ are 0. Accordingly, the following relation holds:

$$m_{max1} = -m'N - n_{lq} + n_{kq} + L_g/(2N_c) \tag{16}$$

The values of $m_{min1}$ and $m_{max1}$ are quickly calculable.

The calculation of the C-matrix elements typically requires a small subset of the $\Gamma$ matrix elements. The $\Gamma$ matrix elements can be calculated for all values of m by utilizing Fast Fourier Transform (FFT) as described in detail below.

Using FFT to Calculate the $\Gamma$-matrix Elements

It was shown above that the $\Gamma$-matrix elements can be represented as a convolution. Accordingly, the FFT convolution theorem can be exploited to calculate the $\Gamma$-matrix elements. From the above Equation (14), the $\Gamma$-matrix elements are defined as follows:

$$\Gamma_{lk}[m] \equiv \frac{1}{2N_l} \sum_{n=0}^{N-1} c_l^*[n] \cdot c_k[n-m] \tag{17}$$

where N=256. Three streams are related by this equation. In order to apply the convolution theorem, these three streams are defined over the same time interval. The code streams $c_k[n]$ and $c_l[n]$ are non-zero from n=0:255. These intervals are based on the maximum spreading factor. For higher data-rate users, the intervals over which the streams are non-zero are reduced further. The intervals derived from the highest spreading factor are of particular interest in defining a common interval for all streams because they represent the largest intervals. The common interval allows the FFTs to be reused for all user interactions.

With reference to FIG. 15, the range of values of m for which $\Gamma_{lk}[m]$ is non-zero can be derived from the above intervals. The maximum value of m is limited by $n-m \geq 0$, which gives $$255 - m_{max} = 0 \Rightarrow m_{max} = 255 \tag{18}$$

and the minimum value of m is limited by $n-m \geq 255$, which gives $$0 - m_{min} = 255 \Rightarrow m_{min} = -255 \tag{19}$$

To achieve a common interval for all three streams, an interval defined by m=$-M/2$: $M/2-1$, M=512 is selected. The streams are zero-padded to fill up the interval, if needed.

Accordingly, the DFT and IDFT of the streams are given by the following relations:

$$C_l[r] = \sum_{n=-\frac{M}{2}}^{\frac{M}{2}-1} c_l[n] \cdot e^{-j2\pi nr/M} \tag{20}$$

$$c_l[r] = \frac{1}{M} \sum_{r=-\frac{M}{2}}^{\frac{M}{2}-1} C_l[r] \cdot e^{j2\pi nr/M}$$

which gives $$\Gamma_{lk}[m] \equiv \frac{1}{2N_l} \sum_{n=-\frac{M}{2}}^{\frac{M}{2}-1} c_k[n-m] \cdot c_l^*[n] \tag{21}$$

$$= \frac{1}{2N_l M^2} \sum_{n=-\frac{M}{2}}^{\frac{M}{2}-1} \sum_{i=-\frac{M}{2}}^{\frac{M}{2}-1} C_k[r] \cdot e^{j2\pi(n-m)r/M}$$

$$\sum_{r'=-\frac{M}{2}}^{\frac{M}{2}-1} C_l^*[r'] \cdot e^{-j2\pi nr/M}$$

$$= \frac{1}{2N_l M^2} \sum_{r=-\frac{M}{2}}^{\frac{M}{2}-1} C_k[r] \cdot e^{-j2\pi mr/M} \sum_{r'=-\frac{M}{2}}^{\frac{M}{2}-1} C_l^*[r']$$

$$\sum_{n=-\frac{M}{2}}^{\frac{M}{2}-1} e^{j2\pi n(r-r')/M}$$

$$= \frac{1}{2N_l M} \sum_{i=-\frac{M}{2}}^{\frac{M}{2}-1} C_k[r] \cdot C_l^*[r] e^{-j2\pi mr/M}$$

Hence, $\Gamma_{lk}[m]$ can be calculated for all values of m by utilizing FFT. Based on the analysis presented above, many of these values will be zero for high data rate users. In this exemplary embodiment, only the non-zero values are stored in order to conserve storage space. The values of m for which $\Gamma_{lk}[m]$ is non-zero can be determined analytically, as described in more detail below and illustrated elsewhere herein.

Storage and Retrieval of $\Gamma$-matrix Elements

As discussed above, the values of the $\Gamma$-matrix elements which are non-zero need to be determined for efficient storage of the $\Gamma$-matrix. For high data rate users, certain elements $c_l[n]$ are zero, even within the interval n=0:N-1, N=256. These zero values reduce the interval over which $\Gamma_{lk}[m]$ is non-zero. In order to determine the interval for non-zero values consider the following relations:

$$\Gamma_{lk}[m] \equiv \frac{1}{2N_l} \sum_{n=0}^{N-1} c_l^*[n] \cdot c_k[n-m] \tag{22}$$

The index $j_l$ for the lth virtual user is defined such that $c_l[n]$ is non-zero only over the interval n=$j_l N_l$:$j_l N_l + N_l - 1$.

Correspondingly, the vector $c_k[n]$ is non-zero only over the interval $n=j_kN_k:j_kN_k+N_k-1$. Given these definitions, $\Gamma_{lk}[m]$ can be rewritten as $$\Gamma_{lk}[m] \equiv \frac{1}{2N_l} \sum_{n=0}^{N_l-1} c_l^*[n + j_lN_l] \cdot c_k[n + j_lN_l - m] \quad (23)$$

The minimum value of m for which $\Gamma_{lk}[m]$ is non-zero is $$m_{min2} = -j_kN_k + j_lN_l - N_k + 1 \quad (24)$$

and the maximum value of m for which $\Gamma_{lk}[m]$ is non-zero is $$m_{max2} = N_l - 1 - j_kN_k + j_lN_l \quad (25)$$

The total number of non-zero elements is then $$m_{total} \equiv m_{max2} - m_{min2} + 1 \quad (26)$$
$$= N_l + N_k - 1$$

The table below provides the number of bytes per l,k virtual-user pair based on 2 bytes per element—one byte for the real part and one byte for the imaginary part.

| $N_k = 256$ | 728 | 64 | 32 | 16 | 8 | 4 |
|---|---|---|---|---|---|---|
| $N_l = 256$ | 1022 | 766 | 638 | 574 | 542 | 526 | 518 |
| 128 | 766 | 510 | 382 | 318 | 286 | 270 | 262 |
| 64 | 638 | 382 | 254 | 190 | 158 | 142 | 134 |
| 32 | 574 | 318 | 190 | 126 | 94 | 78 | 70 |
| 16 | 542 | 286 | 158 | 94 | 62 | 46 | 38 |
| 8 | 526 | 270 | 142 | 78 | 46 | 30 | 22 |
| 4 | 518 | 262 | 134 | 70 | 38 | 22 | 14 |

The memory requirements for storing the $\Gamma$ matrix for a given number of users at each spreading factor can be determined as described below. For example, for $K_q$ virtual users at spreading factor $N_q = 2^{8-q}$, q=0:6, where $K_q$ is the qth element of the vector K (some elements of K may be zero), the storage requirement can be computed as follows. Let Table 1 above be stored in matrix M with elements $M_{qq'}$. For example, $M_{00} = 1022$, and $M_{01} = 766$. The total memory required by the $\Gamma$ matrix in bytes is then given by the following relation $$M_{bytes} = \sum_{q=0}^{6} \left\{ \frac{K_q(K_q+1)}{2} M_{qq} + \sum_{q'=q+1}^{6} K_q K_{q'} M_{qq'} \right\} \quad (27)$$

$$= \frac{1}{2} \sum_{q=0}^{6} \left\{ K_q M_{qq} + \sum_{q'=0}^{6} K_q K_{q'} M_{qq'} \right\}$$

For example, for 200 virtual users at spreading factor $N_0 = 256$, $K_q = 200\delta_{q0}$, which in turn results in $M_{bytes} = \frac{1}{2}K_0(K_0+1)M_{00} = 100(201)(1022) = 20.5$ MB. For 10 384 Kbps users 10 384 Kbps users, $K_q = K_0\delta_{q0} + K_6\delta_{q6}$ with $K_0 = 10$ and $K_6 = 640$, which results in a storage requirement that is given by the following relations:

$$M_{bytes} = \frac{1}{2}K_0(K_0+1)M_{00} + K_0K_6M_{06} + \frac{1}{2}K_6(K_6+1)M_{66} =$$
$$5(11)(1022) + 10(640)(518) + 320(641)(14) = 6.2 \text{ MB}.$$

The $\Gamma$-matrix data can be addressed, stored, and accessed as described below. In particular, for each pair (l,k), k>=l, there are 1 complex $\Gamma_{lk}[m]$ values for each value of m, where m ranges from $m_{min2}$ to $m_{max2}$, and the total number of non-zero elements is $m_{total} = m_{max2} - m_{min2} + 1$. Hence, for each pair (l,k), k>=l, there exists $2m_{total}$ time-contiguous bytes.

In one embodiment, an array structure is created to access the data, as shown below:

```
struct {
    int m__min2;
    int m__max2;
    int m__total;
    char * Glk;
} G_info[N_VU_MAX][N_VU_MAX];
```

The C-matrix data can then be retrieved by utilizing the following exemplary algorithm:

```
m_min2 = G_info[l][k].m__min2
m_max2 = G_info[l][k].m__max2
N_g = L_g/N_c
Nl = m'*N − L_g/(2N_c)
for m' = 0:1
    for q = 0:L−1
        for q' = 0:L − 1
            τ = m'T + τ_lq − τ_kq'
            m_min1 = Nl − n_lq + n_kq'
            m_max1 = m_min1+N_g
            m_min = max[m_min1, m_min2]
            m_max = min[m_min1, m_min2]
            if m_max >= m_min
                m_span = m_max − m_min + 1
                sum1 = 0.0;
                ptr1 = &G_info[l][k].Glk[m_min]
                ptr2 = &g[m_min*N_c + τ]
                while m_span > 0
                    sum1 += (*ptr1++)*(*ptr2++)
                    m_span−−
                end
                C[m'][l][k][q][q'] = sum1
            end
        end
    end
end
```

Another method for calculating the $\Gamma$-matrix elements, herein referred to as the direct method, performs a direct convolution, for example, by employing the SALzconvx function, to compute these elements. This direct method is preferable when the vector lengths are small. As an illustration of the time required for performing calculations, The table below provides exemplary timing data based on a 400 MHz PPC7400 with 16 MHz, 2 MB L2 cache, wherein the data is assumed to be resident in L1 cache. The performance loss for L2 cache resident data is not severe.

| $M_{total}$ | $N_l$ | Timing (μs) | GFLOPS |
|---|---|---|---|
| 1024 | 4 | 19.33 | 1.70 |
| 1024 | 8 | 29.73 | 2.20 |
| 1024 | 16 | 50.55 | 2.59 |
| 1024 | 32 | 92.32 | 2.84 |
| 1024 | 64 | 176.53 | 2.97 |
| 1024 | 128 | 346.80 | 3.47 |

As discussed above, FFT can also be utilized for calculating the $\Gamma$-matrix elements. The time required to perform a 512 complex FFT, with in-place calculation, on a 400 MHz PPC7400 with 16 MHz, 2 MB L2 cache is 10.94 µs for L1 resident data. Prior to performing the final FFT, a complex vector multiplication of length 512 needs to be performed. Exemplary timings for this computation are provided in the following table:

| Length | Location | Timing (µs) | GFLOPS |
|--------|----------|-------------|--------|
| 1024 | L1 | 4.46 | 1.38 |
| 1024 | L2 | 24.27 | 0.253 |
| 1024 | DRAM | 61.49 | 0.100 |

Further, exemplary timing data for moving data between memory and the processor is provided in the following table:

| Length | Location | Timing (µs) |
|--------|----------|-------------|
| 1024 | L1 | 1.20 |
| 1024 | L2 | 15.34 |
| 1024 | DRAM | 30.05 |

FIG. 16 illustrates the $\Gamma$-matrix elements that need to be calculated when a new physical user is added to the system. Addition of a new physical user to the system results in adding 1+J virtual users to the systems: that is, 1 control channel+J=256/SF data channels. The number $K_v$ represents the number of initial virtual users. Hence there are ($K_v$+1) elements added to the $\Gamma$-matrix as a result of increase in the number of the control channels, and $J(K_v+1)+J(J+1)/2$ elements added as a result of increase in the number of the data channels. The total number of elements added is then (J+1)[$K_v$+1+J/2]. If FFT is utilized to perform the calculations, the total number of FFTs to be performed is (J+1)+ (J+1)[$K_v$+1+J/2]. The first term represents the FFTs to transform $c_k[n]$, and the second term represents the (J+1) [$K_v$+1+J/2] inverse FFTs of FFT{$c_k[n]$}*FFT{$c_l*[n]$}. The time to perform the complex 512 FFTs can be, for example, 10.94 µs, whereas the time to perform the complex vector multiply and the complex 512 FFT can be, for example, 24.27/2+10.94=23.08 µs.

In order to provide illustrative examples of processing times, two cases of interest are considered below. In the first case scenario, a voice user is added to the system while K=100 users ($K_v$=200 virtual users) are accessing the system. Not all of these users are active. The control channels are always active, but the data channels have activity factor AF=0.4. The mean number of active virtual users is then K+AF*K=140. The standard deviation is $\sigma$= $\sqrt{K \cdot AF \cdot (1-AF)}$=4.90. Accordingly, there are $K_v$<140+ 3$\sigma$<155 active user with a high probability.

The second case, which represents a more demanding scenario, arises when a single 384 Kbps data user is added while a number of users are accessing the system. A single 384 Kbps data user adds interference equal to (0.25+0.125* 100)/(0.25+0.400*1)~=20 voice users. Hence, the number of voice users accessing the system must be reduced to approximately K=100−20=80($K_v$=160). The 3$\sigma$ number of active virtual users is then 80+(0.125)80+3(3.0)=99 active virtual users. The reason this scenario is more demanding is that when a single 384 Kbps data user is added to the system, J+1=64+1=65 virtual users are added to the system.

In the first case scenario in which there are $K_v$=200 virtual users accessing the system and a voice user is added to the system (J=1), the total time to add the voice user can be (1+1)(10.94 µs)+(1+1)[200+1+½](23.08 µs)=9.3 ms.

For the second scenario in which there are $K_v$=160 virtual users accessing the system and a 384 Kbps data user is added (J=64), the total time to add the 384 Kbps user can be (64+1)(10.94 µs)+(64+1)[160+1+64/2](23.08 µs)=290 ms, which is significantly larger than 9.3 ms. Hence, at least for high data-rate user, the $\Gamma$-matrix elements are calculated via convolutions.

In the direct method of calculating the $\Gamma$-matrix elements, the SAL zconvx function is utilized to perform the following convolution:

$$\Gamma_{lk}[m] \equiv \frac{1}{2N_l} \sum_{n=0}^{N_l-1} c_l^*[n+j_l N_l] \cdot c_k[n+j_l N_l - m] \qquad (28)$$

$$= \frac{1}{2N_l} \sum_{n=0}^{N_k-1} c_l^*[n+j_k N_k + m] \cdot c_k[n+j_k N_k].$$

For each value of m, $N_{min}$=min{$N_l$, $N_k$} complex macs (cmacs) need to be performed. Each cmac requires 8 flops, and there are $m_{total}$=$N_l$+$N_k$31 1 m-values to calculate. Hence, the total number of flops is 8$N_{min}$($N_l$+$N_k$−1). In the following, it is assumed that the convolution calculation is performed at 1.50 GOPs=1500 ops/µs. The time required to perform the convolutions is presented in the table below

| | $N_k$ = 256 | 728 | 64 | 32 | 16 | 8 | 4 |
|---|---|---|---|---|---|---|---|
| $N_l$ = 256 | 697.69 | 261.46 | 108.89 | 48.98 | 23.13 | 11.22 | 5.53 |
| 128 | 261.46 | 174.08 | 65.19 | 27.14 | 12.20 | 5.76 | 2.79 |
| 64 | 108.89 | 65.19 | 43.35 | 16.21 | 6.74 | 3.03 | 1.43 |
| 32 | 48.98 | 27.14 | 16.21 | 10.75 | 4.01 | 1.66 | 0.75 |
| 16 | 23.13 | 12.20 | 6.74 | 4.01 | 2.65 | 0.98 | 0.41 |
| 8 | 11.22 | 5.76 | 3.03 | 1.66 | 0.98 | 0.64 | 0.23 |
| 4 | 5.53 | 2.79 | 1.43 | 0.75 | 0.41 | 0.23 | 0.15 |

The total time to calculate the $\Gamma$-matrix is then given by the following relation:

$$T_\Gamma(K) = \sum_{q=0}^{6} \left\{ \frac{K_q(K_q+1)}{2} T_{qq} + \sum_{q'=q+1}^{6} K_q K_{q'} T_{qq'} \right\} \qquad (29)$$

$$= \frac{1}{2} \sum_{q=0}^{6} \left\{ K_q T_{qq} + \sum_{q'=0}^{6} K_q K_{q'} T_{qq'} \right\}$$

$$= \frac{1}{2} [K \cdot diag(T) + K^T \cdot T \cdot K]$$

where $T_{qq}$ are the elements in the above Table 5. Now suppose K'=K+$\Delta$, where $\Delta_q$=$J_x \delta_{qx}$+$J_y \delta_{qy}$, and where x and y are not equal. Then $$\Delta T_\Gamma \equiv T_\Gamma(K') - T_\Gamma(K) \qquad (30)$$

$$= \frac{1}{2} J_x(J_x+1) T_{xx} + \frac{1}{2} J_y(J_y+1) T_{yy} +$$

$$J_x J_y T_{xy} + \sum_{q=0}^{6} K_q \{J_x T_{xq} + J_y T_{yq}\}$$

In the first scenario, there are $K_v=200$ virtual users accessing the system and a voice user is added to the system (J=1). Hence, $K_q=K_v\delta_{q0}$(SF=256), $K_v=200$, $J_x=J=0$. The total time is then ½J(J+1)T$_{00}$+JK$_v$T$_{00}$=(0.5)(2)(3)(0.70 ms)+(2)(200) (0.70 ms)=283 ms This number is large enough to require that for voice users, at least, the Γ-matrix elementst be calculated via FFTs.

For the second scenario, there are $K_v=160$ virtual users accessing the system and a 384 Kbps data user is added to the system (J=64). Hence, $K_q=K_v\delta_{q0}$(SF=256), $K_v=160$, $J_{xb=1}$ (control) and $J_y=J=64$ (data). The total time is then
$(K_v+1)T_{00}+J(K_v+1)T_{06}+(J+1)(J/2)T_{66}$=(161)(697.7 μs)+(64)(161)(5.53 μs)+(65)(32)(0.15 μs)=112.33 ms+56.98 ms+0.31 ms=169.62 ms Accordingly, these calculations should also be performed by utilizing FFT, which can require, for example, 23.08 μs per convolution. In addition, 1 FFT is required to compute FFT{$c_k^*[n]$}) for the single control channel. This can require an additional 10.94 μs. The total time, then, to add the 384 Kbps user is 10.94 μs+(161)(23.08)μs+(64)(161)(5.53)μs+(65)(32) (0.15)μs==61.02 mst Γ-matrix Elements to SDRAM With reference to above Equation (27), the size of the Γ-matrix in bytes is given by the following relation:

$$M_b(K) = \sum_{q=0}^{6}\left\{\frac{K_q(K_q+1)}{2}M_{qq} + \sum_{q'=q+1}^{6}K_qK_{q'}M_{qq'}\right\} \quad (31)$$

$$= \frac{1}{2}\sum_{q=0}^{6}\left\{K_qM_{qq} + \sum_{q'=0}^{6}K_qK_{q'}M_{qq'}\right\}$$

$$= \frac{1}{2}[K\cdot diag(M) + K^T\cdot M\cdot K]$$

Now suppose K'=K+Δ, where $\Delta_q=J_x\delta_{qx}+J_y\delta_{qy}$, and where x and y are not equal. Then $$\Delta M_b \equiv M_b(K') - M_b(K) \quad (32)$$

$$= \frac{1}{2}J_x(J_x+1)M_{xx} + \frac{1}{2}J_y(J_y+1)M_{yy} + J +$$

$$\sum_{q=0}^{6}K_q\{J_xM_{xq} + J_yM_{yq}\}$$

Consider a first exemplary scenario in which $K_q=200\delta_{q0}$ (SF=256) and a single voice user is added to the system: $J_x=2$ (data plus control), and $J_y=0$. The total number of bytes to be written to SDRAM is then 0.5(2)(3)(1022)+200(2)(1022)=0.412 MB. Assuming a SDRAM write speed of 133 MHz*8 bytes*0.5=532 MB/s, the time required to write Γ-matrix to SDRAM is then 0.774 ms.

For additional illustration of the time required for storing the Γ-matrix, consider a second scenario in which $K_q=160\delta_{q0}$(SF=256), and a single 384 Kbps (SF=4) user is added to the system: $J_x=1$ (control) and $J_y=64$ (data). The total number of bytes is then 0.5(1)(2)(1022)+0.5(64)(65)(14)+160{1(1022)+64(518)}=5.498 MB. The SDRAM write speed is 133 MHz*8 bytes*0.5=532 MB/s. The time to write to SDRAM is then 10.33 ms.

Packing the Gamma-Matrix Elements in SDRAM

In this exemplary embodiment, the maximum total size of the Γ-matrix is 20.5 MB. If it is assumed that in order to pack the matrix, every element must be moved (this is the most demanding scenario), then for a SDRAM speed of 133 MHz*8 bytes*0.5=532 MB/s, the move time is then 2(20.5 MB)/(532 MB/s)=77.1 ms. If the Γ-matrix is divided over three processors, this time is reduced by a factor of 3. The packing can be done incrementally, so there is no strict time limit.

Extracting Gamma-Matrix Elements from SDRAM

As described above, in this exemplary embodiment, the C-matrix data is retrieved by utilizing the following algorithm:

```
m_min2 = G_info[l][k].m_min2
m_max2 = G_info[l][k].m_max2
N_g = L_g/N_c
Nl = m'*N - L_g/(2N_c)
for m' = 0:1
    for q = 0:L-1
        for q' = 0:L - 1
            τ = m'T + τ_lq - τ_kq'
            m_min1 = N1- n_lq + n_kq'
            m_max1 = m_min1 + N_g
            m_min = max[m_min1, m_min2]
            m_max = min[m_min1, m_min2]
            if m_max >= m_min
                m_span = m_max - m_min + 1
                sum1 = 0.0;
                ptr1 = &G_info[l][k].Glk[m_min]
                ptr2 = &g[m_min*N_c + τ]
                while m_span > 0
                    sum1 += (*ptr1++)*(*ptr2++)
                    m_span—
                end
                C[m'][l][k][q][q'] = sum1
            end
        end
    end
end
```

The time requirements for calculating the Γ-matrix elements in this exemplary embodiment, when a new user is added to the system was discussed above. The time requirements for extracting the corresponding C-matrix elements are discussed below.

The $\Gamma_{lk}[m]$ elements are accessed from SDRAM. It is highly likely that these values will not be contained in either L1 or L2 cache. For a given (l,k) pair, however, the spread in τ is likely to be, for most cases, less than 8 μs (i.e. for a 4 μs delay spread), which equates to (8 μs)(4 chips/μs)(2 bytes/chip)=64 bytes, or 2 cache lines. In an embodiment in which data is read in for two values of m', a total of 4 cache lines must be read. This will require 16 clocks, or about 16/133=0.12 μs. However, in some embodiments, accesses to SDRAM may be performed at about 50% efficiency so that the required time is about 0.24 μs.

If a user l=x is added to the system, the elements C[m'][x][k][q][q'] for all m', k, q and q' need to be fetched. As indicated above, all the m', q and q' values are typically contained in 4 cache lines. Hence, if there are $K_v$ virtual users, $4K_v$ cache lines need to be read, thereby requiring $32K_v$ clocks, where the number of clocks has been doubled to account for the 50% efficiency in accessing the SDRAM. In general, addition of J+1 virtual users to the system at a time, requires $32K_v(J+1)$ clocks.

In one example where there are 155 active virtual users and a new voice user is added to the system, the time required to read in the C-matrix elements can be 32(155)

(1+1) clocks/(133 clocks/μs)=74.6 μs. The present industry standard hold time $t_h$ for a voice call is 140 s. The average rate λ of users added to the system can be determined from $\lambda t_h=K$, where K is the average number of users utilizing the system. For K=100 users, λ=100/140 s=1 user are added per 1.4 s.

In another example where there are 99 active virtual users and a 384 Kbps user is added to the system, the time required to read in the C-matrix elements can be 32(99)(64+1) clocks/(133 clocks/μs)=1.55 ms. However data users presumably will be added to the system more infrequently than voice users.

Time to Extract Elements When $\tau_{xy}$ Changes

Now suppose, for example, that user l=x lag q=y changes. This necessitates fetching the elements C[m'][x][k][y][q'] for all m', k and q'. All the q' values will be contained typically in 1 cache line. Hence, $2(K_v)(1)=2 K_v$ cache lines need to be read in, thereby requiring $16K_v$ clocks, where the number of clocks has been doubled to account for the 50% efficiency in accessing the SDRAM. In general, when a time lag changes, there are J+1 virtual users for which the C-matrix elements need to be updated. Such updating of the C-matrix elements can require $16K_v(J+1)$ clocks.

In one example in which 155 active virtual users are present and a voice user's profile (one lag) changes, the time required to read in the C-matrix elements can be 16(155)(1+1) clocks/(133 clocks/μs)=37.3 μs. As discussed above, for high mobility users, such changes should occur at a rate of about 1 per 100 ms per physical user. This equates to about once per 1.33 ms processing interval, if there are 100 physical users. Hence, approximately 37.3 μs will be required every 1.33 ms.

In another example where there are 99 virtual users and a 384 Kbps data user's profile (one lag) changes, the time required to read in the C-matrix elements can be 16(99)(64+1) clocks/(133 clocks/μs)=0.774 ms. However data users will have lower mobility and hence such changes should occur infrequently.

Writing C-Matrix Elements to L2 Cache

Consider again the case where user l=x is added to the system. In such a case, the elements C[m'][x][k][q][q'] for all m', k, q and q' need to be written to cache. If there are $K_v$ active virtual users, $4K_vL^2$ bytes need to be written, where the number of bytes have been doubled because the elements are complex. In general, addition of J+1 virtual users to the system at a time will require $4K_vL^2(J+1)$ bytes to be written to L2 cache.

In one example, there are 155 active virtual users and a new voice user is added to the system. In this case, the time required to write the C-matrix elements can be 4(155)(16)(1+1) bytes/(2128 bytes/μs)=9.3 μs.

In another example, there are 99 active virtual users and a 384 Kbps user is added to the system. In such a case, the time required to write the C-matrix elements can be 4(99)(16)(64+1) bytes/(2128 bytes/μs)=193.5 μs. Data users are typically added to the system more infrequently than voice users.

Time to Extract Elements When $\tau_{xy}$ Changes

Consider a situation in which for user l=x lag q=y changes. In such a case, the elements C[m'][x][k][q][q'] for all m', k and q' need to be written. If there are $K_v$ active virtual users, $4K_vL$ bytes need to be written, where the number of the bytes has been doubled since the elements are complex. In general, addition of J+1 virtual users the system at a time will require $4K_vL(J+1)$ bytes to be written to L2 cache.

In one example, there are 155 active virtual users and a voice user's profile (one lag) changes. In such a case, the time required to write the C-matrix elements will be 4(155)(4)(1+1) bytes/(2128 bytes/μs)=2.33 μs.

In a second case, there are 99 active virtual users and a 384 Kbps data user's profile (one lag) changes. Then, the time required to write the C-matrix elements will be 4(99)(4)(64+1)bytes/(2128 bytes/μs)=48.4 μs. However data users will have lower mobility and hence such changes typically occur infrequently.

Packing C-matrix Elements in L2 Cache

In this exemplary embodiment, the C-matrix elements are packed in memory every time a new user is added to or deleted from the system, and every time a new user becomes active or inactive. In this embodiment, the size of the C-matrix is $2(3/2)(K_vL)^2=3(K_vL)^2$ bytes. If three processors are utilized, the size per processor is $(K_vL)^2$ bytes. Hence, the total time required for moving the entire matrix within L2 cache is $2(K_vL)^2$ bytes/(2128 bytes/μs), where the factor of 2 accounts for read and write. By way of example, if there are 155 active virtual users, the time required to move the C-matrix elements is $2(155*4)^2$ bytes/(2128 bytes/μs)=0.361 ms, whereas if there are 99 active virtual users the time required to move the C-matrix elements is $2(99*4)^2$ bytes/(2128 bytes/μs)=0.147 ms.

Hardware Calculation of Γ-matrix Elements

As discussed above, the C-matrix elements can be represented in terms of the underlying code correlations in accord with the following relation:

$$C_{lkqq'}[m'] \equiv \frac{1}{2N_l}\sum_n s_k[nN_c + m'T + \hat{\tau}_{lq} - \hat{\tau}_{kq'}] \cdot c_l^*[n] \quad (33)$$

$$= \frac{1}{2N_l}\sum_n \sum_p g[(n-p)N_c + m'T + \hat{\tau}_{lq} - \hat{\tau}_{kq'}] \cdot c_k[p] \cdot c_l^*[n]$$

$$= \frac{1}{2N_l}\sum_n \sum_m g[mN_c + \tau] \cdot c_k[n-m] \cdot c_l^*[n]$$

$$= \sum_m g[mN_c + \tau] \cdot \frac{1}{2N_l}\sum_n c_l^*[n] \cdot c_k[n-m]$$

$$= \sum_m g[mN_c + \tau] \cdot \Gamma_{lk}[m]$$

$$\Gamma_{lk}[m] \equiv \frac{1}{2N_l}\sum_n c_l^*[n] \cdot c_k[n-m]$$

$$\tau \equiv m'T + \hat{\tau}_{lq} - \hat{\tau}_{kq'}$$

The Γ-matrix represents the correlation between the complex user codes. The complex code for user l is assumed to be infinite in length, but with only $N_l$ non-zero values. The non-zero values are constrained to be ±1±j. The Γ-matrix can be represented in terms of the real and imaginary parts of the complex user codes as follows:

$$\Gamma_{lk}[m] \equiv \frac{1}{2N_l}\sum_n c_l^*[n] \cdot c_k[n-m] \quad (34)$$

$$= \frac{1}{2N_l}\sum_n \{c_l^R[n] - jc_l^I[n]\} \cdot \{c_k^R[n-m] + jc_k^I[n-m]\}$$

-continued $$= \frac{1}{2N_l} \sum_n \{c_l^R[n] \cdot c_k^R[n-m] + c_l^I[n] \cdot c_k^I[n-m] +$$

$$jc_l^R[n] \cdot c_k^I[n-m] - jc_l^I[n] \cdot c_k^R[n-m]\}$$

$$= \Gamma_{lk}^{RR}[m] + \Gamma_{lk}^{II}[m] + j\{\Gamma_{lk}^{RI}[m] - \Gamma_{lk}^{IR}[m]\}$$

where $$\Gamma_{lk}^{RR}[m] \equiv \frac{1}{2N_l} \sum_n c_l^R[n] \cdot c_k^R[n-m] \quad (35)$$

$$\Gamma_{lk}^{II}[m] \equiv \frac{1}{2N_l} \sum_n c_l^I[n] \cdot c_k^I[n-m]$$

$$\Gamma_{lk}^{RI}[m] \equiv \frac{1}{2N_l} \sum_n c_l^R[n] \cdot c_k^I[n-m]$$

$$\Gamma_{lk}^{IR}[m] \equiv \frac{1}{2N_l} \sum_n c_l^I[n] \cdot c_k^R[n-m]$$

Consider any one of the above real correlations, denoted $$\Gamma_{lk}^{XY}[m] \equiv \frac{1}{2N_l} \sum_n c_l^X[n] \cdot c_k^Y[n-m] \quad (36)$$

where X and Y can be either R or I. Since the elements of the codes are now constrained to be ±1 or 0, the following relation can be defined:

$$c_l^X[n] = (1 - 2\gamma_l^X[n]) \cdot m_l^X[n] \quad (37)$$

where $\gamma_l^X[n]$ and $m_l^X[n]$ are both either zero or one. The sequence $m_l^X[n]$ is a mask used to account for values of $c_l^X[n]$ that are zero. With these definitions, the above Equation (4) becomes $$\Gamma_{lk}^{XY}[m] \equiv \frac{1}{2N_l} \sum_n (1 - 2\gamma_l^X[n]) \cdot m_l^X[n] \cdot (1 - 2\gamma_k^Y[n-m]) \cdot \quad (38)$$

$$m_k^Y[n-m]$$

$$= \frac{1}{2N_l} \sum_n (1 - 2\gamma_l^X[n]) \cdot (1 - 2\gamma_k^Y[n-m]) \cdot m_l^X[n] \cdot$$

$$m_k^Y[n-m]$$

$$= \frac{1}{2N_l} \sum_n [1 - 2(\gamma_l^X[n] \oplus \gamma_k^Y[n-m])] \cdot m_l^X[n] \cdot$$

$$m_k^Y[n-m]$$

$$= \frac{1}{2N_l} \Big\{ \sum_n \cdot m_l^X[n] \cdot m_k^Y[n-m] -$$

$$2 \sum_n (\gamma_l^X[n] \oplus \gamma_k^Y[n-m]) \cdot m_l^X[n] \cdot m_k^Y[n-m] \Big\}$$

$$= \frac{1}{2N_l} \{M_{lk}^{XY}[m] - 2N_{lk}^{XY}[m]\}$$

$$M_{lk}^{XY}[m] \equiv \sum_n \cdot m_l^X[n] \cdot m_k^Y[n-m]$$

$$N_{lk}^{XY}[m] \equiv \sum_n (\gamma_l^X[n] \oplus \gamma_k^Y[n-m]) \cdot m_l^X[n] \cdot m_k^Y[n-m]$$

where ⊕ indicates modulo-2 addition (or logical XOR).

In addition to configurations discussed elsewhere herein, FIGS. 17, 18 and 19 illustrate exemplary hardware configurations for computing the functions $M_{lk}^{XY}[m]$ and $N_{lk}^{XY}[m]$ for calculating the Γ-matrix elements. Once the functions $M_{lk}^{XY}[m]$ and $N_{lk}^{XY}[m]$ are obtained, the remaining calculations for obtaining the Γ-matrix elements can be performed in software, or hardware. In this exemplary embodiment, these remaining calculations are performed in software. More particularly, FIG. 17 shows a register having an initial configuration subsequent to loading a code and a mask sequences. Further, FIG. 18 depicts a logic circuit for performing the requisite boolean functions. FIG. 19 depicts the configuration of the register after implementing a number of shifts.

The four functions $\Gamma_{lk}^{XY}[m]$ corresponding to X, Y=R, I which are components of $\Gamma_{lk}[m]$ can be calculated in parallel. For $K_v$=200 virtual users, and assuming that 10% of all (l, k) pairs need to be calculated in 2 ms, then for real-time operation, $0.10(200)^2$=4000 $\Gamma_{lk}[m]$ elements (all shifts) need to be computed in 2 ms, or about 2M elements (all shifts) per second. For $K_v$=128 virtual users, the requirement drops to 0.8192M elements (all shifts) per second.

In this embodiment, the $\Gamma_{lk}[m]$ elements are calculated for all 512 shifts. However, not all of these shifts are needed. Thus, it is possible to reduce the number of calculations per $\Gamma_{lk}[m]$ elements by calculating only those elements that are needed.

As described in more detail elsewhere herein, in one hardware implementation of the invention, a single processor is utilized for performing the C-matrix calculations whereas a plurality of processors, for example, three processors, are employed for the R-matrix calculations, which are considerably more complex. In what follows, a load balancing method is described that calculates optimum R-matrix partitioning points in normalized virtual user space to provide an equal, and hence balanced, computational load per processor. More particularly, it is shown that a closed form recursive solution exists that can be solved for an arbitrary number of processors.

Balancing Computational Load Among Processors for Parallel Calculation of R-matrix As a result of the following symmetry condition, only half of the R-matrix elements need to be explicitly calculated:

$$R_{lk}(m) = \xi R_{k,l}(-m). \quad (39)$$

In essence, only two matrices need to be calculated. One of these matrices is combination of R(1) and R(−1), and the other is the R(0) matrix. In this case, the essential R(0) matrix elements have a triangular structure. The number of computations performed to generate the raw data for the R(1)/R(−1) and R(0) matrices are combined and optimized as a single number. This approach is adopted due to the reuse of the X matrix outer product values (see the above Equation (8)) across the two R-matrices. Combining the X matrix and correlation values dominate the processor utilization since they represent the bulk of the computations. In this embodiment, these computations are employed as a cost metric for determining the optimum loading of each processor.

The optimization problem can be formulated as an equal area problem, where the solution results in equal partition areas. Since the major dimensions of the R-matrices are given in terms of the number of active virtual users, the solution space for the optimization problems can be defined in terms of the number of virtual users per processor. It is clear to those skilled in the art that the solution can be applicable to an arbitrary number of virtual users by normalizing the solution space by the number of virtual users.

With reference back to FIG. 10, the computations of the R(1)/R(−1) matrix can be represented by a square HJKM while the computations of the R(0) matrix can be represented by a triangle ABC. From elementary geometry, the area of a rectangle of length b and height h is given by:

$$A_r = bh. \quad (40)$$

and the area of a triangle with a base width b and a height h is given by $$A_t = \frac{1}{2}bh. \quad (41)$$

Accordingly, a combined area of a rectangle $A_{ri}$ and a triangle $A_{ti}$ having a common height $a_i$ is given by the following relation:

$$A_t = A_{ti} + A_{ti} \quad (42)$$
$$= a_i a_3 + \frac{1}{2}a_i^2$$
$$= a_i + \frac{1}{2}a_i^2.$$

wherein $A_i$ provides the area of a region below a given partition line. For example, $A_2$ provides the area within the rectangle HQRM plus the region within triangle AFG. The difference in the area of successive partition regions is employed to form a cost function. More particularly, $$B_i = A_i - A_{i-1} \quad (43)$$
$$= \frac{1}{2}a_i^2 + a_i - \frac{1}{2}a_{i-1}^2 - a_{i-1}$$

For an optimum solution, $B_i$'s corresponding to i=1, 2, ..., N, where N is the number of processors performing the calculations, are equal. Because the total normalized load is equal to $A_N$, the load per processor is equal to $A_N/N$. That is $$B_i = \frac{A_N}{N} = \frac{A_3}{3} = \frac{3}{2N}, \quad (44)$$

for i=1, 2, ..., N.

By combining the above equations for $B_i$, the solution for $a_i$ can be found by finding the roots of the following equation:

$$\frac{1}{2}a_i^2 + a_i - \frac{1}{2}a_{i-1}^2 - a_{i-1} - \frac{3}{2N} = 0. \quad (45)$$

Hence, the solution of $a_i$ is given as follows:

$$a_i = -1 \pm \sqrt{1 + a_{i-1}^2 + 2a_{i-1} + \frac{3}{N}}, \quad (46)$$

The negative roots of the above solution for $a_i$ are discarded because the solution space falls in a range [0,1]. Although it appears that a solution of $a_i$ requires first obtaining values of $a_i-1$, expanding the recursion relations of the $a_i$ and utilizing the fact that $a_0$ equals 0 results in obtaining the following solution for $a_i$ that does not require obtaining $a_i-1$:

$$a_i = -1 + \sqrt{1 + \frac{3i}{N}} \quad (47)$$

The table below illustrates the normalized partition values of two, three, and four processors. To calculate the actual partition values, the number of active virtual users is multiplied by the corresponding table entries. Since a fraction of a user can not be allocated, a ceiling operation can be performed that biases the number of virtual users per processor towards the processors whose loading function is less sensitive to perturbations in the number of users

| Location | Two processors | Three processors | Four processors |
|---|---|---|---|
| $a_1$ | $-1 = \sqrt{\frac{5}{2}}$ (0.5811) | $-1 + \sqrt{2}$ (0.4142) | $-1 + \sqrt{\frac{7}{4}}$ (0.3229) |
| $a_2$ | — | $-1 + \sqrt{3}$ (0.7321) | $-1 + \sqrt{\frac{5}{2}}$ (0.5811) |
| $a_3$ | — | — | $-1 + \sqrt{\frac{13}{4}}$ (0.8028) |

The above methods for calculating the R-matrix elements can be implemented in hardware and/or software as illustrated elsewhere herein. With reference to FIG. 20, in one embodiment, the above calculations are performed by utilizing a single card that is populated with four Power PC 7410 processors. These processors employ the AltiVec SIMD vector arithmetic logic unit which includes 32 128-bit vector registers. These registers can hold either four 32-bit float, or four 32-bit integers, or eight 16-bit shorts, or sixteen 8-bit characters. Two vector SIMD operations can be performed by clock. The clock rate utilized in this embodiment is 400 Mz, although other clock rates can also employed. Each processor has 32 KB of L1 cache and 2 MB of 266 MHz L2 cache. Hence, the maximum theoretical performance level of these processors is 3.2 GFLOPS, 6.4 GOPS (16-bit), or 12.8 GOPS (8-bit). In this exemplary embodiment, a combination of floating-point, 16-bit fixed-point and 8-bit fixed-point calculations are utilized.

With continued reference to FIG. 20, the calculation of the C-matrix elements are performed by a single processor 220. In contrast, the calculation of the R-matrix elements are divided among three processors 222, 224, and 226. Further, a RACE++ 266 MB/sec 8-port switched fabric 228 interconnects the processors. The high bandwidth of the fabric allows transfer of large amounts of data with minimal latency so as to provide efficient parallelism of the four processors.

Vector Processor-Based R-Matrix Generation

Vector processing is beneficially employed, in one embodiment of the invention, to speed calculations performed by the processor card of FIGS. 2 and 3. Specifically, the AltiVec™ vector processing resources (and, more particularly, instruction set) of the Motorola PowerPC 7400 processor used in node processors 228 are employed to speed calculation of the R-matrix. These processors include a single-instruction multiple-data (SIMD) vector arithmetic logic unit which includes 32 128-bit input vector units. These units can hold either four 32-bit integers, or eight 16-bit integers, or even sixteen 8-bit integers. The clock rate utilized in this embodiment is 400 Mz, although other clock rates can be also employed.

Of course, those skilled in the art will appreciate that other vector processing resources can be used in addition or instead. These can include SIMD coprocessors or node processors based on other chip sets, to name a few. Moreover, those skilled in the art will appreciate that, while the discussion below focuses on use of vector processing to speed calculation of the R-matrix, the techniques described below can be applied to calculating other matrices of the type described previously as well, more generally, to other calculations used for purposes of CDMA and other communications signal processing.

In the illustrated embodiment, a mapping vector is utilized to create a mapping between each physical user and its associated (or "decomposed") virtual users. This vector is populated during the decomposition process which, itself, can be accomplished in a conventional manner known in the art. The vector is used, for example, during generation of the R-matrix as described below.

As further evident in the discussion below, the X-matrix (see Equation (8)), is arranged such that a "strip-mining" method of the boundary elements can be performed to further increase speed and throughput. The elements of that matrix are arranged such that successive ones of them can be stripped to generate successive elements in the R-matrix. This permits indices to be incremented rather than calculated. The elements are, moreover, arranged in a buffer such that adjacent elements can be multiplied with adjacent element of the C-matrix, thereby, limiting the number of required indices to two within the iterative summation loops.

In the discussion that follows, a node processor 228 operating as a vector processor is referred to as vector processor 410. FIG. 21 is a block diagram depicting the architecture and operation of one such node processor 228, and its corresponding vector processor 410, used in an embodiment of the invention to calculate the R-matrix 428 using integer representations of the C-matrix 424 and waveform amplitudes 426. To facilitate a complete understanding of the illustrated embodiments, only a sampling of operands are illustrated, e.g., a few elements each of the C-matrix 424, complex amplitudes 426 and R-matrix 428. In actual operation of a system according to the invention, the vector processor 410 can used to process matrices containing hundreds or thousands of elements.

As shown in the drawing, the illustrated node processor 228 is configured via software instructions to execute a floating point to integer transformation process 406 and an integer to floating point transformation process 412, well as to serve as a vector processor 410. The relationship and signalling between these modes is depicted in the drawing.

By way of overview, and as discussed above, one or more code-division multiple access (CDMA) waveforms or signals transmitted, e.g., from a user cellular phone, modem or other CDMA signal source are decomposed into one or more virtual user waveforms. The virtual user is deemed to "transmit" a single bit per symbol period of that received CDMA waveform. In turn, each of the virtual user waveforms is processed according to the methods and systems described above.

In some embodiments, waveform processing is performed using floating-point math, e.g., for generating the gamma-matrix, C-matrix, R-matrix, and so on, all in the manner described above. However, in an embodiment of the invention, e.g., reflected in FIG. 21, integer math is performed on the vector processor 410, taking advantage of block-floating point representation of the operands. This speeds waveform processing, albeit at the cost of accuracy. However, in the illustrated embodiment, a balance is achieved by through use of 16-bit block-floating point representation, e.g., in lieu of conventional 32-bit floating-point representations. Those skilled in the art will appreciate that block-floating representations of other bit widths could be used instead, depending on implementation requirements.

Referring to FIG. 21, the C-matrix 424 is generated by the node processor 228 as described above, and is stored in memory accordingly in a floating-point representation, e.g., $C_0$ 401, $C_1$ 402, and so on. Further, the amplitudes 426 are stored in memory as floating-point representations. Both sets of representations are transformed into floating-block format via a transformation process 406 which generates a common exponent 414 and a 16-bit integer for each operand. The transformation process 416 stores two integers in each word, e.g., $C_0$ 408a, $C_1$ 408b, and $a_0$ 409a, $a_1$ 409b, and the corresponding block exponent 414. The transformation process 414 can be performed via special purpose function or through use of extensions to the C programming language, as can be seen in a programming listing that is further described. The integers stored in memory, e.g., 408, 409, are moved by the transformation process 406 to the vector processor 410 for processing.

The vector processor 410 includes two input vector units 416, 418, an output vector unit 420, and an arithmetic processor 422. Each vector unit is 128-bits in length, hence, each can store eight of the 16-bit integer operands. The arithmetic processor 422 has a plurality of operating elements, 422a through 422c. Each of the operating element 422a through 422c applies functionality to a set of operands stored in the input vector units 416, 418, and stores that processed data in the output vector 420. For example, the operating element 422a performs functionality on operands $C_0$ 416a and $a_0$ 418a and generates $R_0$ 420a. The arithmetic processor 422 can be programed via C programming instructions, or by a field programmable gate array or other logic.

Although vector processor 410 includes two input vector units 416, 418, in other embodiments it can have numerous vector units, that can be loaded with additional C-matrix and complex amplitude representations at the same time. Further, the operands can be stored in a non-sequential order to accommodate increased throughput via storing operands according to a first-used order.

As noted above, one way to program the arithmetic processor 422 is through extensions to a high level programming language. One such program, written in C, suitable for instruction the vector processor 422 to generate the R-matrix is as follows:

```
#include "mudlib.h"
#define DO_CALC_STATS 0
#define DO_TRUNCATE 1
#define DO_SATURATE 1
#define DO_SQUELCH 0
#define SQUELCH_THRESH 1.0
#define TRUNCATE_BIAS 0.0
#if DO_TRUNCATE
#define SATURATE_THRESH (128.0 + TRUNCATE_BIAS)
#else
#define SATURATE_THRESH 127.5
#endif
#define SATURATE( f ) \
    { \
        if ( (f) >= SATURATE_THRESH ) f = (SATURATE_THRESH - 1.0); \
        else if ( (f) < -SATURATE_THRESH ) f = -SATURATE_THRESH; \
    }
#if DO_TRUNCATE
#if 0
#define BF8_FIX ( f ) ((BF8) (FABS(f) <= TRUNCATE_BIAS) ? 0 : \
            (((f) > 0.0) ? ((f) - TRUNCATE_BIAS) : \
                            ((f) + TRUNCATE_BIAS)))
#define BF8_FIX ( f ) ((BF8)(f))
#else
#define BF8_FIX ( f ) ((BF8) (((((f) < 0.0)) && ((f) == (float) ((int) (f)))) ?\
            ((f) + 1.0) : (f)))
#endif
#else
#define BF8_FIX ( f ) ((BF8)(((f) >= 0.0) ? ((f)+0.5) : ((f)-0.5)))
#endif
#define UPDATE_MAX ( f, max ) \
    if ( FABS( f ) > max ) max = FABS ( f. );
#define uchar unsigned char
#define ushort unsigned short
#define ulong unsigned long
#if DO_CALC_STATS
static float max_R_value;
#endif
void gen_X_row (
        COMPLEX_BF16 *mpath1_bf,
        COMPLEX_BF16 *mpath2_bf,
        COMPLEX_BF16 *X_bf,
        int phys_index,
        int tot_phys_users
    );
void gen_R_sums (
        COMPLEX_BF16 *X_bf,
        COMPLEX_BF8 *corr_bf,
        uchar *ptov_map,
        BF32 *R_sums,
        int num_phys_users
    );
void gen_R_sums2 (
        COMPLEX_BF16 *X_bf,
        COMPLEX_BF8 *corra_bf,
        COMPLEX_BF8 *corrb_bf,
        uchar *ptov_map,
        BF32 *R_sumsa,
        BF32 *R_sumsb,
        int num_phys_users
    );
```

-continued

```
void gen_R_matrices (
        BF32 *R_sums,
        float *bf_scalep,
        float *inv_scalep,
        float *scalep,
        BF8 *no_scale_row_bf,
        BF8 *scale_row_bf,
        int num_virt_users
    );
void mudlib_gen_R (
        COMPLEX_BF16 *mpath1_bf,      /* ANTENNA DATA 1: TWO AMPLITUDE
                                         DATA VALUES a hat FOR EACH USER
                                         */
        BCOMPLEX_BF16 *mpath2_bf,     /* ANTENNA DATA 2 */
        COMPLEX_BF8 *corr_0_bf,       /* adjusted for starting physical
                                         user */
                                      /* C MATRIX, I.E., C(0), SYMBOL YOU
                                         ARE ON VERSUS OTHER SYMBOLS */
        COMPLEX_BF8 *corr_1_bf,       /* adjusted for starting physical
                                         user */
                                      /* C MATRIX. THIS IS A VIRTUAL
                                         USER BY VIRTUAL USER_MATRIX.
                                         EACH USER HAS 16 VALUES THAT
                                         CORRELATE THAT USER TO OTHER
                                         USERS */
        uchar *ptov_map,              /* no more than 256 virts. per phys
                                         */
                                      /* MAPPING OF PHYSICAL TO
                                         VIRTUAL USERS MAP. IN FURTHER
                                         EMBODIMENTS, THIS COULD
                                         DYNAMICALLY CHANGE AS USERS
                                         ENTER INTO AND LEAVE SYSTEM */
        float *bf_scalep,             /* scalar: always a power of 2 */
                                      /* VECTOR WITH SCALAR FOR EACH
                                         VIRTUAL USER -- NOTWITHSTANDING
                                         */
        float *inv_scalep,            /* start at O'th physical user */
        float *scalep,                /* start at O'th physical user */
        char *L1 cachep,              /* temp: 32K bytes, 32-byte aligned
                                         */
                                      /* OUTPUTS (BEGINNING AT NEXT LINE)
                                         */
        BF8 *R0_upper_bf,             /* UPPER PART OF R(1) MATRIX -- A
                                         TRIANGULAR PACKED MATRIX */
        BF8 *R0_lower_bf,             /* LOWER PART OF R(0) MATRIX */
        BF8 *R1_trans_bf,             /* TRANSPOSED FORM OF R(0) */
        BF8 *R1m_bf,                  /* R(-1) --> "m" STANDS FOR -1 */
        int tot_phys_users,           /* TOTAL PHYSICAL USERS */
        int tot_virt_users,           /* SUM OF VIRTUAL USERS */
        int start_phys_user,          /* zero-based starting row
                                         (inclusive) */
                                      /* STARTING PHYSICAL USER TO WHICH
                                         THIS PR0CESSOR IS ASSIGNED */
        int start_virt_user,          /* relative to start_phys_user */
                                      /* STARTING VIRTUAL USER TO WHICH
                                         THIS PR0CESSOR IS ASSIGNED */
                                      /* NOTE: THIS IS AN ADVANTAGE
                                         IN ALLOWING US TO PARTITION A
                                         GIVEN PHYSICAL USER TO MULTIPLE
                                         PROCESSORS */
        int end_phys_user,            /* zero-based ending row inclusive)
                                         */
                                      /* SAME AS ABOVE, BUT END VALUES */
        int end_virt_user             /* relative to end_phys_user */
    )
{
COMPLEX_BF16 *X_bf;
BF32 *R_sums0, *R_sums1;              /* BEGINNING OF PARTITIONING AND
                                         PARAMETER SET-UP LOGIC */
uchar *R0_ptov_map;
int bump, byte_offset, i, iv, last_virt_user,
int R0_align, R0_skipped_virt_users, R0_tcols, R0_virt_users, R1_tcols;
#if DO_CALC_STATS
    max_R_value = 0.0;
#endif
    X_bf = (COMPLEX_BF16 *) L1_cachep;
    byte_offset = tot_phys_users * NUM_FINGERS_SQUARED * sizeof (COMPLEX_
                BF1F);
```

```
R_sums0 = (BF32 *) (((ulong)X_bf + byte_offset + R_MATRIX_ALIGN_MASK) &
        ~R_MATRIX_ALIGN_MASK);
byte_offset = tot_virt_users * sizeof (BF32);
R_sums1 = (BF32 *) (((ulong) R_sums0 + byte_offset + R_MATRIX_ALIGN_MASK) &
        ~R_MATRIX_ALIGN_MASK);
R0 ptov_map = (uchar *) (((ulong) R_sums1 + byte_offset + R_MATRIX_ALIGN_
        MASK) & ~R_MATRIX_ALIGN_MASK);
R1_tcols = (tot_virt_users + R_MATRIX_ALIGN_MASK) & ~R_MATRIX_ALIGN_MASK;
R0_virt_users = 0;
for ( i = start_phys_user; i < tot_phys_users; i++ ) {
    R0_virt_users += (int)ptov map[I];
    R0_ptov_map[I] = ptov_map[I];
}
R0_ptov_map [start_phys_user] -= start virt user;
R0_skipped_virt_users = tot_virt_users - RU_virt_users + start_virt_user;
R0_virt_users -= (start_virt_user + 1);
--inv_scalep;                           /* predecrement to allow for common
                                           indexing */
for ( i = start_phys_user; i <= end_phys_user; i++ ) { /* LOOP OVER ALL
                                           PHYSICAL USERS
                                           (ASSIGNED
                                           TO THIS
                                           PR0CESSOR) */
    gen_X_row (                         /* FIND C CODE THAT PERTAINS TO THIS */
        mpath1_bf,
        mpath2_bf,
        X_bf,
        i,
        tot_phys users
    );
    --R0_ptov_map[i];                   /* excludes R0 diagonal */
    last_virt_user = (i < end_phys_user) ? ((int)ptov map[I] - 1) :
                                           end_virt_user;
    for ( iv = start_virt_user; (iv + 1) <= last virt user; iv += 2 ) {
        gen_R_sums2 (
            X_bf + (i * NUM_FINGERS_SQUARED),
            corr_0_bf,
            corr_0_bf + ( (R0_virt_users - 1) * NUM_FINGERS_SQUARED),
            R0_ptov map + i,
            R_sums0 + (R0_skipped_virt_users + 1),
            R_sums1 + (R0_skipped_virt_users + 1),
            tot_phys_users - i
        );
        R0_tcols = R1_tcols - (R0_skipped_virt_users & ~R_MATRIX_ALIGN_MASK);
        R0_align = (R0_skipped_virt_users & R_MATRIX_ALIGN_MASK) + 1;
        gen R_matrices (
            R_sums0 + (R0_skipped_virt_users + 1),
            bf scalep,
            inv scalep + (R0 skipped virt_users + 1),
            scalep + (R0_skipped_virt_users + 1),
            R0 lower bf + R0 align,
            R0 upper bf + R0 align,
            R0 virt_users
        );
        R0_upper_bf [ R0_align - 1 ] = 0;  /* zero diagonal element */
        R0_lower_bf += R0_tcols;
        R0_upper_bf += R0_tcols;
        R0_tcols = R1_tcols - ( (R0 skipped_virt_users + 1) &
                                ~R_MATRIX_ALIGN_MASK);
        R0_align = ( (R0_skipped_virt_users + 1) & R_MATRIX_ALIGN_MASK) + 1;
        gen_R_matrices (
            R_sums1 + (R0_skipped_virt_users + 2),
            bf_scalep,
            inv_scalep + (R0_skipped_virt_users + 2),
            scalep + (R0 skipped virt_users + 2),
            R0_lower_bf + R0_align,
            R0_upper_bf + R0_align,
            R0_virt_users - 1
        );
        R0_upper_bf [ R0_align - 1 ] = 0;  /* zero diagonal element */
        R0_lower_bf += R0_tcols;
        R0_upper_bf += R0_tcols;
        /*
         * create ptov map[i] number of 32-element dot products involving
         * X_bf [i] and corr_1_bf [i] [j] where 0 < j < ptov_map[i]
         */
        gen_R_sums2 (
            X_bf,
            corr_1_bf,
```

```
            corr_1_bf + (tot_virt_users * NUM_FINGERS_SQUARED),
            ptov_map,
            R_sums0,
            R_sums1,
            tot_phys_users
        );
        /*
         * scale the results and create two output rows (1 per matrix)
         */
        gen_R_matrices (
            R_sums0,
            bf_scalep,
            inv_scalep + (R0_skipped_virt_users + 1),
            scalep,
            R1_trans_bf,
            R1m_bf,
            tot_virt_users
        );
        R1_trans_bf += R1_tcols;
        R1m_bf += R1_tcols;
        gen_R_matrices (
            R_sums1,
            bf_scalep,
            inv_scalep + (R0_skipped_virt_users + 2),
            scalep,
            R1_trans_bf,
            R1m_bf,
            tot_virt_users
        );
        R1_trans_bf += R1_tcols;
        R1m_bf += R1_tcols;
        corr_0_bf += (((2 * R0_virt_users) - 1) * NUM_FINGERS_SQUARED);
        corr_1_bf += ((2 * tot_virt_users) * NUM_FINGERS_SQUARED);
        R0_ptov_map[i] -= 2;
        R0_virt_users -= 2;
        R0_skipped_virt_users += 2;
    }
    if ( iv <= last virt user ) {
        bump = R0_ptov_map [ i ] ? 0 : 1;
        gen_R_sums (
            X_bf + ((i + bump) * NUM_FINGERS_SQUARED),
            corr_0_bf,
            R0_ptov_map + i + bump,
            R_sums0 + (R0_skipped_virt_users + 1),
            tot_phys_users - i - bump
        );
        R0_tcols = R1_tcols - (R0_skipped_virt_users & ~R_MATRIX_ALIGN_MASK);
        R0_align = (R0_skipped_virt_users & R_MATRIX_ALIGN_MASK) + 1;
        gen_R_matrices (
            R_sums0 + (R0_skipped_virt_users + 1),
            bf_scalep,
            inv_scalep + (R0_skipped_virt_users + 1),
            scalep + (R0_skipped_virt_users + 1),
            R0_lower_bf + R0_align,
            R0_upper_bf + R0_align,
            R0_virt_users
        );
        R0_upper_bf [ R0_align - 1 ] = 0; /* zero diagonal element */
        R0_lower_bf += R0_tcols;
        R0_upper_bf += R0_tcols;
        /*
         * create ptov map[i] number of 32-element dot products involving
         * X_bf [i] and corr_1_bf [i] [j] where 0 < j < ptov_map[i]
         */
        gen_R_sums (
            X_bf,
            corr_1_bf,
            Ptov_map,
            R_sums0,
            tot_phys_users
        );
        /*
         * scale the results and create two output rows (1 per matrix)
         */
        gen_R_matrices (
            R_sums0,
            bf_scalep,
            inv_scalep + (R0_skipped_virt_users + 1),
            scalep,
```

```
                        R1_trans_bf,
                        R1m_bf,
                        tot_virt_users
                    );
                    R1_trans_bf + = R1_tcols;
                    R1m_bf += R1_tcols;
                    Corr_0_bf += (R0_virt_users * NUM_FINGERS_SQUARED);
                    corr_1_bf += (tot_virt_users * NUM_FINGERS_SQUARED);
                    R0_ptov_map[i] -= 1;
                    R0_virt_users -= 1;
                    R0_skipped_virt_users += 1;
                }
                start_virt_user =0;          /* for all subsequent passes */
            }
#if DO_CALC_STATS
    printf ( "max_R_value = % f\n", max_R_value );
    if ( max_R_value > 127.0 )
        printf ( "***** OVERFLOW *****\n" );
#endif
}
#if COMPILE_C
                                            /* OUTPUT PRODUCT OF TWO
                                               ANTENNAS */
void gen_X_row (                            /* EACH ANTENNA HAS TWO
                                               VALUES PER PHYSICAL USER
                                               */
            COMPLEX_BF16 *mpath1_bf,        /* 2ND ANTENNA IS DIVERSITY ANTENNA */
            COMPLEX_BF16 *mpath2_bf,        /* RESULTING OUTPUT PR0DUCT IS REP'D BY
                                               X sub l,k */
            COMPLEX_BF16 *X_bf,
            int_phys_index,
            int_tot_phys users
        )
{
    COMPLEX_BF16 *in_mpath1p, *in_mpath2p;
    COMPLEX_BF16 *out_mpath1p, *out_mpath2p;
    int i, j, q, q1;
    BF32 s1r, s1i, s2r, s2i;
    BF32 a1r, a1i, a2r, a2i;
    BF32 cr, ci;
    out_mpath1p = mpath1_bf + (phys_index * NUM_FINGERS);
    out_mpath2p = mpath2_bf + (phys_index * NUM_FINGERS);
    for ( i = 0; i < tot_phys_users; i++ ) {
        in_mpath1p = mpath1_bf + (i * NUM_FINGERS); /* 4 complex values */
        in_mpath2p = mpath2_bf + (i * NUM_FINGERS); /* 4 complex values */
        j = 0;
        for ( q1 = 0; q1 < NUM_FINGERS; q1++ ) {
            s1r = (BF32) out_mpath1p [q1] .real;
            s1i = (BF32) out_mpath1p [q1] .imag;
            s2r = (BF32) out_mpath2p [q1] .real;
            s2i = (BF32) out_mpath2p [q1] .imag;
            for ( q = 0; q < NUM FINGERS; q++ ) {
                a1r = (BF32)in_mpath1p [q] . real;
                a1i = (BF32)in_mpath1p [q] . imag;
                a2r = (BF32) in_mpath2p [q] .real;
                a2i = (BF32) in_mpath2p [q] . imag;
                cr = (a1r * s1r) + (a1i * s1i);    /* COMBO OF TWO ANTENNAS --
                                                      COULD BE MORE, OF COURSE
                                                      */
                ci = (a1r * s1i) - (a1i * s1r);    /* cr IS REAL PART OF
                                                      ELEMENT OF X-MATRIX */
                cr += (a2r * s2r) + (a2i * s2i);
                ci += (a2r * s2i) - (a2i * s2r);
                X_bf [i * NUM_FINGERS_SQUARED + j] .real = (BF16) (cr >> 16); /*
BLOCK
                X_bf [i * NUM_FINGERS_SQUARED + j] .imag = (BF16) (ci >> 16);
                ++j;
            }
        }
    }
}
void gen_R_sums (
            COMPLEX_BF16 *X_bf,
            COMPLEX_BF8 *corr_bf,
            uchar *ptov_map,
            BF32 *R_sums,
            int num_phys_users
        )
```

-continued

```
{
    int i, j, k;
    BF32 sum;
    for ( i = 0; i < num_phys_users; i++ ) {
        for ( j = 0; j < (int)ptov_map [i]; j++ ) {
            sum = 0;
            for ( k = 0; k < 16; k++ ) {
                sum += (BF32) X_bf [k] .real * (BF32) corr_bf->real;
                sum += (BF32) X_bf [k] .imag * (BF32) corr_bf->imag;
                ++corr_bf;
            }
            *R sums++ = sum;
        }
        X_bf += NUM_FINGERS_SQUARED;
    }
}
void gen_R_sums2 (
        COMPLEX BF16 +X_bf,
        COMPLEX BF8 *corra_bf,
        COMPLEX_BF8 *corrb_bf,
        uchar *ptov_map,
        BF32 *R_sumsa,
        BF32 *R_sumsb,
        int num_phys_users
        )
{
    int i, j, k;
    BF32 suma, sumb;
    for ( i = 0; i < num_phys_users; i++ ) {
        for ( j = 0; j < (int)ptov_map[i]; j++ ) {
            suma = 0;
            sumb = 0;
            for ( k = 0; k < 16; k++ ) {
                suma += (BF32) X_bf [k] .real * (BF32) corra_bf ->real;
                suma += (BF32) X_bf [k] .imag * (BF32) corra_bf ->imag;
                sumb += (BF32) X_bf [k] .real * (BF32) corrb_bf ->real;
                sumb += (BF32) X_bf [k] .imag * (BF32) corrb_bf ->imag;
                ++corra_bf;
                ++corrb_bf;
            }
            *R sumsa++ = suma;
            *R sumsb++ = sumb;
        }
        X_bf += NUM_FINGERS_SQUARED;
    }
}
void gen_R_matrices (
        BF32 *R_sums,
        float *bf_scalep,
        float *inv_scalep,
        float *scalep,
        BF8 *no_scale_row_bf,
        BF8 *scale_row_bf,
        int num_virt_users
        )
{
    int i;
    float bf_scale, fsum, fsum_scale, inv_scale, scale;
    bf_scale = *bf_scalep;
    inv_scale = *inv_scalep;
    for ( i = 0; i < num_virt_users; i++ ) {
        scale = scalep[i];
        fsum = (float) (R_sums[i]);
        fsum *= bf_scale;
        fsum_scale = fsum * inv_scale;
        fsum_scale *= scale;
#if DO_CALC_STATS
        UPDATE_MAX( fsum_scale, max_R_value )
        UPDATE_MAX ( fsum, max_R_value )
#endif
#if DO_SQUELCH
        if ( FABS ( fsum_scale ) <= SQUELCH_THRESH ) fsum_scale = 0.0;
        if ( FABS ( fsum ) <= SQUELCH_THRESH ) fsum = 0.0;
#endif
```

-continued

```
#if DO SATURATE
        SATURATE( fsum_scale )
        SATURATE( fsum )
#endif
        no_scale_row_bf[i] = BF8_FIX ( fsum );
        scale row bf [i] = BF8_FIX( fsum_scale );
    }
}
#endif                                          /* COMPILE_C */
```

A transformation process 412 transforms the block-floating representations stored in the output vector unit 420 into floating point representations and stores those to a memory 428. Here, the R-matrix elements stored in the output vector unit 420 are transformed into floating-point representations, which can then be used in the manner described above for estimating symbols in the physical user waveforms.

In summary, sufficient throughput can be achieved with necessary accuracy using a vector processor 410 applying integer math on 16-bit block-floating integers. Of course, in other embodiments, different block-floating sizes can be used depending on such criteria as the number of users, speed of the processors, and necessary accuracy of the symbol estimates, to name a few. Further, like methods and logic described can be used to generate other matrices (e.g., the gamma-matrix and the C-matrix) and to perform other calculations within the illustrated embodiment.

A further understanding of the operation of the illustrated and other embodiments of the invention may be attained by reference to (i) U.S. Provisional Application Ser. No. 60/275,846 filed Mar. 14, 2001, entitled "Improved Wireless Communications Systems and Methods"; (ii) U.S. Provisional Application Ser. No. 60/289,600 filed May 7, 2001, entitled "Improved Wireless Communications Systems and Methods Using Long-Code Multi-User Detection'" and (iii) U.S. Provisional Application Ser. No. 60/295,060 filed Jun. 1, 2001 entitled "Improved Wireless Communications Systems and Methods for a Communications Computer," the teachings all of which are incorporated herein by reference, and a copy of the latter of which may be filed herewith.

The above embodiments are presented for illustrative purposes only. Those skilled in the art will appreciate that various modifications can be made to these embodiments without departing from the scope of the present invention. For example, the processors could be of makes and manufactures and/or the boards can be of other physical designs, layouts or architectures. Moreover, the FPGAs and other logic devices can be software or vice versa. Moreover, it will be appreciated that while the illustrated embodiments decomposes physical user waveforms to virtual user waveforms, the mechanisms described herein can be applied, as well, without such decomposition, and that, accordingly, the terms "waveform" or "user waveform" should be treated as referring to either physical or virtual waveforms unless otherwise evident from context.

We claim:

1. A communications device for detecting user transmitted symbols encoded in spread spectrum waveforms ("user waveforms") comprising a first operating system supporting execution of a first process corresponding to a first set of communication tasks for detecting user transmitted symbols encoded in the user waveforms, a second operating system supporting execution of a second process corresponding to a second set of communication tasks for detecting user transmitted symbols encoded in the user waveforms, where the first and second operating systems differ, a protocol translator coupled to the first and second processes and translating communications in between, the first process sending to the second process via the protocol translator a set of executable instructions for performing at least a portion of said second set of communication tasks, wherein the second process generates a matrix as a result of executing the set of instructions.

2. The device of claim 1, wherein the matrix represents any of a correlation of code sequences for the user waveforms, a cross-correlation of the user waveforms based on time-lags and complex amplitudes, and estimates of user transmitted symbols embedded in the user waveforms.

3. The device of claim 2, wherein the second process routes said matrix to one or more memories and devices based on a configuration specified by the first process.

4. The device of claim 1, wherein the first process sends via the protocol translator information to the second process for configuration thereof.

5. The device of claim 4, wherein the information comprises a routing map.

6. The device of claim 5, wherein the second process routes a result of executing the set of instructions based on the routing map.

7. The device of claim 6, wherein the second process generates the matrix as the result of executing the set of instructions.

8. The device of claim 7, wherein the matrix represents any of a correlation of code sequences for the user waveforms, a cross-correlation of the user waveforms based on time-lags and complex amplitudes, and estimates of user transmitted symbols embedded in the user waveforms.

9. A communications device for detecting user transmitted symbols encoded in spread spectrum waveforms ("user waveforms") comprising a first operating system supporting execution of a first process corresponding to a first set of communication tasks for detecting user transmitted symbols encoded in the user waveforms, a second operating system supporting execution of a plurality of second processes corresponding to a respective-second set of communication tasks for detecting user transmitted symbols encoded in the user waveforms, where the first and second operating systems differ, a protocol translator coupled to the first and second processes and translating communications in between, the first process sending to each second process via the protocol translator a set of executable instructions for performing a respective portion of a common task, wherein the first process sends to each of the second processes via the protocol translator instructions for generating a respective portion of a matrix.

10. The device of claim 9, wherein the first process sends to each of the second processes via the protocol translator instructions for generation of the portion of a matrix representing any of a correlation of code sequences for the user waveforms, a portion of a cross-correlation of the user waveforms based on time-lags and complex amplitudes, and estimates of user transmitted symbols embedded in the user waveforms.

11. The device of claim 9, wherein the first process sends via the protocol translator to each second process information for configuration thereof.

12. The device of claim 11, wherein the each of the second processes routes its respective portion of a matrix to one or more memories and devices based on the information from the first process.

13. The device of claim 11, wherein the first process monitors an operational status of each of the second processes and generates the information for configuration thereof based thereon.

14. The device of claim 11, wherein the first process monitors an operational status of each of the second processes and generates the set of executable instructions thereof based thereon.

* * * * *